US012798145B2

(12) United States Patent
Yates et al.

(10) Patent No.: US 12,798,145 B2
(45) Date of Patent: Nov. 17, 2026

(54) PRODUCT DISPENSER, METHOD OF FORMING A PRODUCT STICK CARRIER AND APPARATUS FOR PERFORMING THE METHOD

(71) Applicant: MULTI PACKAGING SOLUTIONS UK LIMITED, Nottingham (GB)

(72) Inventors: David Yates, Nottingham (GB); Ernest Asante, Nottingham (GB); Nigel Davis, Nottingham (GB)

(73) Assignee: Multi Packaging Solutions UK Limited (GB)

( * ) Notice: Subject to any disclaimer, the term of this patent is extended or adjusted under 35 U.S.C. 154(b) by 173 days.

(21) Appl. No.: 18/723,828

(22) PCT Filed: Dec. 22, 2022

(86) PCT No.: PCT/GB2022/053366
§ 371 (c)(1),
(2) Date: Jun. 24, 2024

(87) PCT Pub. No.: WO2023/118885
PCT Pub. Date: Jun. 29, 2023

(65) Prior Publication Data

US 2025/0073944 A1 Mar. 6, 2025

(30) Foreign Application Priority Data

Dec. 23, 2021 (GB) ...................................... 2118892
Aug. 8, 2022 (GB) ...................................... 2211528

(51) Int. Cl.

| | |
|---|---|
| ***B26F 1/22*** | (2006.01) |
| ***A45D 40/02*** | (2006.01) |
| ***B26F 1/44*** | (2006.01) |

(52) U.S. Cl.
CPC ................ *B26F 1/22* (2013.01); *A45D 40/02* (2013.01); *B26F 1/44* (2013.01); *B26F 2001/4427* (2013.01)

(58) Field of Classification Search
CPC ...... B26F 1/22; B26F 1/44; B26F 2001/4427; A45D 40/02
See application file for complete search history.

(56) References Cited

U.S. PATENT DOCUMENTS 2,333,813 A * 11/1943 Nyden .................. A45D 40/02 401/82
2,354,136 A * 7/1944 Morey .................. A45D 40/06 401/71

(Continued)

FOREIGN PATENT DOCUMENTS

GB 107159 A 6/1917
WO WO-2020254803 A1 * 12/2020 ............ A45D 40/12
WO WO-2021084284 A1 * 5/2021 ............ A45D 40/06

OTHER PUBLICATIONS

PCTGB2253366 International Search Report dated Apr. 25, 2023, 6 pages.

*Primary Examiner* — Sean M Michalski
(74) *Attorney, Agent, or Firm* — Brian J. Goldberg; Rohini K. Garg

(57) ABSTRACT

There is provided herein a dispenser formed of card-based or paper-based material for a product in stick form. The dispenser includes a dispenser axis, a proximal end, a distal end, a product stick carrier, and a sleeve. The dispenser axis extends along a length of the dispenser. The product stick carrier is in the form of a cylindrical tube for receiving a product stick in use. The sleeve is in the form of a cylindrical tube, wherein the product stick carrier is located within the sleeve and wherein the product stick carrier and the sleeve are moveable axially relative to one another. The product (Continued)

stick carrier includes a cylindrical wall, a carrier proximal end, a carrier distal end and a plurality of tabs. The cylindrical wall has an inner surface and an outer surface. The product stick extends from the carrier distal end in use. The plurality of tabs extend inwardly toward the dispenser axis from the inner surface of the product stick carrier. The plurality of tabs are configured to engage a product stick supported by the product stick carrier in use to assist in securing the product stick within the product stick carrier.

19 Claims, 20 Drawing Sheets

(56) References Cited

U.S. PATENT DOCUMENTS

| | | | | | |
|---|---|---|---|---|---|
| 2,394,961 | A * | 2/1946 | Auerbach | A45D 40/06 | 401/78 |
| 3,817,636 | A * | 6/1974 | Ritzenhoff | A45D 40/06 | 401/78 |
| 4,679,289 | A * | 7/1987 | Miller | B21D 28/28 | 83/192 |
| 5,240,337 | A * | 8/1993 | Gruner | A45D 40/06 | 401/86 |
| 2012/0156415 | A1* | 6/2012 | Willey | B65D 65/14 | 156/60 |
| 2022/0395076 | A1* | 12/2022 | Skelton | A45D 40/00 | |
| 2023/0276922 | A1* | 9/2023 | Skelton | A45D 40/26 | 401/53 |

* cited by examiner

PRODUCT DISPENSER, METHOD OF FORMING A PRODUCT STICK CARRIER AND APPARATUS FOR PERFORMING THE METHOD

TECHNICAL FIELD

The present invention relates to dispensers for products in stick form, for example cosmetics, lipsticks, lip balms, sunscreens, body balms, deodorants, adhesives and other products for topical application to a surface, for example to a person's skin or lips. The product in stick form may be any consumer or personal care product, for example. The invention extends to an assembly comprising a dispenser in accordance with the invention in any of its aspects or embodiments in combination with a product in stick form, and to a package comprising a dispenser or assembly in accordance with the invention in any of its aspects or embodiments.

A further aspect of the invention relates to methods and apparatus for forming a dispenser.

In some aspects, the invention also extends to a product stick carrier for a product in stick form to be used in a dispenser, as well as to methods and apparatus for forming the product stick carrier.

BACKGROUND

Stick products such as lipsticks are supplied in a number of dispensers. The most common dispensers comprise components made of plastics.

It is desirable to reduce the amount of plastic material used in the dispenser, and provide a more sustainable dispenser.

The present invention relates to a card-based or paper-based dispenser including a product concealing sleeve configured to retract relative to a product stick carrier to reveal a product stick and to extend to conceal said product stick. It has been found that in some situations the product concealing sleeve can be inadvertently retracted. For example, when a cap is placed onto the dispenser, frictional forces can cause the product concealing sleeve to be pushed (proximally) from its extended, concealing position. The present invention therefore seeks to provide an improved dispenser which may address such problems.

SUMMARY

From a first aspect, there is provided a dispenser formed of card-based or paper-based material for a product in stick form, the dispenser comprising:

- a proximal end;
- a distal end;
- a product stick carrier in the form of a cylindrical tube for supporting a product stick in use;
- an outer sleeve in the form of a cylindrical tube disposed radially outwardly of the product stick carrier, wherein the product stick carrier is fixed relative to the outer sleeve;
- a product concealing sleeve in the form of a cylindrical tube disposed radially inwardly of the outer sleeve and radially outwardly of the product stick carrier, the product concealing sleeve being retractable from a first, fully extended axial position relative to the outer sleeve and product stick carrier for concealing a product stick supported by the product stick carrier in use in order to expose the product stick for use; and

- a locking arrangement, wherein the locking arrangement comprises:
- a first proximal facing edge;
- a second proximal facing edge;
- a first distal facing edge; and
- a second distal facing edge;
- wherein the first and second proximal facing edges and the first and second distal facing edges are disposed radially outwardly of the product stick carrier and radially inwardly of the product concealing sleeve;
- wherein the first proximal facing edge and the first distal facing edge are associated with the exterior of the product stick carrier;
- wherein the second proximal facing edge and the second distal facing edge are associated with the interior of the product concealing sleeve;
- wherein the first proximal facing edge and the second distal facing edge cooperate with one another to prevent advancement of the product concealing sleeve relative to the outer sleeve and product stick carrier beyond a set point so as to define the first, fully extended position of the product concealing sleeve,
- wherein a circumferential gap is defined adjacent an end of the first distal facing edge, such that in at least one rotational position of the product concealing sleeve relative to the product stick carrier, the second proximal facing edge is movable in a proximal direction axially past the first distal facing edge through the circumferential gap without engagement of the first distal facing edge with the second proximal facing edge to permit retraction of the product concealing sleeve from an extended, concealing position, and in at least one other rotational position of the product concealing sleeve relative to the product stick carrier, at least a portion of the first distal facing edge and at least a portion of the second proximal facing edge engage one another to prevent retraction of the product concealing sleeve from the extended, concealing position.

In this way, the present invention may provide an arrangement for selectively locking the product concealing sleeve in an extended, concealing position. The locking arrangement is simple for the user to operate. The user may simply twist the product concealing sleeve relative to the product stick carrier to lock or unlock the product concealing sleeve so as to prevent or enable retraction from the extended, concealing position.

The second distal facing edge and the first proximal facing edge engage one another in any rotational position of the product concealing sleeve. In this way, extension of the product concealing sleeve relative to the product stick carrier distally beyond the fully extended position is never allowed.

The first distal facing edge and second proximal facing edge cooperate with one another to selectively prevent or allow retraction of the product concealing sleeve from the extended, concealing position based on rotational position of the product concealing sleeve with respect to the product stick carrier.

In any one of the at least one rotational positions of the product concealing sleeve relative to the product stick carrier in which the second proximal facing edge is movable axially past the first distal facing edge in a proximal direction through the circumferential gap, the product concealing sleeve may be referred to as being "unlocked". In any one of the at least one other rotational positions in which the second proximal facing edge may not be moved axially past the first distal facing edge in the proximal direction (as at least a portion of the second proximal facing edge engages at least a portion of the first distal facing edge), the product concealing sleeve may be referred to as being "locked".

The use of the edges to selectively prevent retraction of the product concealing sleeve relative to the product stick carrier allows the user to overcome the possibility of the product concealing sleeve being inadvertently retracted. The user may rotate the product concealing sleeve relative to the product stick carrier to lock it into an extended, concealing position to prevent inadvertent retraction of the sleeve, or conversely to unlock it from an extended, concealing position when it is desired to retract the sleeve.

While the invention is described herein in reference to the functionality of the locking arrangement to retain the product concealing sleeve in an extended, concealing position, when the product concealing sleeve is in the at least one rotational position relative to the product stick carrier which allows retraction of the product concealing sleeve in a proximal direction from the extended, concealing position, movement of the second proximal facing edge is possible in either axial direction through the circumferential gap. This will also allow axial movement of the product concealing sleeve in a distal direction as it is extended toward the first, fully extended position.

Locking of the product concealing sleeve may be achieved by rotationally aligning the product concealing sleeve relative to the product stick carrier to enable axial movement of the product concealing sleeve to the fully extended position and then rotating the product concealing sleeve relative to the product stick carrier to lock it into the extended, concealing position.

The first distal facing edge and second proximal facing edge cooperate with one another to selectively prevent or allow retraction of the product concealing sleeve relative to the product stick carrier from the extended, concealing position when an axial force is exerted on the product concealing sleeve urging the sleeve in a proximal direction. In this way, if such an axial force is applied to the extended product concealing sleeve inadvertently, such as when applying a cap, this will only result in retraction of the product concealing sleeve when the product concealing sleeve is in a particular rotational position or range of rotational positions (i.e. not in the locked position(s)) with respect to the product stick carrier.

The first distal facing edge and second proximal facing edge cooperate with one another to selectively prevent or allow retraction of the product concealing sleeve from an extended, concealing position. The extended, concealing position is a position in which the second proximal facing edge is located distal to the first distal facing edge. (In embodiments in which the edges are helical edges, the second proximal facing edge will lie above the first distal facing edge when in the extended, concealing position, and may be considered to be distal thereto.) The locking arrangement may maintain the product concealing sleeve between the extended, concealing position and the first, fully extended position when in the locked state.

The extended, concealing position may correspond substantially to the first, fully extended position. The first distal facing edge and second proximal facing edge may therefore cooperate with one another to retain the product concealing sleeve substantially at the first, fully extended position. By "substantially at" the first, fully extended position, it is meant at, or in close proximity thereto. Thus, when the product concealing sleeve is in an extended concealing position corresponding substantially to the first, fully extended position, the first proximal facing edge and second proximal facing edge may not, and typically will not engage one another at the same time as the first distal facing edge and the second proximal facing edge i.e. there may be a small amount of axial "play" in the position of the product concealing sleeve when held substantially at the first, fully extended position such that, when in one of the at least one other rotational positions relative to the product stick carrier corresponding to a "locked position", the product concealing sleeve may be able to move slightly in a proximal direction before the edges stopping retraction engage with one another.

This may facilitate rotation of the product concealing sleeve into and out of the "locked" positions, and provide some tolerance in manufacture of the dispenser. This will also enable movement of the product concealing sleeve into and out of the "locked" positions without inducing wear on the first distal facing edge and second proximal facing edge as they slide past one another.

In the case of helical first distal and second proximal facing edges (e.g. in the "Z-type" embodiments described herein), retraction of the product concealing sleeve will be prevented from a range of extended, concealing positions including the first, fully extended position of the product concealing sleeve and a limited range of extended, concealing positions proximal thereto, where the first distal and second proximal facing edges engage one another.

The features included in the dispenser ensure that the extension of the product concealing sleeve is always stopped at the fully extended position (by virtue of the first proximal facing edge and second distal facing edge), and the retraction of the product concealing sleeve from an extended, concealing position is sometimes stopped, depending on the rotational (or angular) position of the sleeves/tubes relative to one another as described herein. The product concealing sleeve may be locked in the extended, concealing position in which the second proximal facing edge may not move proximally through the circumferential gap. This may be achieved through aligning the product concealing sleeve in the "unlocked" position to permit movement of the product concealing sleeve to the fully extended position, followed by rotational movement, or twisting, to result in the second proximal facing edge being axially aligned with at least a portion of the first distal facing edge (rather than the circumferential gap) to prevent retraction of the product concealing sleeve (i.e. locking the dispenser)

Retraction of the product concealing sleeve relative to the product stick carrier is allowed in at least one rotational position of the product concealing sleeve relative to the product stick carrier and retraction of the product concealing sleeve relative to the product stick carrier is prevented in at least one other rotational position of the product concealing sleeve relative to the product stick carrier. The at least one other rotational position may be at least one other range of rotational positions. Thus, in the at least one rotational position of the product concealing sleeve relative to the product stick carrier the second proximal facing edge may then be movable in a proximal direction axially past the first distal facing edge through the circumferential gap without engagement of the first distal facing edge with the second proximal facing edge to permit retraction of the product concealing sleeve from an extended, concealing position, and in a range of other rotational positions of the product concealing sleeve relative to the product stick carrier, at least a portion of the first distal facing edge and at least a portion of the second proximal facing edge engage one another to prevent retraction of the product concealing sleeve from the extended, concealing position.

The at least one rotational position may be a first rotational position or a first range of rotational positions of the product concealing sleeve relative to the product stick carrier. The at least one other rotational position may be a second rotational position or a second range of rotational positions of the product concealing sleeve relative to the product stick carrier. The first and second ranges of rotational positions are different ranges of rotational positions. The ranges do not overlap. The second range of rotational position may be a continuous or discontinuous range.). For example, in some embodiments (such as the "T-shape" embodiment described below), the second range of rotational positions (in which retraction is prevented) may comprise first and second sub-ranges of rotational positions, separated by the first range of rotational positions (in which retraction is possible).

The second proximal facing edge is moveable axially in a proximal direction through the circumferential gap past the first distal facing edge to allow retraction of the product concealing sleeve when the product concealing sleeve is in any of the at least one rotational position (i.e. a first rotational position or one of a first range of rotational positions) relative to the product stick carrier. At least a portion of the first distal facing edge engages at least a portion of the second proximal facing edge when the product concealing sleeve is in any one of the at least one other rotational positions (i.e. a second rotational position or one of a second range of rotational positions) relative to the product stick carrier so as to prevent retraction of the product concealing sleeve. When the product concealing sleeve is in one of the at least one other rotational positions (i.e. second rotational position or one of the second range of rotational positions) relative to the product stick carrier, at least a portion of the first distal facing edge circumferentially overlaps at least a portion of the second proximal facing edge to prevent axial retraction of the product concealing sleeve relative to the product stick carrier in the proximal direction. The product concealing sleeve is rotatable relative to the product stick carrier to one of the at least one rotational position (i.e., the first rotational position or one of the first range of rotational positions) in which the first distal facing edge does not circumferentially overlap the second proximal facing edge to permit the retraction of the product concealing sleeve axially in the proximal direction relative to the product stick carrier with the second proximal facing edge moving through the circumferential gap.

When retraction of the product concealing sleeve is enabled and the second proximal facing edge has been moved proximally past the first distal facing edge, the product concealing sleeve may be freely rotatable relative to the product stick carrier. The movement of the product concealing sleeve may be unconstrained rotationally in this region.

When retraction of the product concealing sleeve is enabled, the product concealing sleeve may be retractable to a second, fully retracted position of the product concealing sleeve relative to the product stick carrier. The product concealing sleeve may be freely movable axially relative to the product stick carrier when the second proximal facing edge has passed proximally through the circumferential gap so as to be in the region proximal to the first distal facing edge. The second, fully retracted position refers to the most retracted available position of the product concealing sleeve relative to the product stick carrier. The first distal facing edge and the second proximal facing edge may cooperate with one another to selectively prevent or allow retraction of the product concealing sleeve to the second, fully retracted position of the product concealing sleeve relative to the product stick carrier. The second, fully extended position is a set position. This may be defined by a stop mechanism e.g. the provision of edges similar to those providing the first, fully extended position. However, for simplicity it is advantageously provided by engagement of the product concealing sleeve with a base of the outer sleeve e.g. such as may be provided by a base disc closing a proximal end of the outer sleeve. In some embodiments the dispenser comprises a base disc fixed to a proximal end edge of each of the product stick carrier and the outer sleeve, and the second, fully retracted position of the product concealing sleeve is a set position defined when a proximal end of the product concealing sleeve engages the base disc.

The retraction of the product concealing sleeve is in the proximal direction and is a movement relative to the product stick carrier.

The rotational position of the product concealing sleeve with respect to the product stick carrier based on which retraction of the product concealing sleeve is selectively permitted relative to the product stick carrier may correspond to a number of discrete rotational positions, or a range of rotational positions (which may or may not be continuous, as described above).

A rotational position as defined herein refers to a rotational position with respect to a longitudinal axis of the dispenser. This may correspond to the longitudinal axes of the product stick carrier and product concealing sleeve. The rotational positions determine the rotational alignment or misalignment (circumferential overlap or lack of) of the first distal facing edge and the second proximal facing edge (or, in embodiments, of the locking portions and collar pieces).

In some embodiments of the invention the dispenser may include a cap sized to fit snugly over the product concealing sleeve when the product concealing sleeve is in the first, fully extended position. A proximal edge of the cap may engage a distal edge of the outer sleeve when located over the product concealing sleeve. The distal edge of the outer sleeve may define a shoulder which abuts the proximal edge of the cap. The outer surfaces of the cap and outer sleeve may be flush with one another when the cap is located over the product concealing sleeve with the proximal edge of the cap engaging the distal edge of the outer sleeve.

Without the selective prevention of retraction of the product concealing sleeve, the cap may otherwise have driven inadvertent retraction of the product concealing sleeve by frictional forces as the cap is placed over the product concealing sleeve in the extended position.

The first proximal facing edge and the first distal facing edge are associated with the exterior of the product stick carrier. The second proximal facing edge and the second distal facing edge are associated with the interior of the product concealing sleeve. In this way they are located radially between the outer sleeve and the product stick carrier i.e. between the inner surface of the product concealing sleeve and the outer surface of the product stick carrier. The first proximal facing edge and the first distal facing edge are fixed with respect to the product stick carrier. The first proximal facing edge and the second proximal facing edge are also fixed with respect to each other. The second proximal facing edge and the second distal facing edge are fixed with respect to the product concealing sleeve. The second proximal facing edge and the second distal facing edge are also fixed with respect to each other.

The second proximal facing edge extends around only a portion of the circumference of the product concealing sleeve. The first distal facing edge extends around only a portion of the circumference of the product stick carrier. This enables the second proximal facing edge to move past the first distal facing edge as described herein in the at least one other rotational position of the product concealing sleeve relative to the product stick carrier.

The edges may be provided in any suitable manner, by components separate to or integral with the product concealing sleeve or product stick carrier. For example, the first proximal facing edge and second distal facing edge might be provided by flaps extending from the distal end of the product stick carrier and the proximal end of the product concealing sleeve respectively. However, in other embodiments they are provided by separate components fixed to the exterior of the product stick carrier and interior of the product concealing sleeve respectively. The first distal facing edge and the second proximal facing edge may be provided by separate components fixed to the exterior of the product stick carrier and the interior of the product concealing sleeve respectively. The same component may define both the first proximal facing edge and the first distal facing edge, or these may be defined by different components. Likewise, a given component may define both the second distal facing edge and the second proximal facing edge, or these edges may be defined by different components. Various options exist, as will be evident from the embodiments described herein.

The circumferential gap is defined adjacent an end of the first distal facing edge. The circumferential gap is a gap which extends in a circumferential direction. The gap extends around the exterior of the product stick carrier. In some embodiments e.g. the "C-shaped", "T-shaped" or "S-shaped" embodiments discussed below, the circumferential gap is defined between the ends of the first distal facing edge. The ends of the distal facing edge are the circumferential ends thereof.

In some embodiments of the invention, the locking arrangement may include a product stick carrier collar piece and a product concealing sleeve collar piece. The product stick carrier collar piece is affixed to the exterior of the product stick carrier at a distal end of the product stick carrier and a proximal end edge of the product stick collar piece provides the first proximal facing edge. The product concealing sleeve collar piece is affixed to the interior of the product concealing sleeve at a proximal end of the product concealing sleeve and a distal end edge of the product concealing sleeve collar piece provides the second distal facing edge.

References herein to the product stick carrier collar piece being at a distal end of the product stick carrier encompass the collar piece being in the vicinity of the distal end. It is not meant that the collar piece must be exactly and precisely aligned with a distal end edge of the product stick carrier. In some embodiments described herein, the product stick collar piece is spaced from the distal end edge to enable a product concealing sleeve collar piece to enter the space between the product stick carrier collar piece and the distal end edge. However, in other embodiments, the product stick carrier collar piece is located such that the distal end edge of the product stick carrier collar piece is aligned with the distal end edge of the product stick carrier. This may assist in maximising available travel of the product concealing sleeve.

Likewise, by the product concealing sleeve collar piece being at a proximal end of the product stick carrier, it is meant that the collar piece is in the vicinity of the proximal end. It is not meant that the collar piece must be exactly and precisely aligned with a proximal end edge of the product concealing sleeve. However, in some embodiments, the product concealing sleeve collar piece is located such that the proximal end edge of the product concealing sleeve piece is aligned with the proximal end edge of the product concealing sleeve. This may assist in maximising available travel of the product concealing sleeve.

These collar pieces are effective options for forming the first proximal facing edge and second distal facing edges in a manner where they are suitably supported structurally to engage one another and prevent the inappropriate movement of the product concealing sleeve.

In some embodiments of the invention, the first distal facing edge is helical and the second proximal facing edge is helical. The first distal facing edge and second proximal facing edge extend over only a portion of a length of the product stick carrier and product concealing sleeve respectively. By "helical" it is meant that the first distal facing edge and the second proximal facing edge each extend both axially and circumferentially. Thus, such edges may alternatively be referred to as "sloping" or "diagonal" edges. The term "helical" does not imply any limitation regarding the circumferential extent of the edges.

In some embodiments of the invention, the locking arrangement includes a product stick carrier collar piece, a product concealing sleeve collar piece, a first trapezoidal locking portion and a second trapezoidal locking portion. The product stick carrier collar piece is affixed to the exterior of the product stick carrier at a distal end of the product stick carrier. The product concealing sleeve collar piece is affixed to the interior of the product concealing sleeve at a proximal end of the product concealing sleeve. The first trapezoidal locking portion extends proximally from the product stick carrier collar piece and has a first helical lateral side and a proximal base side. The first helical lateral side provides the first distal facing edge. The second trapezoidal locking portion extends distally from the product concealing sleeve collar piece and has a second helical lateral side and a distal base side. The second helical lateral side provides the second proximal facing edge.

In these embodiments the second trapezoidal locking portion can translate axially past the first trapezoidal locking portion in the at least one rotational position of the product concealing sleeve relative to the product stick carrier through the circumferential gap to permit retraction of the product concealing sleeve from the extended, concealing position, and is prevented through engagement of at least a portion of the first distal facing edge and at least a portion of the second proximal facing edge from translation axially in a proximal direction past the first trapezoidal locking portion in the at least one other rotational position of the product concealing sleeve relative to the product stick carrier so as to prevent retraction of the product concealing sleeve relative to the product stick carrier from the extended, concealing position.

In these embodiments, the circumferential gap is defined adjacent an end of the first distal facing edge. The end is a circumferential end. The end is the end at which the first distal facing edge meets the proximal base side.

Any suitable angle may be defined between the base side of each respective trapezoidal locking portion and its helical lateral side.

Which edges provide the first proximal facing edge and second distal facing edge of the locking arrangement, defining the first, fully extended position of the product concealing sleeve, will depend upon the relative axial extents of the trapezoidal locking portions. In some embodiments the proximal base side of the first trapezoidal locking portion provides the first proximal facing edge of the locking arrangement and a distal end edge of the product concealing sleeve collar piece provides the second distal facing edge of the locking arrangement. In other embodiments a proximal end edge of the product stick carrier collar piece provides the first proximal facing edge of the locking arrangement and the distal base side of the second trapezoidal locking portion provides the second distal facing edge of the locking arrangement. In some embodiments the proximal base side of the first trapezoidal locking portion may engage the distal end edge of the product concealing sleeve collar piece and the proximal end edge of the product stick carrier may engage the distal base side of the second trapezoidal locking portion when the product concealing sleeve is in a first, fully extended position, such that either of the engaging pairs of edges may be considered to provide the first proximal facing and second distal facing edge. This may occur when the first and second trapezoidal locking portions are of the same axial width.

The first and second trapezoidal locking portions are preferably each in the form of a right trapezoid. The first and second trapezoidal locking portions may then be referred to as first and second right trapezoid locking portions. The first trapezoid locking portion then further has a first axial lateral side (opposite the first helical lateral side), and the second trapezoidal locking portion further has a second axial lateral side (opposite the second helical lateral side). It has been found that engagement of the first and second axial lateral sides may provide a useful indication to the user as to when the product concealing sleeve is in a rotational position relative to the product stick carrier which will permit retraction of the product concealing sleeve. In embodiments, the first and second axial lateral sides engage one another when the product concealing sleeve is in a rotational position relative to the product stick carrier which will permit retraction of the product concealing sleeve from the extended, concealing position. Thus, in this rotational position, the second trapezoidal locking portion can translate axially in a proximal direction past the first trapezoidal locking portion through the circumferential gap.

The term trapezoidal means that the locking portion is in the shape of a trapezoid (or, in embodiments, a right trapezoid, or right-angled trapezoid) when flat. That is, when placed on the sleeve, they have a three dimensional shape corresponding to a trapezoidal shape bent partially around a cylinder. Trapezoid or trapezoidal herein is used to refer to a quadrilateral shape having two parallel and two non-parallel sides.

When retraction is allowed, in any of the embodiments having first and second trapezoid locking portions, the first and second trapezoid locking portions may move axially past one another such that they are axially clear of each other and the product concealing sleeve may be able to freely rotate, without requiring axial movement, and/or move axially, without requiring circumferential movement, as the product concealing sleeve retracts further relative to the product stick carrier. Thus, in this region the product concealing sleeve is not constrained e.g. to follow a helical path.

In embodiments of the invention in which first and second trapezoidal (or right trapezoid) locking portions are provided, the sum of the circumferential lengths of the proximal base side of the first trapezoidal (or right trapezoid) locking portion and of the distal base side of the second trapezoidal (or right trapezoid) locking portion is less than an outer circumference of the product stick carrier. In this manner the translation of the second trapezoidal (or right trapezoid) locking portion axially past the first trapezoid (or right trapezoidal) locking portion is allowed at some relative rotational positions of the product concealing sleeve and product stick carrier, but not at others.

In any embodiments of the invention in which first and second trapezoidal locking portions are provided, the first trapezoidal locking portion may be integrally formed with the product stick carrier collar piece and the second trapezoidal locking portion may be integrally formed with the product concealing sleeve collar piece.

In some embodiments of the invention, as discussed above, the locking arrangement comprises a product stick carrier collar piece affixed to the exterior of the product stick carrier at a distal end of the product stick carrier, a proximal end edge of the product stick carrier collar piece providing the first proximal facing edge; and a product concealing sleeve collar piece affixed to the interior of the product concealing sleeve at a proximal end of the product concealing sleeve, a distal end edge of the product concealing sleeve collar piece providing the second distal facing edge. In some embodiments, a distal end edge of the product stick carrier collar piece may then provide the first distal facing edge. The locking arrangement may then further include a locking portion extending distally from the product concealing sleeve collar piece. The locking portion comprises an axially extending portion and a first circumferentially extending portion extending from the distal end of the axially extending portion. The proximal edge of the first circumferentially extending portion provides at least a portion of the second proximal facing edge. The product stick carrier collar piece is spaced from the distal edge of the product stick carrier to enable the first circumferentially extending portion to be located (axially) between the product stick carrier collar piece and the distal edge of the product stick carrier when the product concealing sleeve is in the extended, concealing position (or the first, fully extended position). The product stick carrier collar piece should be spaced from the distal edge of the product stick carrier by a distance equal to or larger than an axial width of the first circumferentially extending portion. The locking portion can translate axially in a proximal direction past the product stick carrier collar piece through the circumferential gap in the at least one rotational position of the product concealing sleeve relative to the product stick carrier to permit retraction of the product concealing sleeve relative to the product stick carrier from the extended, concealing position and is prevented through engagement of at least a portion of the first distal facing edge and at least a portion of the second proximal facing edge from translating axially in a proximal direction past the product stick carrier collar piece in the at least one other rotational position of the product concealing sleeve relative to the product stick carrier to prevent retraction of the product concealing sleeve relative to the product stick carrier from the extended, concealing position. In these embodiments, the circumferential gap is defined between the (circumferential) ends of the first distal facing edge. The gap extends between circumferential end edges of the product concealing sleeve collar piece.

This provides an effective construction providing the appropriate edges that interact to enable selective prevention of retraction of the product concealing sleeve.

The first distal facing edge and the second proximal facing edge extend circumferentially but not axially in this embodiment. Thus the edges are not helical (or sloping).

The sum of the circumferential lengths of the circumferentially extending portion of the first locking portion and of the product stick carrier collar piece is less than an outer circumference of the product stick carrier.

In some embodiments in which the locking arrangement comprises a locking portion extending distally from the product concealing sleeve collar piece and having an axially extending portion and a first circumferentially extending portion, the locking portion is an L-shaped locking portion. In other embodiments, the locking portion may include a second circumferentially extending portion extending from the axially extending portion in the opposite circumferential direction to the extension of the first circumferentially extending portion. The first circumferentially extending portion and the second circumferentially extending portion each provide parts of the second proximal facing edge. The second proximal facing edge is a discontinuous edge including a first part provided by the first circumferentially extending portion and a second part provided by the second circumferentially extending portion. The locking portion may then be a T-shaped locking portion. The selection of preventing or allowing retraction is determined by a rotational position of the product concealing sleeve with respect to the product stick carrier. When either the first or second part of the second proximal facing edge engages the first distal facing edge, retraction of the product concealing sleeve is prevented. When the locking piece is located between the ends of the first distal facing edge, i.e. such that it is aligned with the circumferential gap, retraction is possible. The first distal facing edge and the second proximal facing edge extend circumferentially but not axially in such embodiments. The edges are therefore not helical (or sloping).

This provides an effective construction providing the appropriate edges that interact to enable selective prevention of retraction of the product concealing sleeve. The user is able to prevent retraction (i.e. "lock" the dispenser) by rotating the product concealing sleeve in either a clockwise or an anticlockwise direction when in the extended, concealing position. A T-shaped locking portion allows the user to disable retraction by rotating the product concealing sleeve in either direction from a central, permissive rotational location.

In some other embodiments in which the locking arrangement comprises a product stick carrier collar piece affixed to the exterior of the product stick carrier at a distal end of the product stick carrier, a proximal end edge of the product stick carrier collar piece providing the first proximal facing edge; and a product concealing sleeve collar piece affixed to the interior of the product concealing sleeve at a proximal end of the product concealing sleeve, a distal end edge of the product concealing sleeve collar piece providing the second distal facing edge; the locking arrangement may include a secondary product stick carrier collar piece affixed to the exterior of the product stick carrier and axially spaced from and proximal to the product stick carrier collar piece to enable the product concealing sleeve collar piece to be located (axially) between the proximal edge of the product stick carrier collar piece and the distal edge of the secondary product stick carrier collar piece when the product concealing sleeve is in the extended, concealing position. The product stick carrier collar piece will also be located in this space when the product concealing sleeve is in the first, fully extended position.

The secondary product stick carrier collar piece is axially spaced from the product stick carrier collar piece by a distance equal to or greater than the axial width of the product concealing sleeve collar piece. A spacing greater than the axial width of the product concealing sleeve collar piece is preferred, facilitating relative rotation of the secondary product stick carrier collar piece with respect to the product concealing sleeve collar piece as the product concealing sleeve is rotated relative to the product stick carrier. A distal end edge of the secondary product stick carrier collar piece provides the first distal facing edge. The circumferential gap is provided between circumferential ends of the first distal facing edge and extends between the circumferential end edges of the secondary product stick carrier collar piece. The proximal end edge of the product concealing sleeve collar piece provides the second proximal facing edge. The product concealing sleeve collar piece can translate axially past the secondary product stick carrier collar piece through the circumferential gap in the at least one rotational position of the product concealing sleeve relative to the product stick carrier and is prevented, though engagement of at least a portion of the first distal facing edge and at least a portion of the second proximal facing edge from translation axially past the secondary product stick carrier collar piece in the at least one other rotational position of the product concealing sleeve relative to the product concealing sleeve.

In these embodiments, the product concealing sleeve collar piece is located between the product stick collar piece and secondary product stick collar piece when in the extended, concealing position.

In these embodiments either or both of the product stick carrier collar piece and product concealing sleeve collar piece may optionally include an axial split.

The secondary product stick carrier collar piece may be axially spaced from the product stick carrier collar piece by a first distance $D_C$ greater than an axial width $W_C$ of the product concealing sleeve collar piece.

The sum of the circumferential lengths of the secondary product stick carrier collar piece and of the product concealing sleeve collar piece may be less than an outer circumference of the product stick carrier.

This arrangement provides another simple construction that provides the required edges to selectively prevent or allow retraction of the product concealing sleeve.

The first distal facing edge and the second proximal facing edge extend circumferentially but not axially in this embodiment.

The product concealing sleeve collar piece is selectively allowed to move past the secondary product stick carrier collar piece in an axial direction.

The product stick carrier collar piece may be flush with the distal end edge of the product stick carrier. In other words, the distal end edge of the product stick carrier collar piece may be aligned with the distal end edge of the product stick carrier.

The product concealing sleeve collar piece may be flush with the proximal end edge of the product concealing sleeve. In other words, the proximal end edge of the product concealing sleeve collar piece may be aligned with the proximal end edge of the product concealing sleeve.

The difference between the outer circumference of the product stick carrier and the circumferential length of the product stick carrier collar piece is less than the circumferential length of the product concealing sleeve collar piece. This ensures that the product concealing sleeve cannot extend fully past the end of the product stick carrier and thereby become disattached from the dispenser.

In some embodiments, rather than a secondary product stick carrier collar piece, the dispenser could include a secondary product concealing sleeve collar piece associated with the product concealing sleeve; however, a secondary product stick carrier collar piece is preferable because it remains hidden from view of the user when the dispenser is in use, whereas a secondary product concealing sleeve collar piece may be visible from inside the product concealing sleeve once enough of the product has been used to avoid the product providing a visual obstruction thereto.

In accordance with any of the embodiment of the invention, the product concealing sleeve collar piece may optionally include an axially extending split.

In some embodiments of any of the above described embodiments, the component (i.e., the locking portion, or the secondary product stick carrier collar piece) providing the first distal facing edge includes an opposite, third proximal facing edge, which may engage with the second distal facing edge when the product concealing sleeve is moved distally toward the concealing position, where the product concealing sleeve is in such a rotational position so that there is circumferential overlap of the components (i.e., it is not in the 'unlocked' rotational position). This will prevent the product concealing sleeve being brought into the extended, concealing position unless the product concealing sleeve is in the at least one other rotational position relative to the product stick carrier (in which case the second distal facing edge is able to move through the circumferential gap to enable the product concealing sleeve to be brought to the extended, concealing position.)

It will be appreciated that a "collar" as used herein may or may not extend fully around the longitudinal axis of the dispenser. This will be clear from the context e.g. where it provides an edge which forms part of the "retraction" preventing locking arrangement based on rotational position of the product concealing sleeve. Where no other limitation is placed on the extent of a collar piece by virtue of its functionality, it may or may not define an axial split. The presence of such a split may assist in providing greater ease of manufacture and tolerances i.e. in tube diameters.

In another aspect that the Applicant expressly reserves the right to claim independently, there is provided a dispenser formed of card-based or paper-based material for a product in stick form. The dispenser includes: a proximal end; a distal end; a product stick carrier in the form of a cylindrical tube for supporting a product stick in use; an outer sleeve in the form of a cylindrical tube disposed radially outwardly of the product stick carrier, wherein the product stick carrier is fixed relative to the outer sleeve; a product concealing sleeve in the form of a cylindrical tube disposed radially inwardly of the outer sleeve and radially outwardly of the product stick carrier, the product concealing sleeve being retractable from a first, fully extended axial position relative to the outer sleeve and product stick carrier for concealing a product stick supported by the product stick carrier in order to expose the product stick for use; and a locking arrangement including: a product stick carrier collar piece attached to an exterior surface of the product stick carrier at the distal end of the product stick carrier; a secondary product stick carrier collar piece spaced proximally from the product stick carrier collar piece and attached to the exterior surface of the product stick carrier; and a product concealing sleeve collar piece attached to an interior surface of the product concealing sleeve at a proximal end thereof. A circumferential gap is provided between the circumferential ends of the secondary product stick carrier collar piece. The circumferential gap is larger than the circumferential length of the product concealing sleeve collar piece, such that the product concealing sleeve collar piece can pass through the circumferential gap. The product concealing sleeve collar piece engages with the product stick carrier collar piece to prevent extension of the product concealing sleeve relative to the product stick carrier beyond a first fully extended position. When in an extended, concealing position relative to the product stick carrier, the product concealing sleeve is rotatable relative to the product stick carrier to a locked position in which the product concealing sleeve collar piece engages with the secondary product stick carrier collar piece to prevent retraction of the product concealing sleeve, and to an unlocked position in which the product concealing sleeve collar piece is able to move axially past the secondary product stick carrier collar piece through the circumferential gap in a proximal direction so as to allow retraction of the product concealing sleeve relative to the product stick carrier from the extended, concealing position.

A user may operate the dispenser above by moving the product concealing sleeve axially to the first fully extended position (extension), then rotating the product concealing sleeve into a locked position such that the product concealing sleeve collar piece moves to a position between the product stick carrier collar piece and the secondary product stick carrier collar piece, wherein, upon the action of an axial force (in the proximal direction), the produce concealing sleeve collar piece engages with the secondary product stick carrier collar piece to prevent retraction.

The present invention in this further aspect may include any or all of the features described in relation to the other aspects of the invention, to the extent they are not mutually exclusive. Thus, any of the features described earlier in relation to embodiments having the secondary product stick carrier collar piece may be used (corresponding to the "C-type" embodiments.

In accordance with a yet further aspect of the invention there is provided a dispenser formed of card-based or paper-based material for a product in stick form, the dispenser comprising:

a proximal end;

a distal end;

a product stick carrier in the form of a cylindrical tube for supporting a product stick in use;

an outer sleeve in the form of a cylindrical tube disposed radially outwardly of the product stick carrier, wherein the product stick carrier is fixed relative to the outer sleeve;

a product concealing sleeve in the form of a cylindrical tube disposed radially inwardly of the outer sleeve and radially outwardly of the product stick carrier, the product concealing sleeve being retractable from a first, fully extended axial position relative to the outer sleeve and product stick carrier for concealing a product stick supported by the product stick carrier in use in order to expose the product stick for use;

and a locking arrangement including: a product stick carrier collar piece affixed to the exterior of the product stick carrier at a distal end of the product stick carrier;

a product concealing sleeve collar piece affixed to the interior of the product concealing sleeve at a proximal end of the product concealing sleeve;

a first trapezoidal locking portion extending proximally from the product stick carrier collar piece and having a first helical lateral side and a proximal base side; and a second trapezoidal locking portion extending distally from the product concealing sleeve collar piece and having a second helical lateral side and a distal base side;

wherein, a circumferential gap is provided adjacent the first helical lateral side, wherein the circumferential gap is larger than the circumferential length of the second trapezoidal locking portion, and wherein, when in an extended, concealing position relative to the product stick carrier, the product concealing sleeve is rotatable relative to the product stick carrier to a locked position in which the second helical lateral side engages the first helical lateral side to prevent retraction of the product concealing sleeve, and to an unlocked position in which the second trapezoidal locking portion is able to move axially past the first trapezoidal locking portion through the circumferential gap in a proximal direction so as to allow retraction of the product concealing sleeve relative to the product stick carrier from the extended, concealing position.

The present invention in this further aspect may include any or all of the features described in relation to the other aspects of the invention, to the extent they are not mutually exclusive. Thus, any of the features described earlier in relation to embodiments having the trapezoidal locking portions may be used (corresponding to the "Z-type" embodiments). The trapezoidal locking portions may be integral with their respective collar pieces. The first fully extended position may be defined by any of the edges associated with the locking portions and/or collar pieces previously described. The helical edges are as previously defined, and may be alternatively referred to as "sloping" or "diagonal".

In any of its aspects or embodiments, the dispenser may include visual marks (or indicia) on the exterior of the outer sleeve and the product concealing sleeve to represent the rotational position of the product concealing sleeve with respect to the product stick carrier. The marks may be located such that they are aligned with one another when the product concealing sleeve is in a rotational position with respect to the product stick carrier which will enable retraction of the product stick carrier.

These visual marks allow a user to observe whether the product concealing sleeve is in a locked position (i.e., in a position to prevent retraction of the product concealing sleeve from the extended, concealing position (and conversely extension thereto)) or in an unlocked position (i.e., in a position to allow retraction of the product concealing sleeve from the extended, concealing position (and conversely, extension thereto)).

The visual marks may be embossed and/or printed on the surface of the outer sleeve and the product concealing sleeve.

The dispenser may include a base disc fixed to a proximal end edge of each of the product stick carrier and the outer sleeve.

A second, fully retracted position of the product concealing sleeve may be defined when a proximal end of the product concealing sleeve engages the base disc.

From another aspect, which the Applicant expressly reserves the right to claim independently, there is provided a dispenser formed of card-based or paper-based material for a product in stick form including a product stick carrier, an outer sleeve, a product concealing sleeve and a plurality of inter-engaging formations. The product stick carrier is in the form of a cylindrical tube and includes a product stick support for supporting a product stick in use. The outer sleeve is in the form of a cylindrical tube disposed radially outwardly of the product stick carrier. The product stick carrier is fixed relative to the outer sleeve. The product concealing sleeve is in the form of a cylindrical tube disposed radially inwardly of the outer sleeve. The product concealing sleeve is retractable from a first, fully extended axial position relative to the outer sleeve and product stick carrier for concealing a product stick supported by the product stick support in use in order to expose the product stick. The product concealing sleeve is disposed radially outwardly of the product stick carrier between the product stick carrier and the outer sleeve. In at least the first, fully extended axial position, the product concealing sleeve is rotatable relative to the product stick carrier and outer sleeve between a range of rotational positions. The plurality of inter-engaging formations are disposed radially outwardly of the product stick carrier and radially inwardly of the product concealing sleeve. Each of the inter-engaging formations is fixed to one of the product stick carrier or the product concealing sleeve. The inter-engaging formations fixed to the product stick carrier include a first proximal facing edge and a first distal facing edge. The inter-engaging formations fixed to the product concealing sleeve include a second proximal facing edge and a second proximal facing edge. The first proximal facing edge and the second distal facing edge cooperate with one another to prevent advancement of the product concealing sleeve relative to the outer sleeve and product stick carrier beyond a set point so as to define the first, fully extended position. The first distal facing edge and the second proximal facing edge cooperate with one another to selectively prevent or allow retraction in the proximal direction of the product concealing sleeve relative to the outer sleeve and product stick carrier from the first, fully extended position. The selection of preventing or allowing retraction is determined by a rotational position of the product concealing sleeve with respect to the product stick carrier.

The present invention in this further aspect may include any or all of the features described in relation to the other aspects of the invention, to the extent they are not mutually exclusive.

In accordance with the invention in any of its aspects or embodiments, the term distal means toward the end of the dispenser from which the product is dispensed.

The term proximal is the opposite of distal, and means away from the end of the dispenser from which the product is dispensed.

Extension of the product concealing sleeve (which may also be called the product concealing tube) means in a direction to conceal the product stick.

Retraction of the product concealing sleeve means in a direction to reveal the product stick.

The edges present in each arrangement are configured to engage, or abut, one another and so prevent movement of the parts to which they are attached beyond certain set-points.

A distal facing edge means an edge facing in a distal direction (with at least a component in the distal direction, as is the case for the helical edge). The distal facing edge does not necessarily need to be the distal-most edge of the element of which it is part.

Similarly, a proximal facing edge means an edge facing in the proximal direction.

Any of these aspects, or features discussed above may be combined, unless stated otherwise.

In any of the aspects or embodiments of the invention, the product concealing sleeve is moveable between extended and retracted positions relative to the product stick carrier for covering and exposing a product stick supported by the product stick carrier respectively in use. The product concealing sleeve may be movable between a fully extended, and a fully retracted position relative to the product stick carrier. The fully extended and fully retracted positions refer to the maximum available extended and retracted positions of the product concealing sleeve relative to the product stick carrier in the dispenser. The product stick extends from a distal end of the product stick carrier and is supported by the product stick carrier. Such movement is caused in use by a manual force exerted by a user. The product stick is fixed relative to the product stick carrier, and the product stick carrier is fixed relative to the outer sleeve. The product stick carrier therefore remains static and is selectively exposed by movement of the product concealing sleeve of the dispenser.

The most fully extended available position of the product concealing sleeve relative to the product stick carrier is set by the interaction of the first proximal facing edge and the second distal facing edge. The most fully retracted position of the product concealing sleeve relative to the product stick carrier may be set by the point at which the product concealing sleeve engages a base of the dispenser e.g. of the outer sleeve, or a suitable stop mechanism may be provided to define the most fully retracted position.

The product concealing sleeve is arranged radially inwardly of the outer sleeve, whereby the product concealing sleeve is sandwiched radially between the product stick carrier and the outer sleeve.

The outer sleeve may be made from a paper-based or card-based material such as paperboard or cardboard. The outer sleeve provides a surface which may form an exterior surface of the dispenser, and may be imparted with a desired finish or decoration to provide the dispenser with an attractive appearance, or to impart information to a user.

The product concealing sleeve then provides an intermediate tube located radially between the inner sleeve (or the product stick carrier) and the outer sleeve. The product concealing sleeve is movably e.g. slidably and preferably both rotatably and slidably received within the outer sleeve, and projects upwardly from the outer sleeve. The product concealing sleeve may project upwardly from the outer sleeve when in any operational position relative to the outer sleeve (i.e. from a most fully retracted to fully extended position relative thereto). This will enable the product concealing sleeve to be grasped by the user to pull it back up from the retracted position. The product stick carrier is not movable i.e. is fixed relative to the outer sleeve.

As the product concealing sleeve is retracted or extended relative to the product stick carrier, the product concealing sleeve moves into or out of the space between the product stick carrier and outer sleeve. A greater extent of the product concealing sleeve is located in the space between the product stick carrier and outer sleeve when the product concealing sleeve is in a retracted position for exposing a product stick than when in an extended position for covering a product stick. The product stick support may be in the form of a cup.

When the product stick support is in the form of a cup, the product stick support includes a base, in the shape of a circular disc, and a cylindrical sidewall mounted at a proximal end of the sidewall to the base. The mounting or joining of the cylindrical sidewall to the base may be in a sealing manner such that liquid cannot pass though the joint between the cylindrical sidewall and the base. Alternatively, the sidewall and the base may be formed as an integral part.

The cup may be filled with hot liquid product (such as deodorant) which solidifies at room temperature. The use of the cup allows the use of such products, which are inserted into the product as a liquid, without leakage thereof at the proximal end of the product.

Alternatively, a product stick support could comprise a simple disc, which may be located at any axial length along the product stick carrier.

In yet another embodiment, a product stick support may simply take the form of the product stick carrier walls gripping the product stick.

In some embodiments, the product stick carrier of the dispenser in accordance with any of its aspects or embodiments comprises a plurality of tabs extending inwardly toward a dispenser axis (or toward a product stick carrier axis, which is coaxial therewith) from the inner surface of the product stick carrier, wherein the one or more tabs are configured to engage a product stick supported by the product stick carrier in use to assist in securing the product stick within the product stick carrier in use. The plurality of tabs may be considered to form part of a product stick support of the product stick carrier. The product stick support may or may not include other features e.g. a base disc for supporting the base of the product stick in use.

It is believed that such a product stick carrier is advantageous in its own right. In an aspect, which the Applicant expressly reserves the right to claim independently, there is provided a product stick carrier, formed of card-based or paper-based material, in the form of a cylindrical tube for receiving a product stick in use, the product stick carrier being for a dispenser formed of card-based or paper-based material for a product in stick form, wherein the product stick carrier comprises: a cylindrical wall having an inner surface and an outer surface; a proximal end; a distal end, from which the product stick extends in use; and a plurality of tabs extending inwardly from the inner surface of the product stick carrier (toward an axis of the product stick carrier), wherein the plurality of tabs are configured to engage a product stick supported by the product stick carrier in use to assist in securing the product stick within the product stick carrier.

The present invention in this further aspect may include any or all of the features described in relation to the product stick carrier in the other aspects of the invention, to the extent they are not mutually exclusive.

In another aspect, which the Applicant expressly reserves the right to claim independently, there is provided a dispenser formed of card-based or paper-based material for a product in stick form, the dispenser comprising: a dispenser axis extending along a length of the dispenser; a proximal end; a distal end; a product stick carrier in the form of a cylindrical tube for supporting a product stick in use; an outer sleeve in the form of a cylindrical tube disposed radially outwardly of the product stick carrier, wherein the product stick carrier is fixed relative to the outer sleeve; a product concealing sleeve in the form of a cylindrical tube disposed radially inwardly of the outer sleeve and radially outwardly of the product stick carrier, the product concealing sleeve being retractable from a first, fully extended axial position relative to the outer sleeve and product stick carrier for concealing a product stick supported by the product stick carrier in use in order to expose the product stick for use; and a locking arrangement, wherein the locking arrangement comprises: a first proximal facing edge; a second proximal facing edge; a first distal facing edge; and a second distal facing edge; wherein the first and second proximal facing edges and the first and second distal facing edges are disposed radially outwardly of the product stick carrier and radially inwardly of the product concealing sleeve; wherein the first proximal facing edge and the first distal facing edge are associated with the exterior of the product stick carrier; wherein the second proximal facing edge and the second distal facing edge are associated with the interior of the product concealing sleeve; wherein the first proximal facing edge and the second distal facing edge cooperate with one another to prevent advancement of the product concealing sleeve relative to the outer sleeve and product stick carrier beyond a set point so as to define the first, fully extended position of the product concealing sleeve, wherein a circumferential gap is defined adjacent an end of the first distal facing edge, such that in at least one rotational position of the product concealing sleeve relative to the product stick carrier, the second proximal facing edge is movable in a proximal direction axially past the first distal facing edge through the circumferential gap without engagement of the first distal facing edge with the second proximal facing edge to permit retraction of the product concealing sleeve from an extended, concealing position, and in at least one other rotational position of the product concealing sleeve relative to the product stick carrier, at least a portion of the first distal facing edge and at least a portion of the second proximal facing edge engage one another to prevent retraction of the product concealing sleeve from the extended, concealing position; wherein the product stick carrier comprises: a cylindrical wall having an inner surface and an outer surface; a carrier proximal end; a carrier distal end, from which the product stick extends in use; and a plurality of tabs extending inwardly toward the dispenser axis from the inner surface of the product stick carrier, wherein the plurality of tabs are configured to engage a product stick supported by the product stick carrier in use to assist in securing the product stick within the product stick carrier.

The present invention in this further aspect may include any or all of the features described in relation to the other aspects of the invention, to the extent they are not mutually exclusive.

In yet another aspect, there is provided a dispenser formed of card-based or paper-based material for a product in stick form, the dispenser comprising: a proximal end; a distal end; a product stick carrier in the form of a cylindrical tube for receiving a product stick in use; a sleeve in the form of a cylindrical tube, wherein the product stick carrier is located within the sleeve and wherein the product stick carrier and the sleeve are moveable axially relative to one another; wherein the product stick carrier comprises: a cylindrical wall having an inner surface and an outer surface; a carrier proximal end; a carrier distal end, from which the product stick extends in use; and a plurality of tabs extending inwardly toward the dispenser axis from the inner surface of the product stick carrier, wherein the plurality of tabs are configured to engage a product stick supported by the product stick carrier in use to assist in securing the product stick within the product stick carrier.

The engagement of the product stick with the plurality of tabs in this further aspect (and any of the other aspects or embodiments in which the product stick carrier includes inwardly extending tabs) corresponds to the tabs being embedded within the material of the product stick. The product stick may be inserted into the product stick carrier from the distal end thereof to engage with, and engulf the tabs. In these embodiments the product stick is of a material that is malleable to enable the tabs to become embedded therein on insertion of the product stick. The product stick may be of a solid or semi-solid material.

The present invention in this further aspect may include any or all of the features described in relation to the other aspects of the invention, to the extent they are not mutually exclusive.

The sleeve within which the product stick carrier is located, and relative to which the product stick carrier is moveable axially, may be of various forms, depending upon the type of the dispenser. The product stick carrier is located radially within the tube. The dispenser may further comprise one or more additional sleeves, and/or other components, for example to support operation of the dispenser according to its particular mode of operation, or for other purposes, such as to impart a desired appearance.

For example, the dispenser may further comprise an outer sleeve fixed relative to the product stick carrier, wherein the sleeve is a product concealing sleeve located between the product stick carrier and the outer sleeve, wherein the product concealing sleeve is retractable to reveal the product stick for use. This type of dispenser may be referred to as a "reveal type" dispenser, one example of which being the dispenser in earlier aspects herein.

In other words, a "reveal type" dispenser is a dispenser configured to hold a product, for example a product in stick form, wherein, in a first condition, the product is (at least partially) concealed, and, by a transition into a second condition, for example by moving a product concealing sleeve, the product is (at least partially) revealed. The dispenser may be moved between the first and second conditions repeatedly.

In other dispensers, the sleeve may be an outer sleeve. The dispenser may further comprise a mechanism for extending the product stick carrier axially relative to the outer sleeve. This may be referred to as an "extending and retracting type" dispenser. For example, the mechanism may cause the product stick carrier to advance axially relative to the outer sleeve when twisted relative to a base of the dispenser. The mechanism is also made of card-based or paper-based material. The mechanism may include a lug and slot type arrangement, and may involve an additional tube located between the outer sleeve and product stick carrier. Examples of "extending and retracting type" dispensers are disclosed in WO2020/254803, WO 2021/084284 and in WO 2021/084281. These documents provide particular examples of such an extending and retracting type dispenser. Other alternative mechanisms not disclosed therein may of course be used.

In other words, an "extending and retracting type" dispenser is a dispenser configured to hold a product, for example a product in stick form, wherein in a retracted condition the product is not available for use, and in an extended condition, the product is available for use, wherein a transition between the retracted condition and the extended condition is made by advancing the product from the dispenser, and a transition between the extended condition and the retracted condition is made by retracting the product back into the dispenser, said advancing and retracting being performed by any mechanism.

Additionally, in other arrangements, the product stick support may be used in dispensers that are neither reveal-type, nor protracting and retracting-type dispensers.

All the components of the dispenser and of the product stick carrier in any of these further aspects and embodiments including tabs associated with the product stick carrier are made of card-based or paper-based material, such as cardboard or paperboard, unless explicitly indicated otherwise. The product stick is fixed relative to the product stick carrier. The tabs assist in securing the product stick in such a fixed relationship.

The following features may be applied to any of the above aspects or embodiments in which a product stick carrier includes a plurality of tabs extending inwardly from the inner surface thereof (whether or not the product stick carrier forms part of a dispenser).

The tabs may be identical to one another.

The product stick, when received in the product stick carrier extends beyond the distal end of the product stick carrier. The product stick may extend various depths within the product stick carrier, at least far enough into the distal portion to engage the tabs.

Each of the plurality of tabs may be attached to the inner surface of the product stick carrier along a respective axially extending fold line.

Each of the plurality of tabs may be defined by a respective cut-out from the cylindrical product stick carrier tube, wherein a vent through the cylindrical wall of the product stick carrier tube is provided by the space left by the cut-out.

Each of the plurality of tabs may be trapezoidal in shape having a long base formed by the axially extending fold line. The axially extending fold line extends along the length of the product stick carrier tube.

A trapezoidal shape has a long base and a short base, opposing and parallel to one another, with the long base longer than the short base. The trapezoidal shape also has a pair of opposed sides, connecting the ends of the long and short bases to one another, said pair of sides being non-parallel.

As will be appreciated, the trapezoidal shape may be slightly curved as being cut from a cylindrical tube. The references herein to particular characteristics of the trapezoidal shape are considering the trapezoidal shape when flattened. Typically, the long base and short base will be straight, and the pair of opposed sides will be curved, following the previous contour provided by the cylindrical tube.

The trapezoidal shape may be a right-trapezoidal shape, wherein one of the sides is at a right angle (i.e.,) 90° to each of the long and short bases. Said side may be called a right-side.

The distal-most side edge is the angled or sloped edge, so the product stick encounters the angled edge first upon insertion through the distal end of the product stick carrier, which ensures that the force from the insertion of the product stick is spread locally to reduce the likelihood of distortion of the tab. The angle of the sloping side edge can be selected to maximise this effect.

The plurality of tabs may comprise three tabs.

In some advantageous embodiments the plurality of tabs may consist of three, four, or five tabs. This may provide a particularly suitable balance between ease of manufacture and a level of venting and support to the product stick. However, it is envisaged that in other arrangements the plurality of tabs may comprise more than five tabs, or may consist of two tabs.

However many tabs are provided, the tabs may be equally spaced around a circumference of the product stick carrier. This may help to provide most effective support to the product stick for the given number of tabs present, and help to provide a more uniform venting effect.

Each of the plurality of tabs may be located toward the distal end of the product stick carrier.

The product stick carrier may include a product stick support disc within the product stick carrier and located proximal to the tabs, wherein the product stick support disc is free from openings extending therethrough.

The product stick may be received on the product support disc. Provided the product support disc is proximal to the tabs and distal to the proximal end of the product stick carrier, the product support disc may be located at any axial position along the product stick carrier, dependent on design requirements. The product stick is held in a fixed position relative to the product stick carrier in use. The amount of product stick which extends beyond the distal end of the product stick carrier will typically be a balance between avoiding wastage of the product stick (since the product stick proximal to the distal end of the product stick carrier may not be accessible to a user) and providing secure anchoring of the product stick within the product stick carrier.

Each of the tabs may include a distal edge, wherein the distal edge extends at an angle to the radial direction (or direction perpendicular to the wall of the cylindrical tube), wherein the first angle is an acute angle. The acute angle may be from 10° to 60°, or more narrowly, from 15° to 45°, or about 30°. However, these ranges are merely exemplary. Said radial direction is defined relative to the axis of the product stick carrier (which is equivalent to the axis of the mandrel in the later embodiments). Where the distal end edge is curved, due to the contour of the cylindrical wall from which the tabs are cut, the angle may be measured at the point where the distal edge is attached to the wall.

Each of the one or more tabs may have an axial length of between 10% and 20% of the axial length of the product stick carrier, optionally about 15% of the axial length of the product stick carrier. However, these ranges are merely exemplary.

In another aspect, which the Applicant expressly reserves the right to claim independently, there is provided a method of forming the product stick carrier including tabs of any of the above aspects or embodiments of the invention.

In another aspect, there is provided a method of forming the product stick carrier of the dispenser of any of the above aspects or embodiments including tabs, comprising: locating a precursor cylindrical tube of card-based or paper-based material around a mandrel, wherein the mandrel includes a plurality of recesses in the outer surface thereof, the recesses being spaced from one another around the circumference of the mandrel; and simultaneously driving each of a plurality of cutting pieces inwardly toward the mandrel such that each cutting piece cuts a respective one of the tabs in the wall of the cylindrical tube and folds the resulting tab inwardly to extend from the inner surface of the cylindrical tube as the cutting piece engages the wall of the cylindrical tube and moves into a respective one of the recesses in the outer surface of the mandrel.

That is, there is provided a method of forming the product stick carrier of a dispenser of card-based or paper-based material for a product in stick form, the dispenser comprising: a proximal end; a distal end; the product stick carrier and a sleeve in the form of a cylindrical tube, wherein the product stick carrier is located within the sleeve and wherein the product stick carrier and the sleeve are moveable axially relative to one another; wherein the product stick carrier is in the form of a cylindrical tube for receiving the product stick in use; wherein the product stick carrier comprises: a cylindrical wall having an inner surface and an outer surface; a carrier proximal end; a carrier distal end, from which the product stick extends in use; and a plurality of tabs extending inwardly from the inner surface of the product stick carrier, wherein the tabs are configured to engage a product stick supported by the product stick carrier in use to assist in securing the product stick within the product stick carrier; wherein the method comprises: locating a precursor cylindrical tube of card-based or paper-based material around a mandrel, wherein the mandrel includes a plurality of recesses in the outer surface thereof, the recesses being spaced from one another around the circumference of the mandrel; and simultaneously driving each of a plurality of cutting pieces inwardly toward the mandrel such that each cutting piece cuts a respective one of the tabs in the wall of the cylindrical tube and folds the resulting tab inwardly to extend from the inner surface of the cylindrical tube as the cutting piece engages the wall of the cylindrical tube and moves into a respective one of the recesses in the outer surface of the mandrel.

The method of any of the above aspects or embodiments may include the further following features:

The method may include: locating the mandrel in a mandrel housing; and locating each of the plurality of cutting pieces within the mandrel housing prior to simultaneously driving the cutting pieces inwardly toward the mandrel. The mandrel may extend through a central opening in the mandrel housing.

The method may include: providing each of the cutting pieces with a cutting block having an outwardly facing sloping surface at a radially outward-most part, wherein the cutting piece is attached to a radially inward-most part of the cutting block; providing a punch block which is movable axially along the mandrel axis relative to the cutting blocks and includes a plurality of inwardly facing sloping surfaces corresponding to respective ones of each of the outwardly facing sloping surfaces of the cutting blocks; and mating the mandrel housing with the punch block, such that the punch block receives at least a portion of the mandrel housing in a space provided between the inwardly facing sloping surfaces of the punch block, wherein each of the corresponding inwardly facing surfaces of the punch block engages a respective one of the outwardly facing surfaces of the cutting blocks to simultaneously drive the cutting pieces inwardly toward the mandrel as a result of relative axial movement of the punch block relative to the cutting blocks and mandrel housing.

Typically, the mandrel housing and cutting blocks are held static and the punch block is moved onto the mandrel housing.

The outwardly facing sloping surfaces (of the cutting pieces) are sloped at a first acute angle to the mandrel axis, and the inwardly facing sloping surfaces are sloped at a second acute angle to the mandrel axis, wherein the first and second acute angles may be equal and opposite, such that once the punch block and cutting pieces are mated together (optionally with the cutting blocks supported by the mandrel housing), the outwardly facing sloping surfaces and inwardly facing sloping surfaces are parallel to one another. In the arrangement where the punch block is located directly above the mandrel housing, the outwardly facing sloping surfaces are sloped such that the 'top' of those surfaces are radially further inwards than the 'bottom' of those surfaces, and the inwardly facing sloping surfaces are sloped such that the 'bottom' of those surfaces are radially further outwards than the 'top' of those surfaces.

The cutting blocks are able to move toward and away from the mandrel and prevented from moving axially with respect to the mandrel axis, or from rotating around the mandrel axis.

The mandrel housing may include a first piece and a second piece, wherein locating the cutting pieces within the mandrel housing includes fitting the cutting blocks attached to each of the cutting pieces within respective tracks in the first piece of the mandrel housing such that the cutting blocks may move inwardly and outwardly (along a generally radial direction) with respect to the mandrel axis along the tracks when the first and second piece are assembled. The tracks may inhibit axial or circumferential movement of the cutting blocks relative to the mandrel axis.

The tracks may be provided by recesses or cut-outs in the housing, and enable the cutting blocks to be reliably orientated in the same position ready for cutting the tabs. This also enables the cutting blocks to be swapped out, for example in the case of breakage, or if a different geometry of tab is desired, in which case a different cutting piece could be used.

Aligning the tracks at the angle of the cutting block movements is envisaged for this method, and for the apparatus used for performing this method.

Of course, other techniques may be used to accomplish the simultaneous driving of the cutting pieces inwardly to cut and fold the tabs.

Rather than cutting pieces performing the cutting steps, the cutting may be performed by laser cutting, with plungers being used instead of cutting pieces to fold the tabs into the product stick carrier, but wherein the plunger does not cut the tabs.

That is, in another aspect, there is provided a method of forming the product stick carrier of the dispenser of any of the above aspects or embodiments including tabs, comprising: locating a precursor cylindrical tube of card-based or paper-based material around a mandrel, wherein the mandrel includes a plurality of recesses in the outer surface thereof, the recesses being spaced from one another around the circumference of the mandrel; creating cut lines in a wall of the precursor cylindrical tube, optionally by laser cutting, wherein the cut lines define tabs in the precursor tube; and simultaneously driving each of a plurality of plunger pieces inwardly toward the mandrel such that each plunger piece folds a respective one of the tabs inwardly to extend from the inner surface of the cylindrical tube as the plunger piece engages the wall of the cylindrical tube and moves into a respective one of the recesses in the outer surface of the mandrel.

The step of creating cut lines in the wall of the precursor cylindrical tube may be performed before the step of simultaneously driving the plunger pieces (for example where laser cutting is used), or, alternatively, may be performed by the plunger pieces, having at least one cutting edge thereon, concurrently with the simultaneous driving of the plunger pieces.

The method may include a step of forming a score-line along the edge of each tab, said score line becoming a respective fold line after the tab is folded.

In another aspect, which the Applicant expressly reserves the right to claim independently, there is provided a method of forming the product stick carrier including tabs of any of the above aspects or embodiments of the invention comprising: locating a precursor cylindrical tube of card-based or paper-based material around a generally cylindrical mandrel in a mandrel housing, wherein the mandrel includes recesses (radially) inward of where the tabs of the product stick carrier are to be formed; locating cutting blocks, each having a tapered outward facing surface, adjacent the precursor cylindrical tube adjacent the recesses of the mandrel in a position such that the cutting blocks are able to move toward and away from the mandrel and prevented from moving axially or circumferentially with respect to the mandrel axis; mating the mandrel housing together with the cutting blocks with a punch block, and thereby, by the action of the tapered outward facing surface against complementary surfaces of the punch block, driving the cutting blocks (radially) inward, wherein the (radially) inward movement of the cutting blocks causes a cutting piece attached to a (radially) inward-most part of the cutting blocks into the precursor cylindrical tube to thereby cut and fold tabs into the precursor cylindrical tube to form the product stick carrier; and extracting the product stick carrier.

The method in this aspect may include any or all of the features disclosed in respect of the other aspects of the invention to the extent they are not mutually exclusive.

The method of any of the aspects or embodiments in which cutting blocks are driven toward a mandrel to create the tabs in the product stick carrier may include driving the cutting pieces inwards at an acute angle to the radial direction, as defined by the mandrel, to cut and fold the tabs in a manner such that each of the tabs rotates through more than 90° about a foldline connecting the tab to the inner surface of the tube.

The method of any of the aspects or embodiments in which cutting blocks are driven toward the mandrel to create the tabs in the product stick carrier may include folding the tabs to rotate through more than 90° about a foldline connecting the tab to the inner surface of the tube.

This folding through more than of 90° may be achieved by driving the cutting pieces inwards at an acute angle to the radial direction, as defined by the mandrel.

The radial direction defined by the mandrel is a direction perpendicular to the axis of the mandrel, thereby being collinear with a radius thereof.

The acute angle is a non-zero angle that may be between 0° and 45°, or, in some examples may between 10° and 40°, or between 20° and 35°, or about 30°.

These methods may further include allowing the tabs to return to as close to precisely radially as possible extending position by the resilience of the paperboard or cardboard material. In practice, how close to precisely radial the tabs return depends on a variety of factors, including the degree of resilience of the material. The angle chosen is tailored with the aim of the tabs extending as close to precisely radially as possible.

Alternative methods to cut and fold the tabs beyond 90° about a foldline connecting the tab to the inner surface of the tube may be used.

A method for forming a dispenser may include any of the methods herein for forming a product stick carrier as well as removing the product stick carrier from the mandrel; and assembling the product stick carrier with the sleeve of the dispenser. Any other components of the dispenser may also be assembled in this method. Thus the method may comprise removing the product stick carrier from the mandrel; and assembling the product stick carrier with any further components of the dispenser, including the sleeve of the dispenser This method may further include inserting the product stick into the product stick carrier so the tabs engage the product stick. The tabs extend into the material of the product stick to grip the product stick.

From yet another aspect, there is provided an apparatus for performing the method of any of the above, the apparatus comprising: a punch block; a mandrel configured to receive the precursor cylindrical tube of card-based or paper-based material for forming the product stick carrier, wherein the mandrel has recesses in the outer surface thereof, the recesses being spaced from one another around the circumference of the mandrel; and a plurality of cutting blocks arranged around the mandrel and able to slide radially with respect to the mandrel backwards and forwards, wherein each of the cutting blocks includes: a sloping radially outward facing surface at a radially outward-most part thereof; and a cutting piece at a radially inward-most part thereof, wherein the punch block includes sloping surfaces on a radially inward facing surface thereof, each sloping surface being complementary to a respective one of the sloping radially outward facing surfaces of the cutting blocks, wherein the punch block is movable axially relative to the cutting blocks to cause the sloping surfaces of the punch block to simultaneously engage the respective ones of the sloping radially outward facing surfaces of the cutting blocks and thereby drive the cutting pieces (radially) inwardly as the punch block continues to move axially relative to the cutting blocks such that each cutting piece will engage the wall of a precursor cylindrical tube held on the mandrel and move into a respective one of the recesses in the outer surface of the mandrel to thereby cut a respective one of the tabs in the wall of the cylindrical tube and fold the resulting tab (radially) inwardly to extend from the inner surface of the tube in use.

That is, there is provided an apparatus for forming the product stick carrier of the dispenser of any of the above aspects or embodiments including tabs, wherein forming the product stick carrier comprises: locating a precursor cylindrical tube of card-based or paper-based material around a mandrel, wherein the mandrel includes a plurality of recesses in the outer surface thereof, the recesses being spaced from one another around the circumference of the mandrel; and simultaneously driving each of a plurality of cutting pieces inwardly toward the mandrel such that each cutting piece cuts a respective one of the tabs in the wall of the cylindrical tube and folds the resulting tab inwardly to extend from the inner surface of the cylindrical tube as the cutting piece engages the wall of the cylindrical tube and moves into a respective one of the recesses in the outer surface of the mandrel, wherein the apparatus comprises: a punch block; a mandrel configured to receive the precursor cylindrical tube for forming the product stick carrier, wherein the mandrel has recesses in the outer surface thereof, the recesses being spaced from one another around the circumference of the mandrel; and a plurality of cutting blocks arranged around the mandrel and able to slide (radially) inwardly and outwardly with respect to the mandrel backwards and forwards, wherein each of the cutting blocks includes: a sloping radially outward facing surface at a radially outward-most part thereof; and a cutting piece at a radially inward-most part thereof, wherein the punch block includes sloping surfaces on a radially inward facing surface thereof, each sloping surface being complementary to a respective one of the sloping radially outward facing surfaces of the cutting blocks, wherein the punch block is movable axially as defined by the mandrel axis, relative to the cutting blocks to cause the sloping surfaces of the punch block to simultaneously engage the respective ones of the sloping radially outward facing surfaces of the cutting blocks and thereby drive the cutting pieces (radially) inwardly as the punch block continues to move axially relative to the cutting blocks such that each cutting piece will engage the wall of a precursor cylindrical tube held on the mandrel and move into a respective one of the recesses in the outer surface of the mandrel to thereby cut a respective one of the tabs in the wall of the cylindrical tube and fold the resulting tab (radially) inwardly to extend from the inner surface of the tube in use.

In other words, there is provided an apparatus for forming a product stick carrier of a dispenser of card-based or paper-based material for a product in stick form, the dispenser comprising: a proximal end; a distal end; the product stick carrier and a sleeve in the form of a cylindrical tube, wherein the product stick carrier is located within the sleeve and wherein the product stick carrier and the sleeve are moveable axially relative to one another; wherein the product stick carrier is in the form of a cylindrical tube for receiving the product stick in use; wherein the product stick carrier comprises: a cylindrical wall having an inner surface and an outer surface; a carrier proximal end; a carrier distal end, from which the product stick extends in use; and a plurality of tabs extending inwardly from the inner surface of the product stick carrier, wherein the tabs are configured to engage a product stick supported by the product stick carrier in use to assist in securing the product stick within the product stick carrier, wherein forming the product stick carrier comprises: locating a precursor cylindrical tube of card-based or paper-based material around a mandrel, wherein the mandrel includes a plurality of recesses in the outer surface thereof, the recesses being spaced from one another around the circumference of the mandrel; and simultaneously driving each of a plurality of cutting pieces inwardly toward the mandrel such that each cutting piece cuts a respective one of the tabs in the wall of the cylindrical tube and folds the resulting tab inwardly to extend from the inner surface of the cylindrical tube as the cutting piece engages the wall of the cylindrical tube and moves into a respective one of the recesses in the outer surface of the mandrel, wherein the apparatus comprises: a punch block; a mandrel configured to receive the precursor cylindrical tube for forming the product stick carrier, wherein the mandrel has recesses in the outer surface thereof, the recesses being spaced from one another around the circumference of the mandrel; and a plurality of cutting blocks arranged around the mandrel and able to slide (radially) inwardly and outwardly with respect to the mandrel backwards and forwards, wherein each of the cutting blocks includes: a sloping radially outward facing surface at a radially outward-most part thereof; and a cutting piece at a radially inward-most part thereof, wherein the punch block includes sloping surfaces on a radially inward facing surface thereof complementary to respective sloping radially outward facing surfaces of the cutting blocks, wherein the punch block is movable axially relative to the cutting blocks to cause the sloping surfaces of the punch block to simultaneously engage respective ones of the sloping radially outward facing surfaces of the cutting blocks and thereby drive the cutting pieces radially inwardly as the punch block continues to move axially relative to the cutting blocks such that each cutting piece will engage the wall of a precursor cylindrical tube held on the mandrel and move into a respective one of the recesses in the outer surface of the mandrel to thereby cut a respective one of the tabs in the wall of the cylindrical tube and fold the resulting tab radially inwardly to extend from the inner surface of the tube in use.

The apparatus of any of these further aspects or embodiments of the invention may be configured to perform the method of any of the embodiments or aspects previously described in which tabs are provided in a product stick carrier, and may therefore include any of the features described previously in relation to the apparatus used in the method, and conversely, the method of any of those aspects or embodiments may use an apparatus having any of the features described in relation to the apparatus aspects of the invention. The apparatus and method may be used to provide a dispenser or product stick in accordance with any of the aspects or embodiments described including tabs.

In the apparatus of any of these further aspects and embodiments of the invention, as the punch block moves axially relative to the cutting blocks, the sloping surfaces of the punch block travel over the sloping surfaces of the cutting blocks, and thereby drive the cutting blocks inwards to cut the product stick carrier.

Each cutting piece is configured to simultaneously cut and fold a respective tab in the product stick carrier.

The cutting pieces may have a trapezoidal shape when viewed in the radial direction, as defined by the mandrel axis.

Additionally, and/or alternatively, the cutting pieces may have a trapezoidal shape when viewed in the axial direction, as defined by the mandrel axis.

The recesses in the mandrel may extend axially along the full length of the mandrel, or may only extend axially along part of the length of the mandrel, long enough to house the tabs to be cut.

The apparatus may include a mandrel housing for housing the mandrel and the cutting blocks. The mandrel housing may include any of the features previously described in respect of the method.

The mandrel housing may include tracks for receiving the cutting blocks such that the cutting blocks may move inwardly toward the mandrel (optionally radially). These tracks may correspond to recesses, or cut-outs in part of the mandrel housing shaped to fit legs of the cutting blocks and to enable the cutting blocks to slide radially, or close to radially, inwardly and outwardly.

Each of the plurality of cutting blocks may be substantially L-shaped and may include a stop surface facing inwardly toward the mandrel and configured to abut a complementary stop surface to limit a maximum inward stroke of the cutting pieces.

The complementary stop surface may be provided by an outer surface of the mandrel housing (when present).

The punch block may include punch block lugs extending axially, defined by a mandrel axis when the mandrel housing is within the punch block, from a platform of the punch block to slidably receive the mandrel housing, wherein the punch block lugs provide the radially inward facing surfaces and define a space for receiving the at least a portion of the mandrel housing between the radially inward facing surfaces.

The space between the radially inward facing surfaces may be sized and shaped to fit the mandrel housing when present and to thereby either enable at least a portion of the mandrel housing to sit within the punch block, or allow the punch block to be placed over and around the mandrel housing to engage therewith.

The cutting piece may be made of metal.

The radially inward facing surfaces of the punch block may each parallel to the respective radially outward facing surfaces of the cutting blocks. This enables better engagement of the sloping surfaces, for more efficient driving of the cutting blocks The mandrel housing may comprise: a first piece; a second piece; and fastening means to secure the second piece to the first piece.

The fastening means may include toggle latches.

As used above in relation to the methods and apparatus of those aspects or embodiments for forming a product stick carrier having tabs in which a precursor tube for the product stick carrier is supported on a mandrel, the terms radially, axially, circumferentially, etc. are with reference to a mandrel axis, which extends longitudinally along the mandrel. This will be equivalent to the product stick support axis. Moreover, these terms are understood as meaning generally radial, axial or circumferential, rather than precisely radial, axial or circumferential, and include slight variations.

In accordance with the invention in any of its aspects or embodiments, the product stick may be a stick of any product that may be provided in stick form. The product stick is a stick of solid material. The product stick may be provided either as a solid product stick to be inserted into the dispenser, or, in some embodiments, such as when the product stick support is in the form of the cup, the product stick may be introduced to the dispenser as a liquid then allowed to solidify in a hot liquid fill process. The product may be any consumer product. The product may be a personal care product, such as a cosmetic product, skin care product, hair care product, or toothcare product, but is not limited thereto. A personal care product includes any product used in grooming or dressing, as well as products used at other times, and may include products for providing a medicinal benefit. The product is not limited to personal care product, and may be any type of consumer product that is provided in stick form, such as a stick of adhesive, or paint. The product stick may be selected from any one of a stick of cosmetic, lipstick, lip balm, body balm, sunscreen, deodorant, adhesive product or of any product for topical application to a surface, for example to a person's skin or lips.

As used herein, radially may mean along a radial direction defined with respect to an axis of the product stick carrier, or with respect to an axis of the mandrel, and can be defined as being perpendicular to a wall of the cylindrical tube of the product stick carrier.

BRIEF DESCRIPTION OF THE DRAWINGS

Some preferred embodiments of the invention will now be described by way of example only, with reference to the accompanying drawings in which.

Like elements share the same reference numerals in each figure.

DETAILED DESCRIPTION

Figure 1:
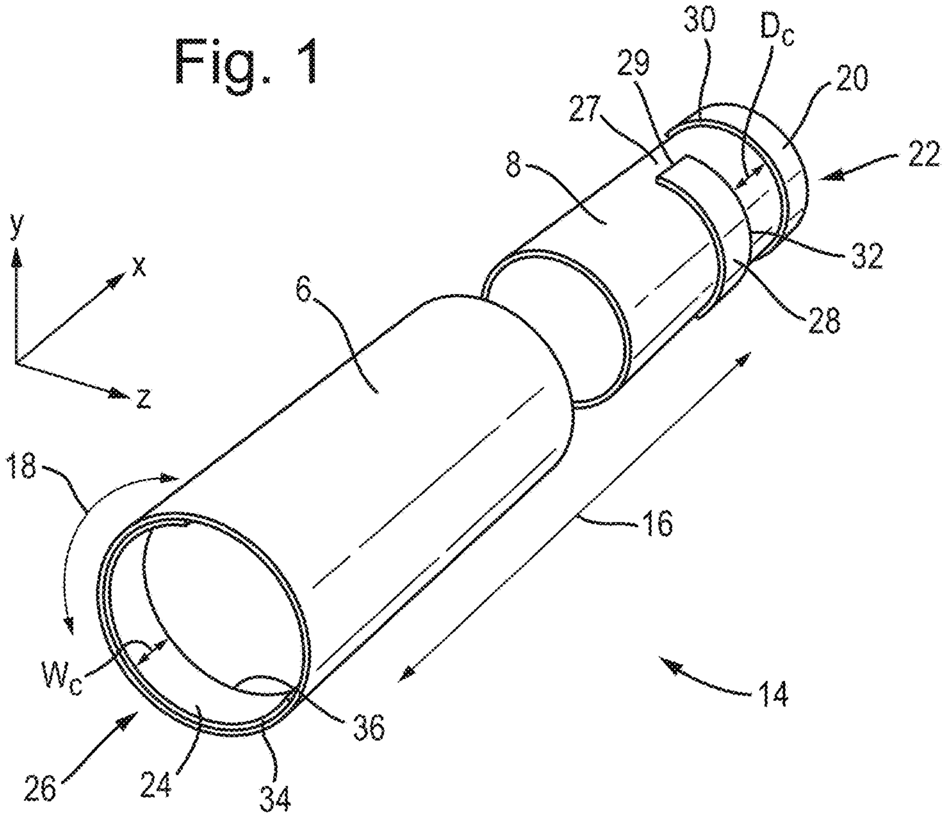
FIG. 1 is a schematic view of the primary operational parts of a dispenser in accordance with an embodiment of the dispenser (the C-type)

The present invention relates to dispenser for products in stick form of the type in which a product concealing sleeve is retracted from an extended position in order to expose a product stick for application. This is in contrast to a dispenser in which a product stick is advanced relative to a base of the dispenser in order to expose product.

References are made herein to the proximal and distal end of the dispenser and its components i.e. outer tube, product stick carrier tube and product concealing tube. The distal end of the dispenser (or a component thereof) refers to the end closest to that from which product is dispensed in use i.e. at which the product stick is disposed. Thus the distal end refers to the dispensing end of the dispenser. The proximal end refers to the opposite end of the dispenser to that from which product is dispensed in use. This may be referred to as an operator end, being the end which is grasped by the user to hold the dispenser in use. The distal end and proximal ends of the dispenser (or a component thereof) respectively may correspond to the ends which will typically be lowermost and uppermost in use. Product is then dispensed from the upper end of the dispenser. Thus, the proximal and distal ends of the dispenser or a component (tube/sleeve) thereof may be interchangeably referred to as the lower and upper ends thereof. It will be appreciated that this does not confer any limitation on the orientation of the dispenser in use, but may facilitate identification of the ends of the dispenser. The proximal and distal ends of a component may also be referred to as the first and second ends thereof.

To facilitate understanding of the invention, the general construction and operation of the dispenser will first be described by reference to FIGS. 11-13. The dispenser of any of the embodiments of the invention may be of this construction, with the various embodiments described by reference to FIGS. 1-10 differing in relation to the construction of the internal mechanism used to control movement of the product concealing sleeve.

The dispenser 2 comprises an outer sleeve 4, a product concealing sleeve 6, and a product stick carrier 8. The embodiment illustrated also includes a cap 10, although the cap 10 is optional. The outer sleeve 4, product concealing sleeve 6 and product stick carrier 8 are all cylindrical tubes. Each is circular in cross-section in the embodiment shown. The product stick carrier 8 and the outer sleeve 4 are fixed in relation to one another, while the product concealing sleeve 6 is movable relative to the product stick carrier 8 and outer sleeve 4 between extended and retracted positions (shown in FIGS. 12 and 11 respectively).

The outer sleeve 4, product concealing sleeve 6 and product stick carrier 8 may together be considered to provide a base part 11 of the dispenser 2, over which the removable cap 10 may be placed. The base part 11 and cap 10 are tubular in shape. Each is circular in cross-section in the embodiment shown.

Figure 11:
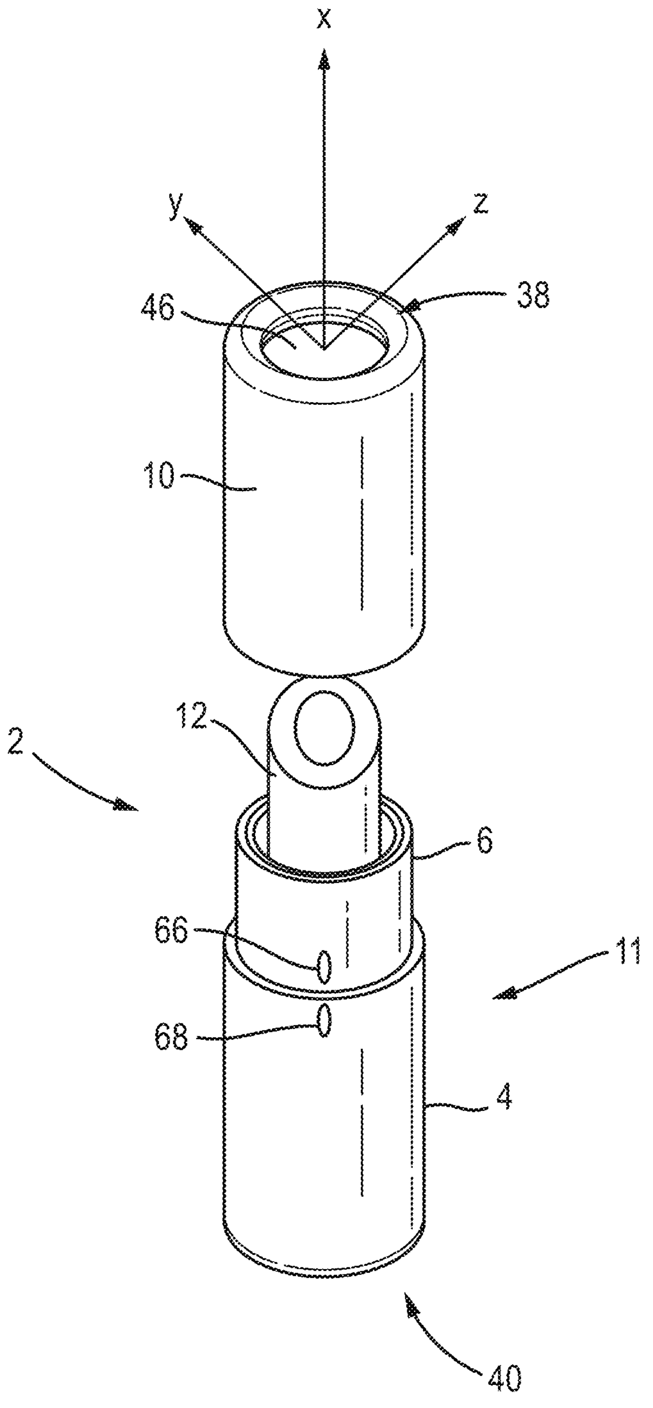
FIG. 11 is a schematic perspective view of a dispenser in accordance with the invention, with the product concealing sleeve in a retracted position.

FIG. 11 illustrates a finally assembled dispenser 2 having a product stick 12 in situ, and with the product concealing sleeve 6 in a retracted position relative to the product stick carrier 8 and outer sleeve 4 to expose the product stick 12. As will be appreciated, mechanisms of this dispenser 2 enabling locking of the product concealing sleeve 6 in the first fully extended position relative to the product stick carrier 8 are hidden in this illustration, as indeed is the product stick carrier 8. These features will be described in detail subsequently.

Figure 12:
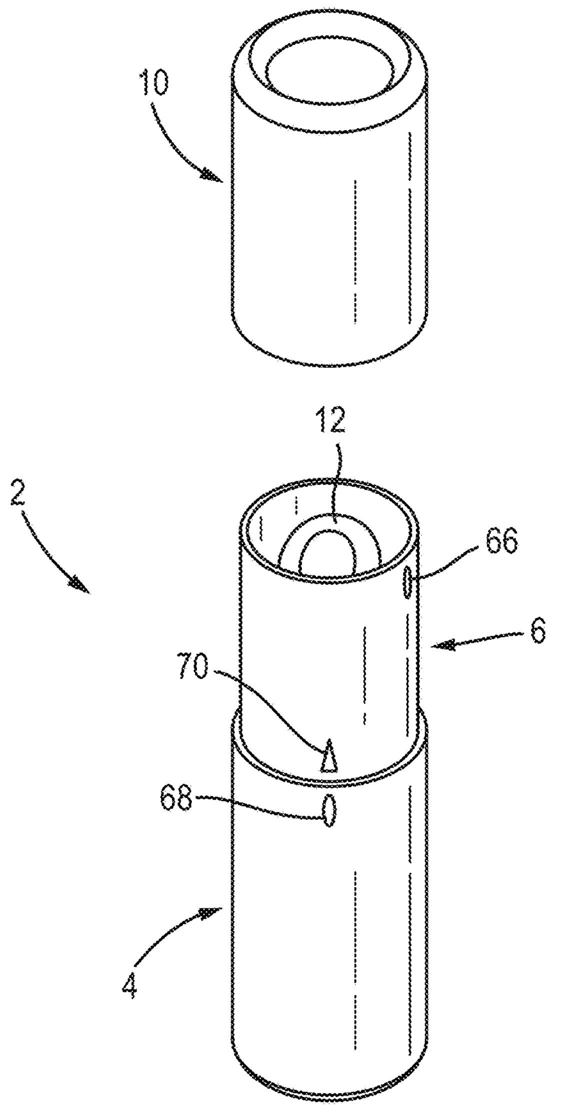
FIG. 12 is a schematic perspective view of the dispenser of FIG. 11, with the product concealing sleeve in an extended position.

FIG. 12 illustrates the dispenser 2 with the product concealing sleeve 6 in an extended position relative to the product stick carrier 6 and outer sleeve 4, in which the product stick 12 is exposed. The fully extended position is defined by interaction between edges associated with the interior of the product concealing sleeve 6 and the exterior of the product stick carrier 8 respectively, as described below.

Figure 13:
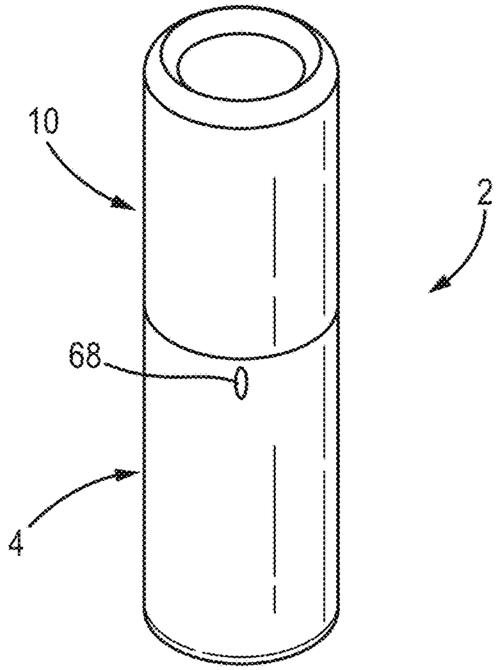
FIG. 13 is a schematic perspective view of the dispenser of FIG. 11, with the cap in position.

FIG. 13 illustrates the dispenser 2 with the cap 10 in place. The cap 10 may be located over the base part 11 of the dispenser 2 even when the product concealing sleeve 6 is in the fully extended position as shown in FIG. 12. When in position, a proximal edge of the cap 10 abuts the distal edge of the outer sleeve 4. It has been found that locating the cap 10 over the product concealing sleeve 6 may undesirably unintentionally tend to cause the product concealing sleeve 6 to move toward its retracted position. In order to prevent this occurring, the dispenser 2 includes a locking arrangement preventing retraction of the product concealing sleeve 6 relative to the outer sleeve 4 and product stick carrier 8 unless the product concealing sleeve 6 is in a particular rotational position or positions relative to the outer sleeve 4 and product stick carrier 8.

The cap 10 may be in the form of a cylindrical tube having one end closed by a top 46, such as a disc of cardboard or paperboard material. However it is formed, the cap 10 may be such that a lower, proximal end of the cap 10 abuts the distal edge of the outer sleeve 4 e.g. to provide a flush fit between the cap 10 and outer sleeve 4. The cap 10 is configured such that it will fit over the open end of the product concealing sleeve 6 and abut the distal end of the outer sleeve 4 with the product concealing sleeve 6 in either the lowered position of FIG. 11 or the raised position of FIG. 12.

An outer packaging (not shown) may be provided to house the dispenser 2. The outer packaging may be in the form of an outer carton made of cardboard or paperboard. Together, the outer packaging, dispenser 2 and product stick 12 then form a package.

The dispenser 2 defines an axial direction X which extends in the direction of a longitudinal axis of the dispenser 2 between a proximal end 40 of the dispenser 2 and a distal end 38 of the dispenser 2 (from which product stick 12 is dispensed in use). As mentioned above, the terms distal and proximal may, in some arrangements, correspond to upper and lower, or top and bottom, when the dispenser 2 is arranged in a vertical position, such that, when assembled, the cap 10 is vertically above the outer sleeve 4. Transverse directions Y, Z may be defined perpendicular to the axial direction X. Transverse may correspond to radial.

The product stick carrier 8 is bonded to the outer sleeve 4. The bonding may be by adhesion, or any other suitable technique, such as heat sealing. The bonding of the carrier 8 to the outer sleeve 4 does not inhibit the ability for the product concealing sleeve 6 to slide relative to the outer sleeve 4 and product stick carrier 8. For example, in the product stick carrier 8 may be in the form of a tube having a bottom end bonded to a base disc 42 closing a bottom end of the outer sleeve 8.

Figure 2:
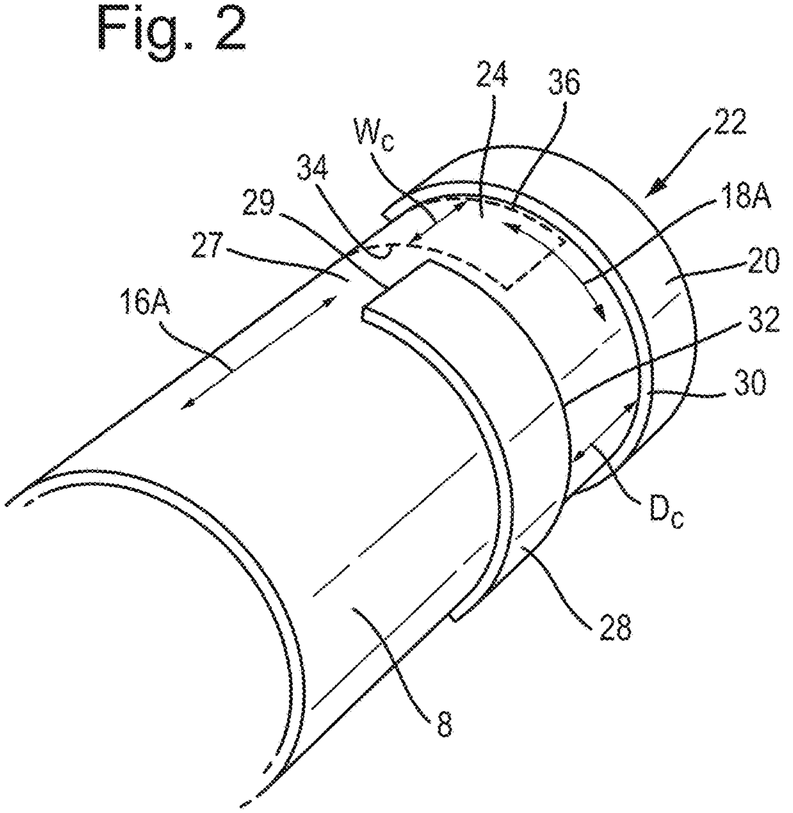
FIG. 2 is a close up view of part of the dispenser parts of FIG. 1.

FIGS. 1 and 2 illustrate the product concealing sleeve 6 and product stick carrier 8, and the components of a locking arrangement (for defining the fully extended position of the product concealing sleeve 6 relative to the product stick carrier 8, and selectively preventing retraction of the product concealing sleeve 6 relative to the product stick 8), of the dispenser 2 in accordance with a first embodiment of the invention. The other components e.g. outer sleeve, are not shown in FIGS. 1 and 2 for ease of reference. The mechanism illustrated is for an embodiment referred to as "the C-type" embodiment, but it will be appreciated, the relative movements of the components, and functionality of the mechanism, are similar for whichever embodiment is used. Other exemplary embodiments will be described below.

A product concealing sleeve 6 and a product stick carrier 8 are shown, each having the form of a cylindrical tube. The product concealing sleeve 6 is sized to fit round the product stick carrier 8 with space for collar pieces radially between the product concealing sleeve 6 and the product stick carrier 8. The collar pieces form part of the locking arrangement for controlling movement of the product concealing sleeve 6 relative to the product stick carrier 8 (and hence outer sleeve 4).

Axial movement of the product concealing sleeve 6 is illustrated by arrow 16 and rotational, or angular, movement by arrow 18.

A product stick carrier collar piece 20 is affixed to the product stick carrier 8 at a distal end 22 and on an exterior thereof. The illustrated product stick carrier collar piece 20 extends over at least a majority of the circumference of the product stick carrier 8

A product concealing sleeve collar piece 24 is affixed to the interior of the product concealing sleeve 6 at a proximal end 26 thereof.

A secondary product stick carrier collar piece 28 is affixed to the exterior of the product stick carrier 8. The secondary product stick carrier collar piece 28 is spaced axially from the product stick carrier collar piece 20, so as to be located proximally thereof. The secondary product stick carrier collar piece 28 is spaced axially from the product stick carrier collar piece 20 by a distance $D_C$ that is at least as great as an axial width $W_C$ of the product concealing sleeve collar piece 24. In this manner the product concealing sleeve collar piece 24 is able to fit between the product stick carrier collar piece 20 and the secondary product stick carrier collar piece 28, as shown in dotted lines in FIG. 2.

The product stick carrier collar piece 20 provides a first proximal facing edge 30.

The secondary product stick carrier collar piece 28 provides a first distal facing edge 32.

The concealing sleeve collar piece 24 provides a second proximal facing edge 34 and a second distal facing edge 36.

The first proximal facing edge 30 engages the second distal facing edge 36 when the product concealing sleeve 6 is moved axially relative to the product stick carrier 8 in a distal direction. In this way, the fully extended position of the product concealing sleeve 6 relative to the product stick carrier 8 is defined by the position in which the first proximal facing edge 30 and the second distal facing edge 36 engage one another. This prevents the product concealing sleeve 6 entirely extending beyond the distal end 22 of the product stick carrier and thus prevents the disattachment of the product concealing sleeve 6 from the dispenser 2 i.e. preventing the product concealing sleeve 6 from being fully removed from the space between the product stick carrier 8 and outer sleeve 4, The first distal facing edge 32 engages the second proximal facing edge 34 when the product concealing sleeve 6 is in some rotational positions relative to the product stick carrier 8 when the product concealing sleeve 6 is in, or in proximity to the first, fully extended, axial position defined by cooperation of the second distal facing edge 36 and the first proximal facing edge 30, such that the concealing sleeve collar piece 24 is axially between the product stick carrier collar piece 20 the secondary product stick carrier collar piece 20. The distance $D_C$ is at least as great as the axial width $W_C$ of the product concealing sleeve collar piece 24. This enables the first distal facing edge 32 and the second proximal facing edge 34 to selectively retain the product concealing sleeve 6 at, or in proximity to, the fully extended position. The distance $D_C$ may equal, or be slightly greater than the width $W_C$, provided that rotation of the product concealing sleeve 6 relative to the product stick carrier 8 is possible (to disengage the lock), while maintaining the product concealing sleeve 6 at, or close to the fully extended position. It will be appreciated that references to retaining the product concealing sleeve 6 at the fully extended position encompass retaining the product concealing sleeve 6 exactly or substantially at the first, fully extended position. A slight amount of axial play may exist between the product concealing sleeve and product stick carrier when the product concealing sleeve collar 24 is located between the product stick carrier collar piece 20 and the secondary product stick carrier collar piece 28. This may facilitate sliding the product concealing sleeve collar 24 into the gap between the product stick collars FIG. 2 illustrates the movement of the product concealing sleeve collar piece 24 (relative to the product stick carrier 8), which, because it is fixed to the product concealing sleeve 6, corresponds to the movement of the product concealing sleeve 6.

When located proximal to the secondary product stick carrier collar piece 28, the product concealing sleeve collar piece 24 may move axially along line 16A relative to the product stick carrier 8 (and may also move rotationally relative thereto). Then, once in the first fully extended position, the product concealing sleeve collar piece 24 may move circumferentially along line 18A. When located axially between the product stick carrier collar piece 20 and the secondary product stick carrier collar piece 28, the product concealing sleeve collar piece 24 may move relative to the product stick carrier 8 along line 18A, which corresponds to rotation of the product concealing sleeve 6 in the direction of line 18 in FIG. 1. Engagement of the edge 36 of the product concealing sleeve collar piece 24 (i.e., the second distal facing edge 36) with the edge 30 of the product stick carrier collar piece 20 (i.e., the first proximal facing edge 30) defines the fully extended position of the product concealing sleeve 6 relative to the product stick carrier 8. However, for a range of rotational positions of the product concealing sleeve collar piece 24 (and hence product concealing sleeve 6) relative to the product stick carrier 8, the opposite edge 34 of the product concealing sleeve collar piece 24 (i.e., the second proximal facing edge 34) will engage the edge 32 of the secondary product stick carrier collar piece 28 (i.e., the first distal facing edge 32) to prevent axial movement of the product concealing sleeve collar piece 24, and hence product concealing sleeve 6, out of the fully extended position toward a retracted position in the axial direction 16A.

In order to be able to retract the product concealing sleeve collar piece 24, and hence product concealing sleeve 6, it is necessary to first move the product concealing sleeve collar piece 24 out of a rotational position where it will engage with the secondary product stick carrier collar piece 28. More specifically, this is the position where the first distal facing edge 32 will engage the second proximal facing edge 34. This position as illustrated includes a range of rotational positions, that is, wherever there is circumferential overlap of the first distal facing edge 32 and the second proximal facing edge 34. When the product concealing sleeve 6 (and hence product concealing sleeve collar piece 24) is rotated relative to the product stick carrier 8 so that there is no circumferential overlap of the first distal facing edge 32 and the second proximal facing edge 34, the product concealing sleeve collar piece 24 (and the second proximal facing edge 34) is free to move axially past the secondary product stick carrier collar piece 28 and thereby allow the product concealing sleeve 6 to retract relative to the product stick carrier 8 in a proximal direction. There is at least one rotational position where there is no overlap of the first distal facing edge 32 and the second proximal facing edge 34. This engagement dependent on a rotational position can also be described as the first distal facing edge 32 and the second proximal facing edge 34 cooperating to selectively prevent or allow retraction of the product concealing sleeve 6 based on a rotational position of the product concealing sleeve 6 relative to the product stick carrier 8. In the illustrated embodiment, once the product concealing sleeve 6 has been rotated relative to the product stick carrier 8 to enable the product concealing sleeve collar piece 24 to move axially past the secondary product stick carrier collar 28, and hence retract the product concealing sleeve 6, the product concealing sleeve 6 is free to move both rotationally and axially with respect to the product stick carrier 8. Rotational and axial relative movement between the product stick carrier 8 and product concealing sleeve 6 is unconstrained in this region. However, other embodiments may be envisaged in which only axial relative movement is permitted and/or in which the path of the product concealing sleeve 6 relative to the product stick carrier 8 is in some way constrained.

As a result of the interactions of the edges 30, 32, 34, 36, the user is able to move the product concealing sleeve 6 to a fully extended position relative to the product stick carrier 8, and then rotate the product concealing sleeve 6 relative to the product stick carrier 8 (in either direction) in order to lock the product concealing sleeve 6 in the extended position, with the first distal facing edge 32 and the second proximal facing edge 34 circumferentially overlapping. The user may then rotate the product concealing sleeve 6, either in the opposite direction of rotation, or as a further rotation, to a location or range of locations where the first distal facing edge 32 and the second proximal facing edge 34 do not circumferentially overlap, thus allowing the user to retract the product concealing sleeve 6 axially and proximally to reveal the product stick 12.

As will be appreciated, the same edges engage each other in each embodiment (i.e., the first proximal facing edge engages the second distal facing edge and the second proximal facing edge engages the first distal facing edge), and the overall movement of the product concealing sleeve will be similar in each embodiment. The only difference in terms of overall movement is that, for the C-shape embodiment and the T-shape embodiment, the rotation to lock the product concealing sleeve can be in either (circumferential) direction, whereas the rotation to lock the product concealing tube in the Z-shape or L-shape embodiment is only in one direction.

Figure 3:
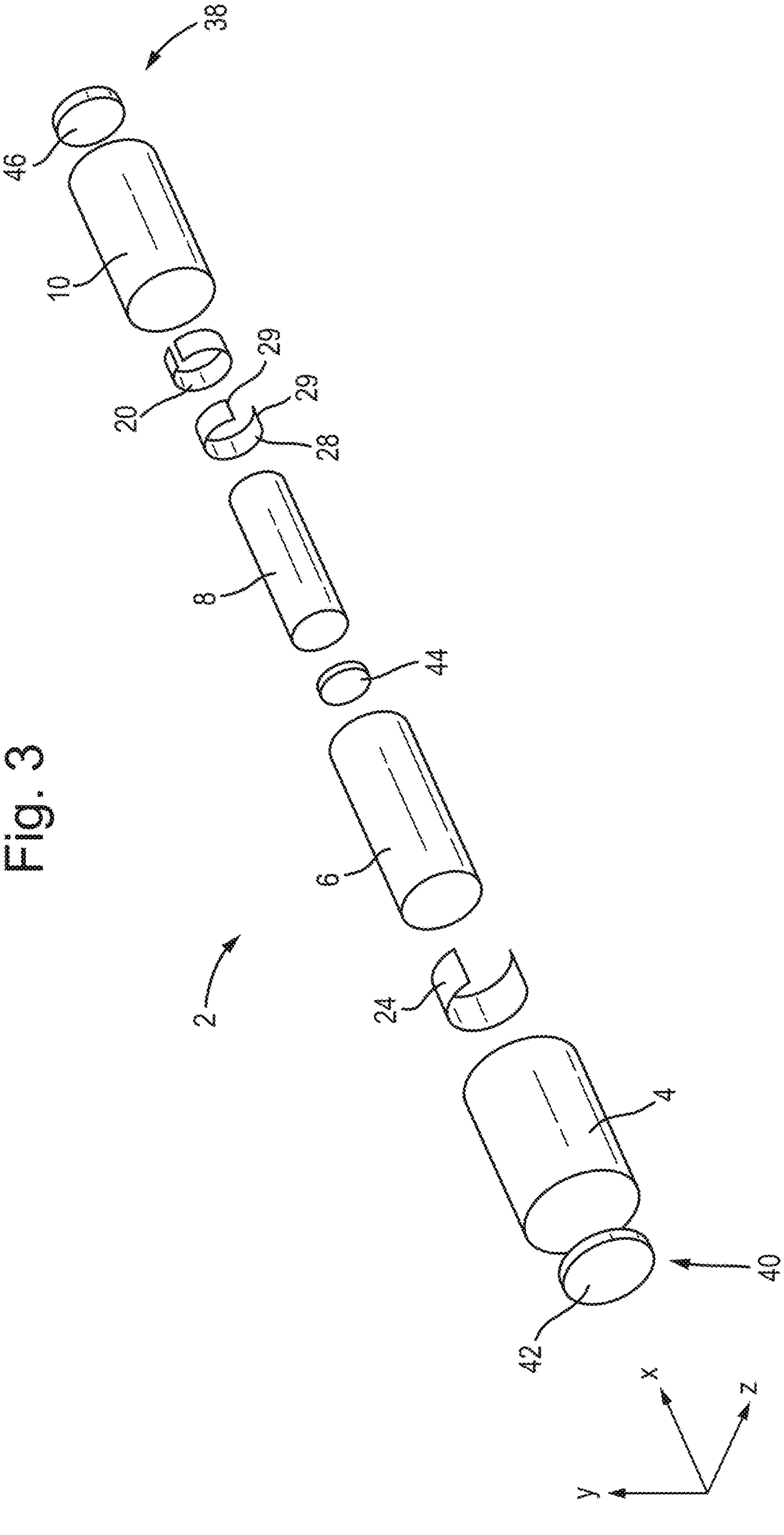
FIG. 3 is a schematic exploded view of a dispenser in accordance with one embodiment of dispenser (the C-type)

FIG. 3 illustrates an exploded view of the dispenser 2, in accordance with the C-type embodiment of FIGS. 1 and 2.

The dispenser 2 has a distal end 38 and a proximal end 40. The distal end 38 is the end from which the product stick 12 (not included in FIG. 3 for clarity) is dispensed.

Moving in a direction from the proximal end 40 to the distal end 38, the illustrated dispenser (in exploded view) includes a base 42, an outer sleeve 4, a product concealing sleeve collar piece 24, a product concealing sleeve 6, a product stick support 44, a product stick carrier 8, a secondary product stick carrier collar piece 28, a product stick carrier collar piece 20, a cap 10 and a top 46.

The pieces which are specific to this embodiment, to which corresponding features are included in the other embodiments, are the product concealing sleeve collar piece 24, the secondary product stick carrier collar piece 28 and the product stick carrier collar piece 20.

The outer sleeve 4 is in the form of a cylindrical tube and is sized to fit snugly, but so that movement is possible, around the product concealing sleeve 6. As described above with reference to FIG. 1, the product concealing sleeve 6 is located around the product stick carrier 8, with space for collar pieces to fit radially therebetween, while still permitting movement of the product concealing sleeve 6 relative to the product stick carrier 8. The outer sleeve 4 and the product stick carrier 8 are affixed to the base 42, and thereby movement between the outer sleeve 4 and the product stick carrier 8 is prevented. The base 42 is in the form of a flat disc.

The arrangement of the product concealing sleeve collar piece 24, the secondary product stick carrier collar piece 28 and the product stick carrier collar piece 20 is described above with regard to FIGS. 1 and 2.

The product stick support 44 is fixed in the interior of the product stick carrier 8 and may be positioned at any point along the length of the product stick carrier 8. When the product stick support 44 is closer to the distal end of the product stick carrier, less product is needed (since the amount of product stick projecting from the distal tip of the product stick carrier is maximised); however, when the product stick support 44 is closer to the proximal end of the product stick carrier 8, the extension of the product stick 12 into the product stick carrier 8 provides better support for the product stick. The product stick support 44 is shown as being in the form of a disc. The disc may be a disc of card-based or paper-based material, such as cardboard or paperboard. Of course, the product stick may be supported by the product stick carrier in other ways, not necessarily using a product stick support as shown. For example, the product stick may extend through an aperture of an apertured product stick support. Alternatively, an additional product stick support may not be required. A product stick might be secured to the product stick carrier tube using an interference fit, or a mechanical interlocking arrangement or using a magnetic coupling, for example, or may be bonded directly to the walls of the product stick carrier tube, thus omitting a product stick support. Other forms of attachment may alternatively or additionally be used e.g. including cooperating mechanical formations, a magnetic connection etc. The product stick may be bonded to the product stick carrier directly or indirectly (e.g. via a product stick support), using any suitable bonding agent e.g. adhesive, or wax, or a layer of the unset product itself.

Figure 14:
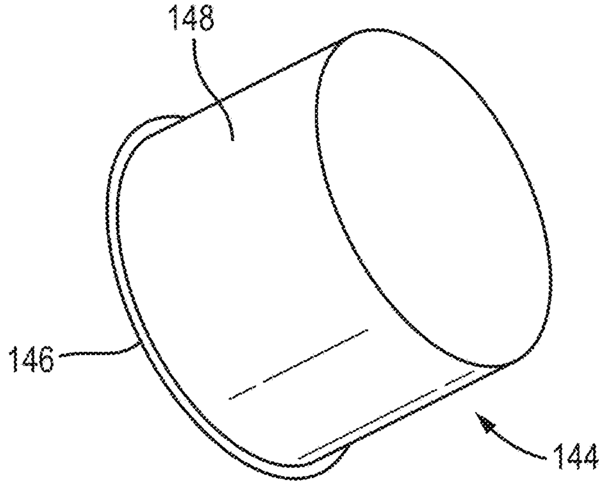
FIG. 14 is a schematic perspective view of an alternative example product stick support which may be used in the dispenser.

In an alternative embodiment, as illustrated in FIG. 14, the product stick support 144 is in the form of a cup. The product stick support 144, in the form of a cup includes a base 146 and a cylindrical sidewall 148 mounted to the base 146 at a proximal end of the cylindrical sidewall 148. Alternatively, the cylindrical sidewall 148 and base 146 may be formed as an integral piece. As illustrated, the base 146 may have a larger diameter than the cylindrical sidewall 148. The base 146 and the sidewall 148 are sealed together so as to not allow liquid product (during a filling process, before the product is solidified) to pass through the join between the cylindrical sidewall 148 and the base 146. The use of the cup is particularly useful when using a liquid filling process, or a liquid hot fill process, where the product is introduced to the dispenser in a liquid form and then allowed to solidify.

Figure 15:
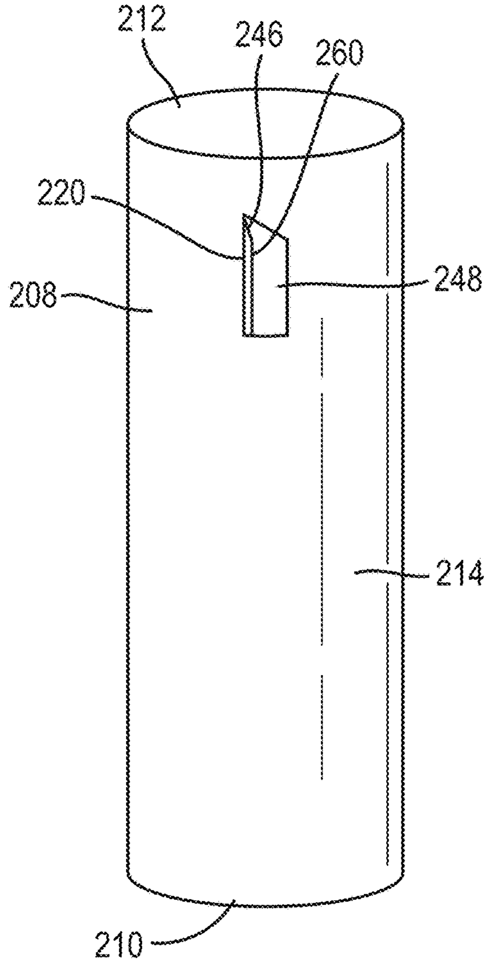
FIG. 15 is a schematic perspective view of an embodiment of a product stick carrier.
Figure 16:
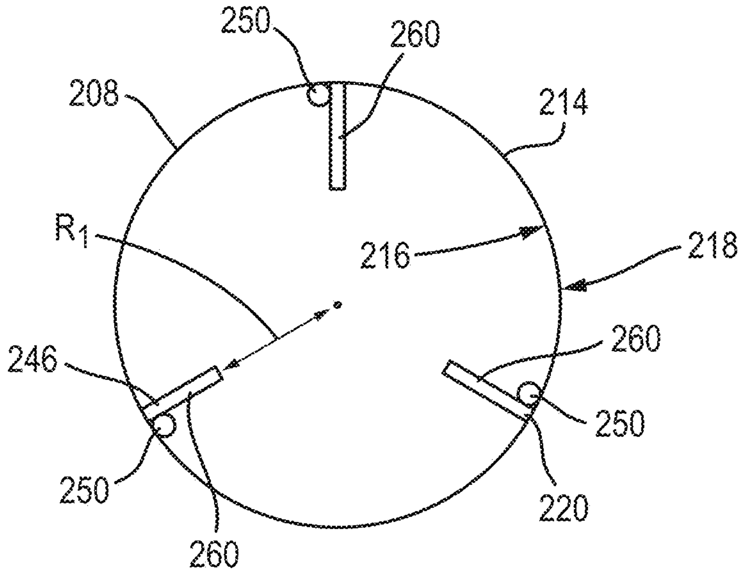
FIG. 16 is a schematic top view, along the proximal direction of the product stick carrier of FIG. 15.
Figure 17:
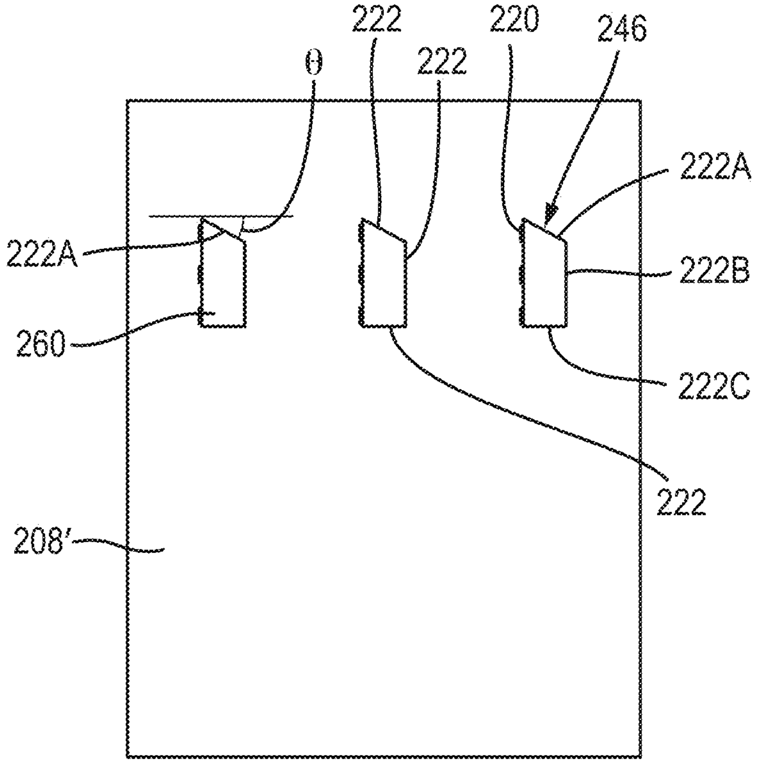
FIG. 17 is a schematic view of a blank for the product stick carrier of FIGS. 15 and 16.

In some embodiments, as illustrated in FIGS. 15 to 17, and described further below, the product stick support comprises tabs 260, or splines, which may be in addition to a base disc. The use of tabs 260 is particularly useful when the product is one to be inserted as a solid product stick, rather than being formed in situ, such as by a liquid hot fill process.

A cap 10 is illustrated, in the form of a cylindrical tube. The top 46 is in the form of a flat disc. The diameter of the cap 10 is the same as the diameter of the outer sleeve 4, and the cap 10 is sized to fit snugly over the product concealing sleeve 6.

Figure 4:
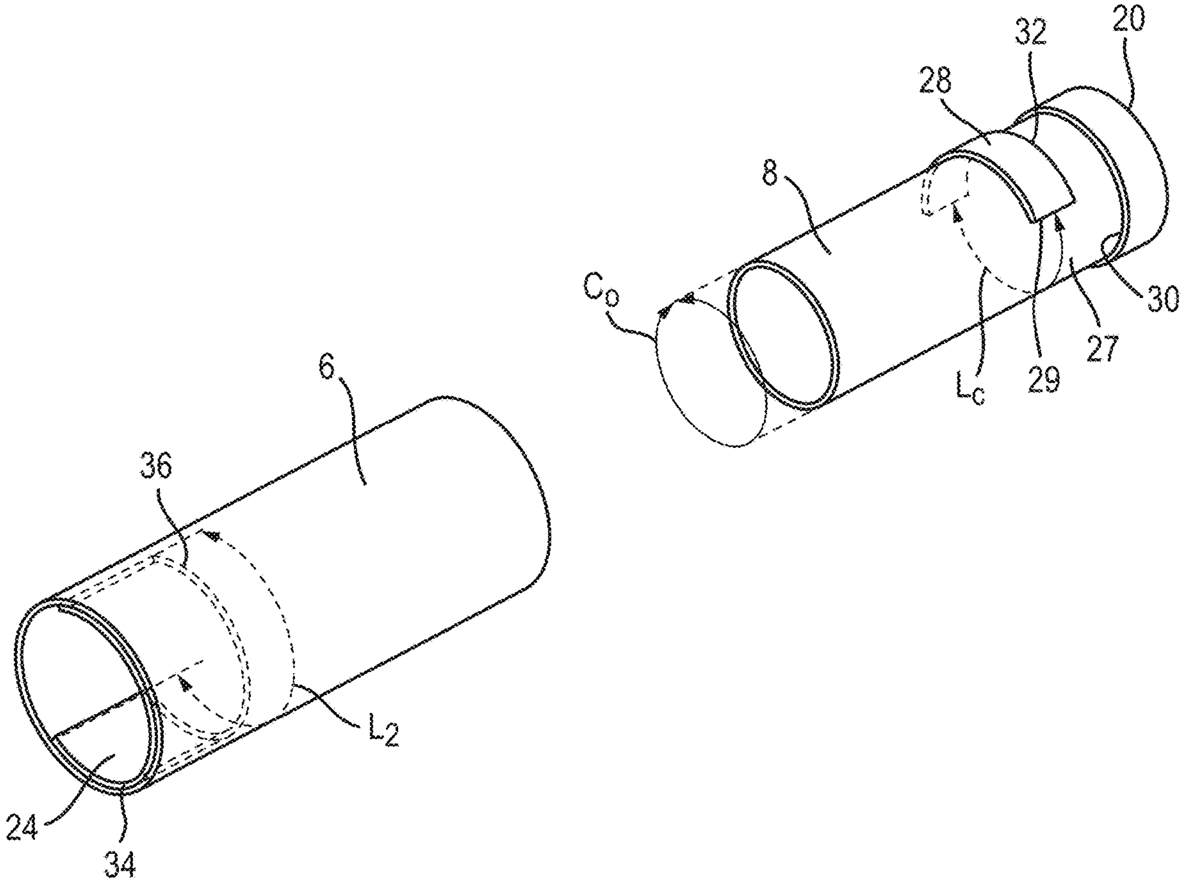
FIG. 4 is a schematic view of the primary operational parts of the dispenser of FIG. 3.

FIG. 4 provides a close-up view of the product concealing sleeve 6 and the product stick carrier 8, from which the location of the edges 30, 32, 34, 36 can be more easily appreciated.

The sum of the circumferential lengths of the product concealing sleeve collar piece 24 and the secondary product stick carrier collar piece 28 is less than the total outer circumference of the product stick carrier 8. In this way, the product concealing sleeve 24 is able to move past the secondary product stick carrier collar piece 28 in an axial direction, when it is in a particular rotational position (or range of positions).

In other words, a circumferential gap 27 is provided between circumferential ends 29 of the secondary product stick carrier collar piece 28. The product concealing sleeve collar piece 24 can fit within, so as to be able to pass through the gap 27.

The circumferential length $L_C$ of the gap 27 and the circumferential length of the product concealing sleeve collar piece 24, in conjunction with the outer circumference $C_O$ of the product stick carrier 8 define the range of rotational positions at which retraction is possible as follows:

$$\text{Size of range at which retraction is possible} = C_O - (L_C + L_2)$$

The dispenser 2 may be designed to vary the relative circumferential lengths to balance the security of the lock (by having a smaller range of rotational positions at which retraction is possible) and how easy it is to find a position where retraction is possible (by having a larger range).

The range of the retraction may be controlled in the other embodiments by controlling the circumferential lengths of the locking portions 48, 50, 52 and the product stick carrier collar piece 20 in a similar manner.

The product stick carrier collar piece 20 can extend circumferentially all the way round the product stick carrier 8, or it may have a split, provided the circumferential length of the split is less than the circumferential length $L_2$ of the product concealing sleeve collar piece 24. This is the case for all of the embodiments depicted herein.

The product stick carrier collar piece 20 and the product concealing sleeve collar 24 are at the distal and proximal ends of the product stick carrier 8 and product concealing sleeve 6 respectively. However, they do not need to be immediately adjacent (that is, flush with) their respective distal or proximal edges. Immediate adjacency may be preferred to maximise available travel of the product concealing sleeve 6 while minimising dispenser length, and thereby to maximise the amount of product stick 12 that may be dispensed. The axial widths of the product stick carrier collar piece 20 and the product concealing sleeve collar piece 24 will in a similar manner limit the axial travel maximum stroke length) possible. This is the case for all of the embodiments depicted herein.

The embodiments described below have been described only so far as they differ from the embodiment described above. That is, the particular locking arrangements, and how each of the first proximal facing edge 30, first distal facing edge 32, second proximal facing edge 34 and second distal facing edge 36 are provided and the characteristics they have.

Figure 5:
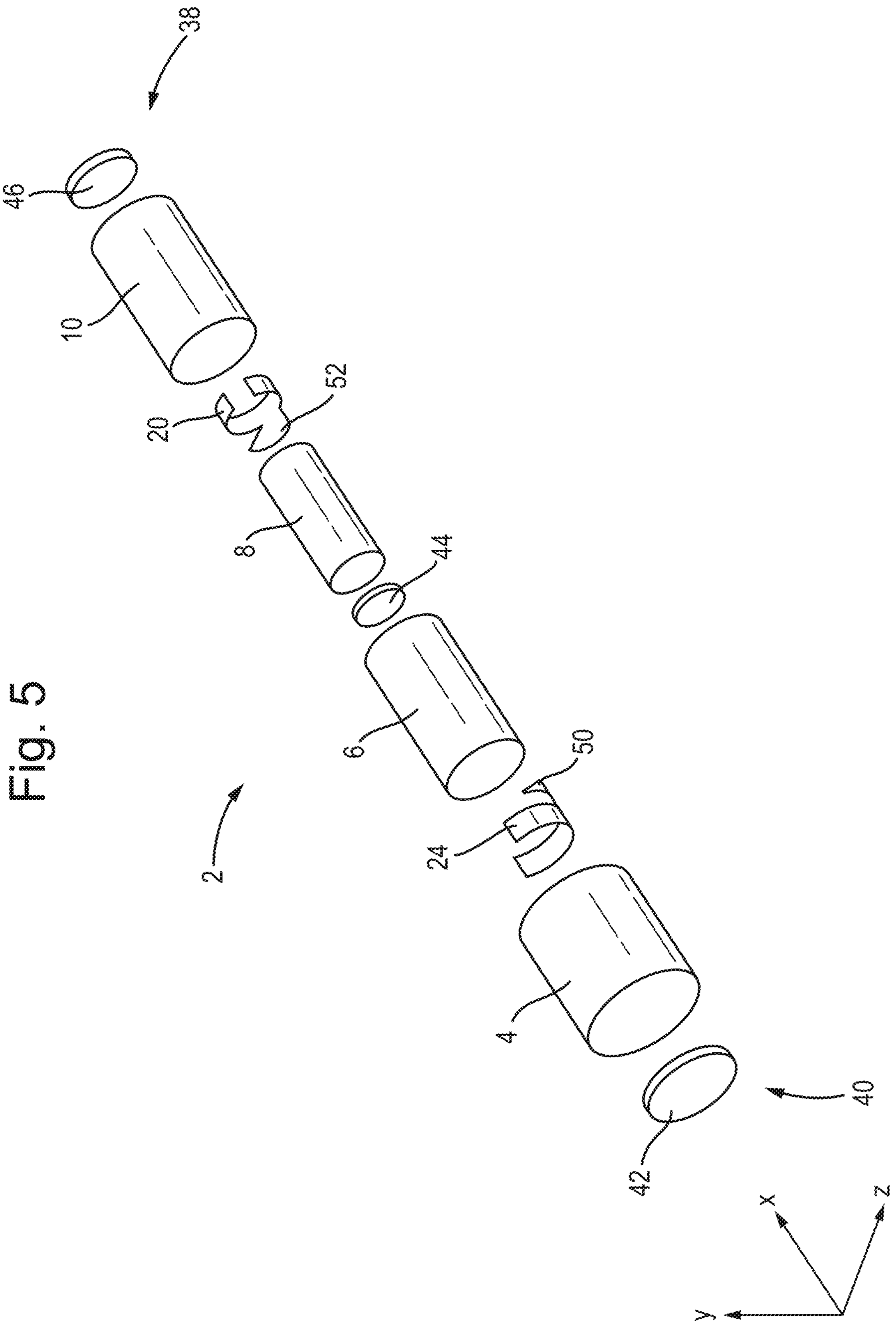
FIG. 5 is a schematic exploded view of a dispenser in accordance with another embodiment of dispenser (the Z-type)
Figure 6:
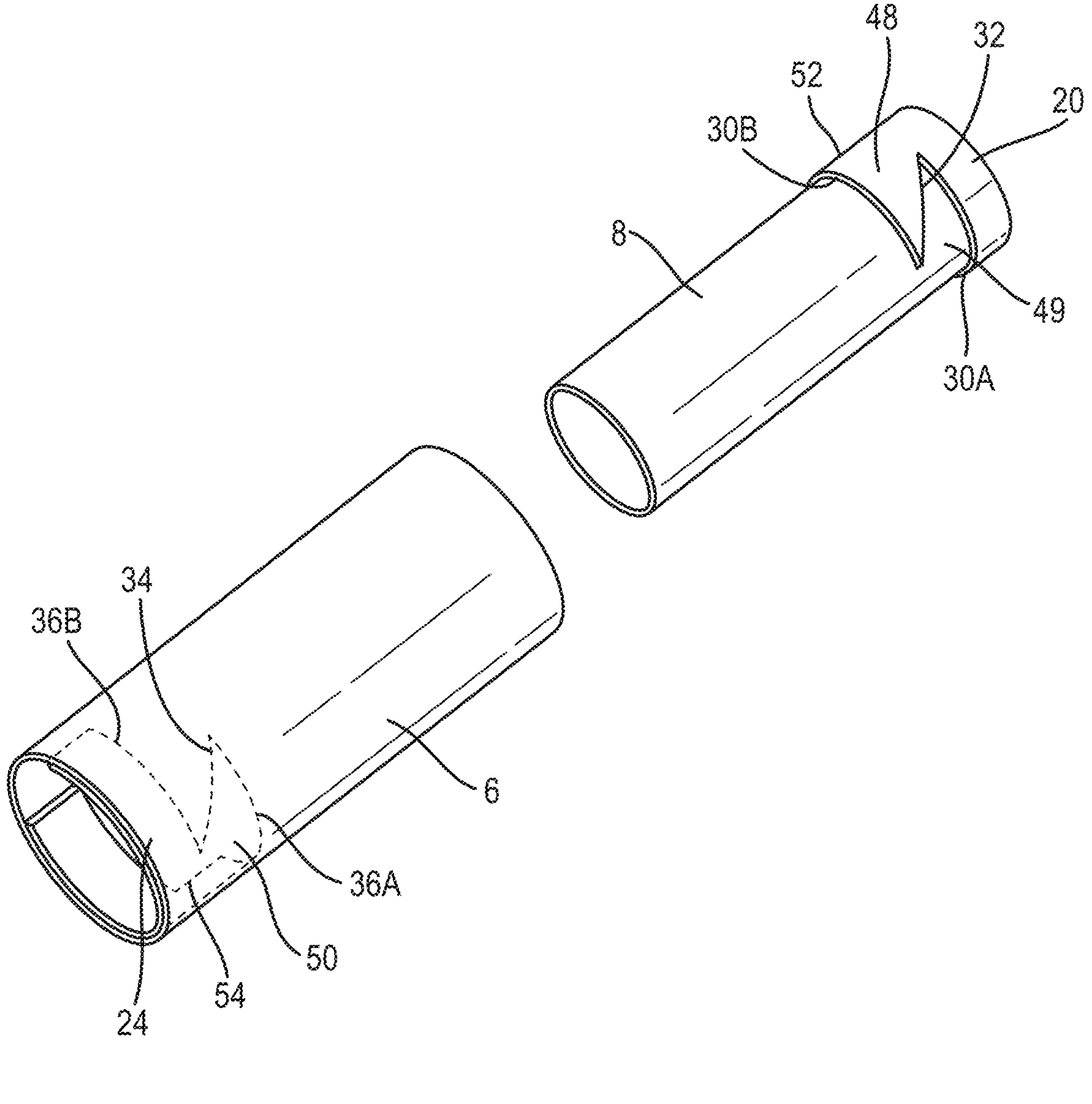
FIG. 6 is a schematic view of the primary operational parts of the dispenser of FIG. 5.

Illustrated in FIGS. 5 and 6 are an exploded view of the dispenser of a so-called "Z-type" embodiment, and a close-up view of the product concealing sleeve 6 and product stick carrier 8 thereof respectively.

The first distal facing edge 32 and the second proximal facing edge 34 of the locking arrangement in this embodiment are helical. That is, they have both an axial, and a circumferential extent, in contrast to the edges 32, 34 of the other embodiments (of FIGS. 1-4 and 6-10), which only extend circumferentially. In other words, the first distal facing edge 32 and the second proximal facing edge 34 extend diagonally.

This is provided by including a first right trapezoid locking portion 48 extending proximally from the product stick carrier collar piece 20 and a second right trapezoid locking portion 50 extending distally from the product concealing sleeve collar piece 24. As will be appreciated from the first right trapezoid locking portion 48 is integrally formed with (that is, part of the same piece as) the product stick carrier collar piece 20 and the second right trapezoid locking portion 50 is integrally formed with (that is, part of the same piece as) the product concealing sleeve collar piece 24. The pieces may be cut from a suitable tube.

The second right trapezoid locking portion 50 and the product concealing sleeve collar piece 24 are affixed to the interior of the product concealing sleeve 6, and thus would not be visible from the exterior thereof, but are shown in outline in FIG. 6 for illustration purposes.

The first right trapezoid locking portion 48 has a first axial lateral side 52, a first helical lateral side 32 and a proximal base side 30B. The proximal base side 30B extends (solely) in a circumferential direction. The first axial lateral side 52 extends in a direction perpendicular to the first proximal facing edge. The proximal base side 30B forms the first proximal facing edge of the locking arrangement in some examples.

Whether the proximal base side 30B or the edge 30A of the product stick carrier collar piece 20 provides the first proximal facing edge of the locking arrangement depends on the axial extent of the first and second right trapezoid locking portions 48, 50 relative to one another. If the first right trapezoid locking portion 48 is axially wider than the second right trapezoid locking portion 50, then the proximal base side 30B will provide the first proximal facing edge (engaging with the edge 36B of the product concealing sleeve collar piece 20). If the first right trapezoid locking portion 48 is axially narrower than the second right trapezoid locking portion 50, then the edge 30A of the product stick carrier collar piece 20 will provide the first proximal facing edge of the locking arrangement (engaging with the second distal facing edge provided in this case by the edge 36A of the second right trapezoid locking portion 50). If the first and second right trapezoid locking portions 48, 50 are of the same axial width, then proximal base side 30B may engage with edge 36B of the product concealing sleeve collar piece at the same time that the edge 30A of the product stick carrier collar piece engages with the edge 36A, such that either pair of opposed edges may be considered to provide the opposed pair of the first proximal facing edge and second distal facing edge. Two pairs of such edges are then provided.

The second right trapezoid locking portion 50 has a second axial lateral side 54, a second helical lateral side 34 and a distal base side 36A. The distal base side 36A extends (solely) in a circumferential direction. The second axial lateral side 54 extends in a direction perpendicular to the edge 36B of the collar 24. The distal base side 36A forms the second distal facing edge 36A in some examples.

Whether the distal base side 36A or the edge 36B of the product concealing sleeve collar piece 20 provides the second distal facing edge 36A, 36B depends on the axial extent of the first and second right trapezoid locking portions 48, 50 relative to one another. If the first right trapezoid locking portion 48 is axially wider than the second right trapezoid locking portion 50, then the edge 36B of the product concealing sleeve collar piece 20 will provide the second distal facing edge of the locking arrangement. If the first right trapezoid locking portion 48 is axially narrower than the second right trapezoid locking portion 50, then the distal base side 36A will provide the first second distal facing edge of the locking arrangement.

The helical edges 32, 34 engage one another in a range of rotational positions of the product concealing sleeve 6 relative to the product stick carrier 8 to prevent retraction of the product concealing sleeve 6 relative to the product stick carrier 8, when the first and second right trapezoid locking portions 48, 50 axially overlap with one another. In this way the product concealing sleeve 6 is prevented from axial retraction from a fully extended axial position, whether defined by the interaction of the proximal base side 30B with the edge 36B of the product concealing sleeve collar piece 20, or defined by the interaction of edge 30A of the product stick carrier collar piece 20 with the edge 36A of the second right trapezoid locking portion 50, or defined by both.

In other rotational positions, the helical edges 32, 34 do not engage one another, and the distal base side 36A is able to move past the proximal base side 30B and therefore the product concealing sleeve 6 is able to retract relative to the product stick carrier 8.

The sum of the circumferential lengths of the distal base side 36A and of the proximal base side 30B is less than the total outer circumference of the product stick carrier 8, such that the second right trapezoid locking portion 50 can move axially into a circumferentially extending gap 49, which is axially aligned with the first right trapezoid locking portion 48.

Once the distal base side 36A has moved axially past the proximal base side 30B in a proximal direction, that is, once the product concealing sleeve 6 is free to retract axially, the product concealing sleeve 6 can also rotate freely with respect to the product stick carrier 8. Thus the movement of the product concealing sleeve 6 relative to the product stick carrier 8 is unconstrained both axially and rotationally.

When the user wants to re-extend the product concealing sleeve 6 to conceal the product stick 12, the product concealing sleeve 6 needs to be rotated into (or kept in) the rotational position where the distal base side 36A does not overlap circumferentially with the proximal base side 30B, so that the first right trapezoid locking portion 48 may move axially back past the second right trapezoid locking portion 50 in the distal direction, so the two portions 48, 50 axially overlap. At locations between the onset of axial overlap of the portions 48, 50 and the fully extended position (whether defined by engagement of edges 30A and/or 36A or 36B and 30B, depending on the axial extent of the trapezoidal locking portions 48, 50 relative to each other) the edges the edges 32, 34 may engage one another as the product concealing sleeve 6 is rotated and further axial movement of the product concealing sleeve 6 relative to the product stick carrier 8 in the distal direction may involve rotational movement, with edge 34 travelling over edge 32 until the fully extended position is reached. In order to then retract the product concealing sleeve 6, the user may either: rotate the product concealing sleeve 6 back to a position where the distal base side 36A does not overlap circumferentially with the proximal base side 30B without axial movement of the product concealing sleeve 6 and then retract the product concealing sleeve 6 in an axially proximal direction; or begin axial movement of the product concealing sleeve 6 simultaneously with a rotational movement, with edge 34 travelling (or sliding) over edge 32 (i.e., moving in a helical direction) until a position where distal base side 36A does not overlap circumferentially with the proximal base side 30B, and then freely move the product concealing sleeve 6 in an axially proximal direction (and if desired, once the trapezoid portions 48, 50 do not overlap axially, freely in a rotational direction).

In this arrangement, and particularly of use when the user is rotating the product concealing sleeve 6 without axial movement and then retracting the product concealing sleeve 6, the first axial lateral side 52 will engage the second axial lateral side 54 if the product concealing sleeve 6 continues to be rotated from the locking position while the right trapezoid portions 48, 50 axially overlap. This provides a mechanical feedback to the user that the distal base side 36A does not overlap circumferentially with the proximal base side 30B and thus that free axial retraction is possible.

Figure 7:
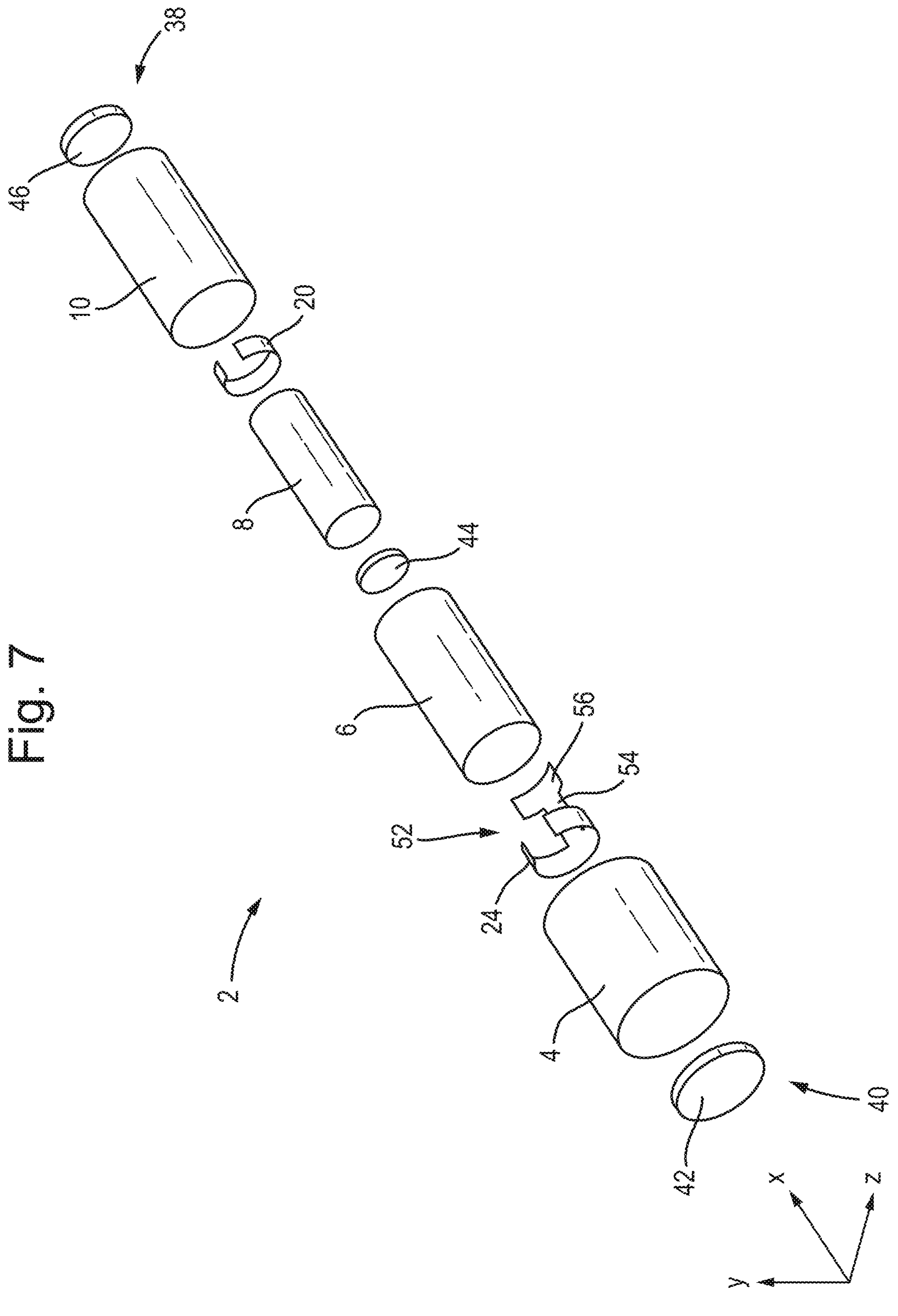
FIG. 7 is a schematic exploded view of a dispenser in accordance with another embodiment of dispenser (the T-type)
Figure 8:
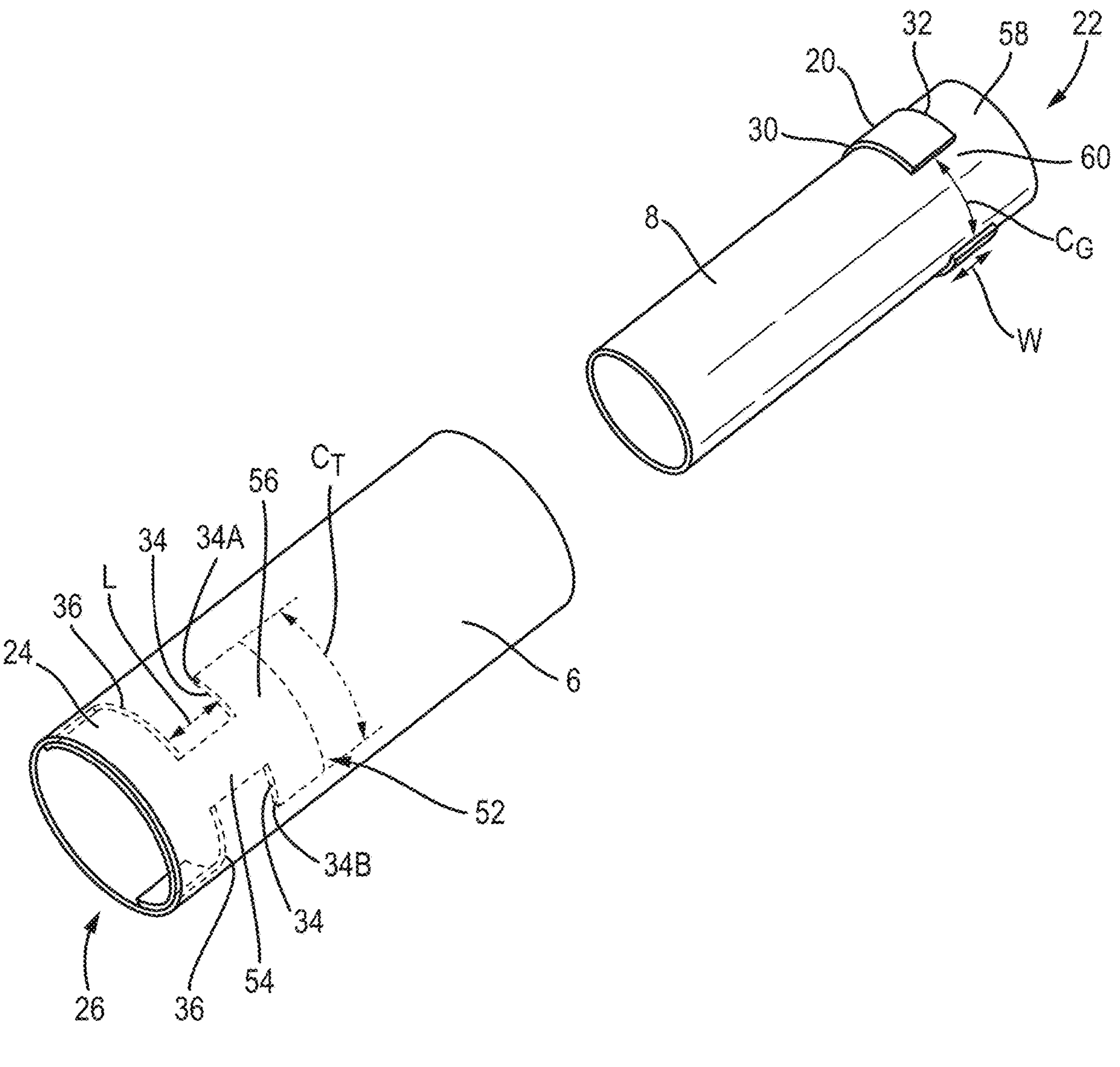
FIG. 8 is a schematic view of the primary operational parts of the dispenser of FIG. 7.

FIGS. 7 and 8 illustrate an exploded view of the dispenser 2, and a close-up view of the product concealing sleeve 6 and product stick carrier 8 thereof respectively, of an embodiment referred to as the "T-type" embodiment.

In contrast to the Z-type embodiment, the T-type replaces the two right trapezoid locking portions 48, 50, that engage with one another with a single T-shape locking portion 52 attached to the product concealing sleeve collar piece 24, where the top (distal most edge) of the T (i.e. the circumferentially extending portion 56) is able to move past the product stick carrier collar piece 20 and, after rotation of the product concealing sleeve 6 relative to the product stick carrier 8, engage with the distal facing edge 32 thereof to prevent retraction of the product concealing sleeve 6 relative to the product stick carrier 8.

The locking arrangement of this illustrated embodiment includes the product stick carrier collar piece 20, affixed to the exterior of the product stick carrier 8 at the distal end 22 thereof and spaced from the distal edge of the product stick carrier 8 to provide an axial gap 58.

The product stick carrier collar piece 20 extends only partially round the circumference of the product stick carrier 8, to provide a circumferential gap 60 having a circumferential length $C_G$.

The locking arrangement herein also includes a product concealing sleeve collar piece 24 affixed the interior of the product concealing sleeve 6 at a proximal end 26 thereof.

There is also included a T-shape locking portion 52 which, as shown, is integrally formed with the product concealing sleeve collar piece 24, and also affixed to the interior of the product concealing sleeve 6. That is, the T-shape locking portion 52 and the product-concealing sleeve collar piece 24 are a single part. These may be cut from a tube of suitable diameter.

As will be appreciated, although the T-shape locking portion 52 and product concealing sleeve collar piece 24 are on the interior of the product concealing sleeve 6, they have been shown as visible in FIG. 8 for illustration purposes.

The T-shape locking portion 52 includes an axially extending portion 54 and a circumferentially extending portion 56. The axially extending edges of portion 54 do not extend helically. The axially extending portion 54 extends axially from the product concealing sleeve collar piece 24. The axial length L of the axially extending portion 54 is equal to or greater than the axial width W of the product stick carrier collar piece 20. This ensures that the product concealing sleeve collar piece 24 can slot into the space 58 between the circumferentially extending portion 56 and the product concealing sleeve collar piece 24. The circumferentially extending portion 56 extends circumferentially from the distal end of the axially extending portion 54. In the T-type embodiment, the circumferentially extending portion 56 extends in both directions from the axially extending portion 54, to thereby create the T-shape therewith. The circumferential length $C_T$ of the circumferentially extending portion is less than the circumferential length $C_G$ of the circumferential gap 60, so that the circumferentially extending portion 56 can move past the product stick carrier collar piece 20 when in an appropriate rotational position or in a range of appropriate rotational positions.

The product concealing sleeve collar piece 24 extends circumferentially round the product concealing sleeve 6 to an extent that the product stick carrier collar piece 20 cannot, at any rotational position, move past the product concealing sleeve collar piece 24 distally in the axial direction.

In this embodiment, the first proximal facing edge 30 is provided by the proximal edge of the product stick carrier collar piece 20.

The first proximal facing edge 30 engages the second distal facing edge 36 to prevent extension of the product concealing sleeve 6 past the fully extended position. In this embodiment, the second distal facing edge 36 is provided by the distal edge of the product concealing sleeve collar piece 24.

The second proximal facing edge 34 is provided by the proximal edge of the circumferentially extending portion 56.

In this, T-type embodiment, the second proximal facing edge 34 is a discontinuous edge having a first part 34A and a second part 34B, either of which can engage the first distal facing edge 32 in different rotational positions to prevent retraction of the product concealing sleeve 6 in a range of appropriate rotational positions.

The first distal facing edge 32 is provided by a distal edge of the product stick carrier collar piece 20.

Each of the first proximal facing edge 30, first distal facing edge 32, second proximal facing edge 34 and second distal facing edge 36 extend only circumferentially in this embodiment, having no axial extent. Thus, each edge 30, 32, 34, 36 is non-helical.

As will be appreciated, in the T-type embodiment, the product concealing sleeve 6 can be locked into the first fully extended position by rotation in either direction, to engage one or other of the first and second parts 34A, 34B of the second proximal facing edge 34 with portions of the first distal facing edge 32 respectively. The product concealing sleeve 6 may then be rotated back to a middle rotational position, where the circumferentially extending portion 56 can move axially past the product stick carrier collar piece 20 in a proximal direction.

Figure 9:
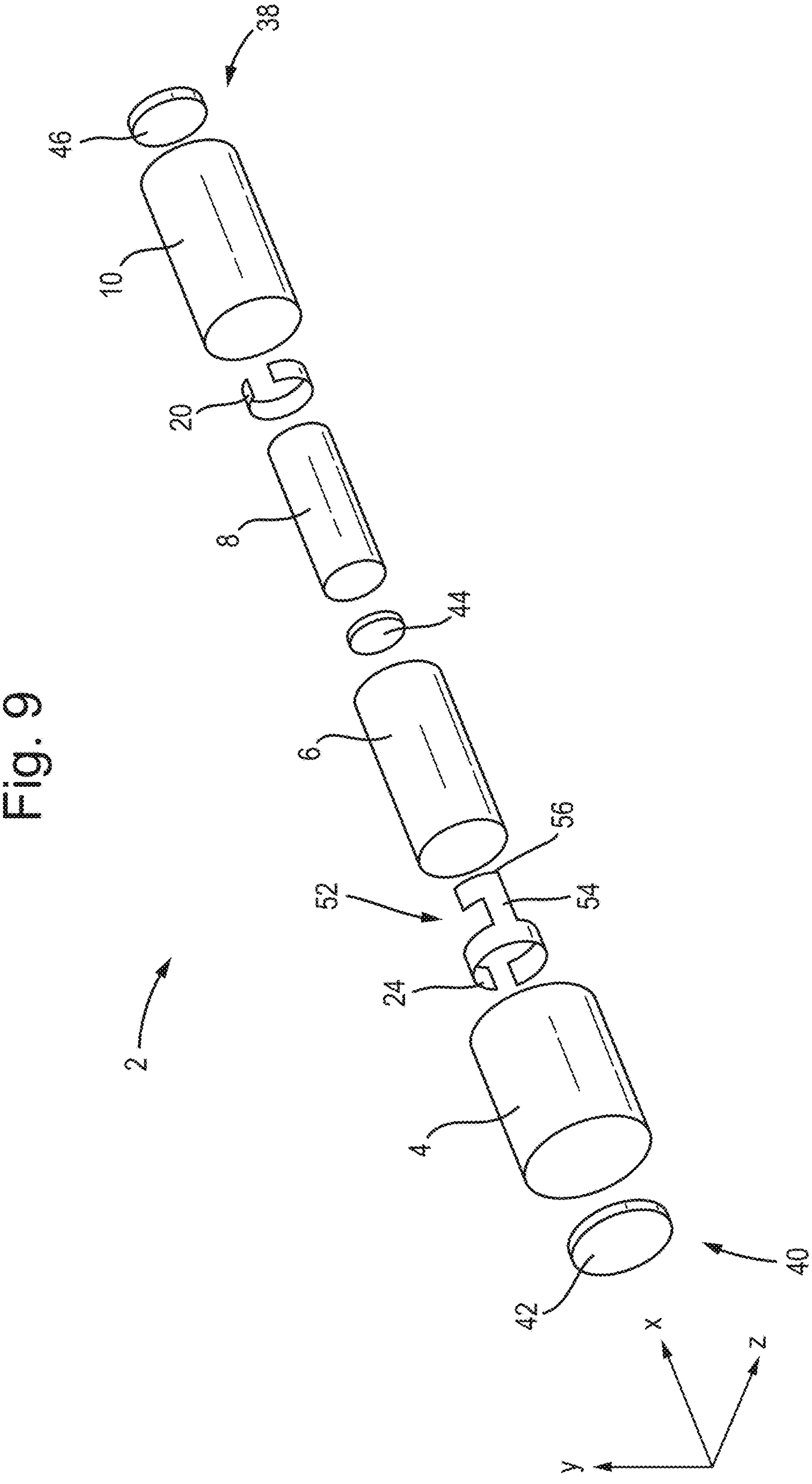
FIG. 9 is a schematic exploded view of a dispenser in accordance with another embodiment of dispenser (the L-type)
Figure 10:
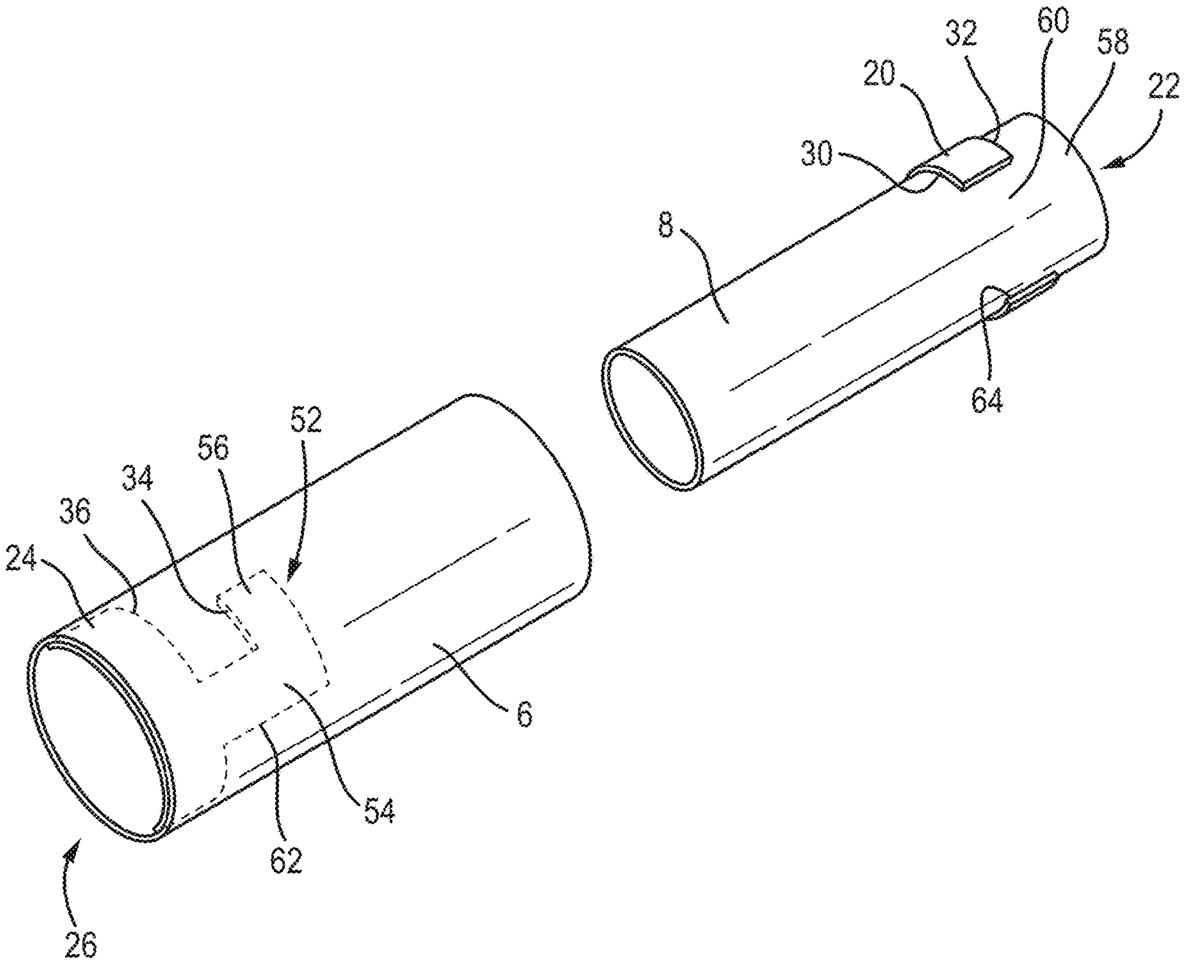
FIG. 10 is a schematic view of the primary operational parts of the dispenser of FIG. 9.

FIGS. 9 and 10 illustrate a dispenser of the L-type embodiment.

The L-type embodiment is similar to the T-type embodiment, except that the circumferentially extending portion 56 of the L-type embodiment only extends in one direction from the axially extending portion 54. Accordingly, the second proximal facing edge 34 does not comprise two parts as in the T-type embodiment, but only has one part. This means that the product concealing sleeve 6 is locked only by rotation in a single direction, rather than in either direction as in the T-type embodiment. Usefully in the L-type embodiment, a circumferentially facing edge 62 of the axially extending portion 54 of the locking portion 52 is able to abut an opposite circumferentially facing edge 64 of the product stick carrier collar piece 20 when the product concealing sleeve 6 is rotated from the locked position to an unlocked position, where the circumferentially extending portion 56 is able to move axially past the product stick carrier collar piece 20 in a proximal direction. This abutment of the opposite circumferentially facing edges 62, 64 allows the user to easily and accurately locate the product concealing sleeve in the unlocked position.

FIG. 11 illustrates a finally assembled dispenser 2 having a product stick 12 in situ. As will be appreciated, the mechanisms of this dispenser 2 enabling locking of the product concealing sleeve 6 in the first fully extended position relative to the product stick carrier 8 are hidden in this illustration, as indeed is the product stick carrier 8.

FIG. 12 illustrates the finally assembled dispenser 2 of FIG. 11, but with the product concealing sleeve 6 in the fully extended position. The mechanisms are also hidden in FIG. 12.

As can be seen in FIGS. 11 and 12, visual marks 66, 68 (or indicia) are printed, or embossed on the product concealing sleeve 6 and the outer sleeve 4 respectively, to inform the user which rotational position the product concealing sleeve 6 is in relative to the product stick carrier 8 and outer sleeve 4. The product concealing sleeve 6 may also include further visual marks 70, presently hidden in FIG. 11 because the product concealing sleeve 6 is retracted, but visible in FIG. 12 such that the product concealing sleeve has a distal visual mark 66 and a proximal visual mark (not visible in FIG. 11). The visual marks 66, 68, 70 enable the user to identify when the product concealing sleeve 6 and product stick carrier 8 are in an appropriate rotational alignment that the locking arrangement of the dispenser 2 will permit retraction of the product concealing sleeve 6. In particular, the distal visual mark 66 is aligned with the visual mark 68 on the outer sleeve 4 when the product concealing sleeve 6 is in a rotational position where the first distal facing edge 32 can move past the second proximal facing edge 34 to permit retraction of the product concealing sleeve 6 relative to the product stick carrier 8, and the proximal visual mark 70 is aligned with the visual mark 68 on the outer sleeve 4 when the product concealing sleeve 6 is in a rotational position relative to the product stick carrier corresponding to the locked position, where the first distal facing edge 32 is positioned to engage the second proximal facing edge 34.

The dispenser in any of its embodiments may be operated by (when at or near a first fully extended position) simply twisting the product concealing sleeve relative to the outer sleeve, and hence the product stick carrier to lock or unlock the product concealing sleeve from retraction relative to the product stick carrier.

The dispenser and each of its components in accordance with any of the aspects or embodiments described herein are made of paper-based or card-based material, such as paperboard or cardboard. Thus, the product concealing sleeve, outer sleeve, product stick carrier, cap (where provided) and product support (where provided) are each made of paper-based or card-based material, such as paperboard or cardboard. The components of the locking arrangement for defining the fully extended position of the product concealing sleeve and selectively preventing retraction of the product concealing sleeve are similarly made of paper-based or card-based material, such as paperboard or cardboard e.g. collar pieces (including product concealing sleeve collar piece, product stick carrier collar piece, secondary product stick collar piece), extensions thereof etc.

The dispenser may further comprise a removable cap, optionally wherein the removable cap is made of paper-based or card-based material, such as paperboard or cardboard.

An outer package e.g. carton may be provided for the dispenser.

Turning to FIGS. 15 to 17, an alternative embodiment of product stick carrier 208, having an alternative form of product stick support including tabs 260, is described. The tabs 260 may be used in addition to a disc, similar to or the same as disc 44 described above.

As will be appreciated this product stick carrier 208 need not be used in combination with the rest of the features of the dispenser 2 described herein, but may also be used in any other dispenser for products in stick form. As per the embodiments of dispenser described above, the product stick carrier 208 is made of card-based or paper-based material, such as cardboard or paperboard. The product stick carrier 208 may be used in a reveal-type dispenser, such as but not limited to the dispenser described above, or alternatively may be used in other types of dispenser, such as extending-retracting dispensers, where the product stick (and the corresponding product stick carrier) is advanced and retracted, by any mechanism, relative to an outer sleeve to present the product.

The product stick carrier 208 is in the form of a cylindrical tube having a proximal end 210 and a distal end 212. The proximal end 210 may be open or closed and the distal end 212 is open so as to be able to receive the product stick. The product stick carrier 208 in this manner has a cylindrical wall 214 which has an inner surface 216 and an outer surface 218

The product stick carrier 208 includes tabs 260, which form part of product stick support. The tabs 260 may also be called splines. The tabs 260 extend radially inwards from the inner surface 216, as can be appreciated from FIG. 16. As will be appreciated, while the illustrated tabs 260 extend generally radially (i.e., perpendicular to the cylindrical wall 214), tabs 260 extending at an angle skewed to the radial direction (i.e., also skewed to the perpendicular direction) could be used. This radial direction is defined with respect to the axis along which the product stick carrier 208 extends. When the tabs 260 extend closer to the radial direction, they are able to better grip and thus provide better support for the product stick.

The tabs 260 are located toward, but slightly spaced from the distal end 212 of the product stick carrier 208. In the particular embodiment illustrated, though other embodiments are envisaged, each tab 260 is spaced about 5% of the overall length of the product stick carrier away from the distal end 212 of the product stick carrier 208, and the axial length of each tab 260 is about 10-15% of the length of the product stick carrier 208. These dimensions are merely exemplary, and alternative lengths and distances from the distal end 212 are envisaged. The most suitable dimensions will depend upon factors such as the type of dispenser and/or product stick used.

Radially innermost ends of the tabs 260 are located at a radius $R_1$ from the longitudinal axis of the product stick carrier that is equal to or less than a radius of the product stick, so as to ensure the tabs 260 engage with the product stick to thereby hold the product stick in place when inserted in use. The product stick is soft and/or malleable so the tabs 260 can press into the material of the product stick.

The size of the illustrated tabs 260 is illustrated schematically and is exemplary in nature and the actual size may be selected dependent on the application desired.

Each of the tabs 260 is attached to the inner surface 216 of the cylindrical wall 214 along a fold line 220 which extends substantially in an axial direction (i.e., in the proximal and distal directions). That is, the fold line 220 extends along the length of the product stick carrier 208. Each tab 260 is thereby partially released from, but remaining hingedly attached to, the cylindrical wall 214 of the product stick carrier 208. This ensures each tab 260 is able to fold away from the inner surface 216 of the cylindrical wall 214, which is a curved surface. As described below, this creates vents 248. The axial (i.e., proximal and distal) direction is defined with respect to the axis of the product stick carrier 208.

The tabs 260 are formed from part of the cylindrical wall 214 of the product stick carrier 208, as can be appreciated from the blank 208' of the product stick carrier 208 as illustrated in FIG. 17. While helpful for illustration purposes, it should be understood that the cylindrical wall may be formed in other methods, such as being a spiral wound tube, rather than being rolled up from a blank.

The illustrated tabs 260 are defined by cut-outs in the cylindrical wall 214 (or cut-outs in the cylindrical tube/product stick carrier), wherein the cut-outs include cut lines 222A, 222B, 222C and the fold line 220 discussed above. It will be appreciated that the cut lines 222A, 222B, 222C may take different forms and geometries to those illustrated in the figures. For example, a single, curved cut line could be used. Whichever cut line configuration is used, the set of cut lines will start at one end of the fold line 220 and end at the other end of the fold line 220 and will be on one circumferential side of the fold line 220. These cut lines 222A, 222B, 222C, together form a peripheral edge 222 of the tab 260.

By forming the tabs 260 as cut-outs in the cylindrical wall 214, vents 248 are included in the product stick carrier 208, having a shape equivalent to the negative of the shape of each respective tab 260, and being adjacent thereto. The vents have the other side of the cut-lines 222A, 222B, 222C and the fold line 220 as their periphery or edge.

The inclusion of vents 248 allows for the expulsion of air from the product stick carrier 208 when the product stick is being inserted. This is particularly important when the product stick carrier 208 does not include any openings therethrough and is closed proximal to the tabs. For example, where the product stick carrier 208 includes a base disc similar to base disc 44 which does not include any openings therethrough and is located proximal to the tabs. The base disc may be located at any axial position in the product stick carrier proximal to the tabs 244. The base disc is located as appropriate to support the base of the product stick in a particular arrangement. In using the tabs 260 with the inherent vents 248, alternative means of air egress do not need to be formed in the product stick carrier 208, which reduces the complexity of the product and of the manufacturing thereof. The size and number of the vents 248 can be chosen dependent on the amount of venting required for a particular dispenser.

As illustrated, each tab 260 has a trapezoidal shape, more particularly a right-trapezoidal shape. The trapezoidal shape has: a long base, which corresponds to fold line 220; an angled side 222A, which provides a distal edge 246 of each tab 244, and corresponds to a distal-most cut line 222A; a short base 222B, which corresponds to another cut line 222B (or another part of a singular cut-line 222A, 222B, 222C); and a right-angled side 222C, which provides a proximal edge of each tab 244, corresponding to a proximal-most cut-line 222C (or another part of the singular cut-line 222A, 222B, 222C).

The distal edge 246 of each tab 260, which corresponds to the distal-most cut line 222A, extends at an angle θ to the proximal-most cut line 222C (or the right-angled edge 222C). When erected in the arrangement where the tabs 260 extend perfectly radially, that is perpendicular to the wall, the distal most-cut line 222A will therefore extend at the angle θ to the radial direction.

In other words, when in the blank 208', or not yet folded or released from the cylindrical wall 214 of the product stick carrier 208, the distal edge 246 of each tab 260 extends at the angle θ to the circumferential and/or tangential direction. The angle θ is an acute angle, in some embodiments between 15° and 60°, in some embodiments between 20° and 45° and more narrowly about 30°. The angled distal edge 246 allows the force from the insertion of the product stick into the product stick carrier to be spread locally to reduce the likelihood of distortion of the tab 260. Notably, the first action of the insertion force on the tab 246 is close to the fold line 260, where the tab 246 is more strongly supported by the cylindrical wall 214, and as the product stick is inserted further into the product stick carrier, engaging with more of each tab 260, the product stick itself acts to strengthen the location of the tabs 260.

While each of the tabs 260 are illustrated and described as being the same as one another, it will be appreciated that the tabs could have different geometries to one another.

The illustrated tabs 260 are spaced equally around the circumference of the product stick carrier 208, and at the same axial position as one another. Such an equidistant arrangement provides greater support for the product stick. However, in alternative embodiments, the tabs could be axially offset and unequally spaced around the product stick carrier.

The tabs 260 are illustrated as folding in a clockwise direction; however, one or more of the tabs 260 could be folded in an anti-clockwise direction, with the fold lines 220 (still being the long base of the trapezoidal shape) being on the opposite circumferential side of the tabs 260.

Presently, the product stick carrier 208 has been illustrated having exactly three tabs 260. However, it will be understood that a different number of tabs could be used in alternative embodiments, for example more than three tabs, or in some examples only two tabs or even one tab. Exactly three tabs 260 has been found to provide sufficient support while being less challenging to manufacture and maintaining sufficient rigidity of the product stick carrier than more tabs. However, more than three tabs, for example, four, five or more tabs would provide even greater support for the product stick. In a similar manner, the apparatus and method described below could be adapted accordingly to provide more or fewer than three tabs.

With reference to FIGS. 18 to 28 an apparatus 300 for forming the product stick carrier 208 illustrated in FIGS. 15 to 17 is described.

In general terms, the apparatus 300 is adapted to simultaneously cut and fold the plurality of tabs 260 in the product stick carrier 208 and to reproducibly locate the tabs 260 in the same position on multiple product stick carriers 208 one after the other without requiring a user to perform detailed locating and orientating steps. This is achieved by providing a plurality of cutting features (such as the cutting blocks described below) that can be simultaneously driven to cut the tabs 260 (and thus create vents 248, which extend completely through the wall 214 of the product stick carrier 208) in the product stick carrier 208. In this manner, the tabs 208 are released from the wall 214 of product stick carrier 208. The number of cutting features corresponds to the number of tabs 260 in the resultant product stick carrier. As will be appreciated, the specific design and description of the illustrated embodiment is only one example of an apparatus, in this case for forming three tabs 260. Alternative sets of apparatus operating by the same principles, that is, having a corresponding number of cutting features to tabs that are arranged to operate simultaneously to cut and fold all the tabs at the same time, are envisaged for forming alternative arrangements of tabs 260 on the product stick carrier 208.

Figure 18:
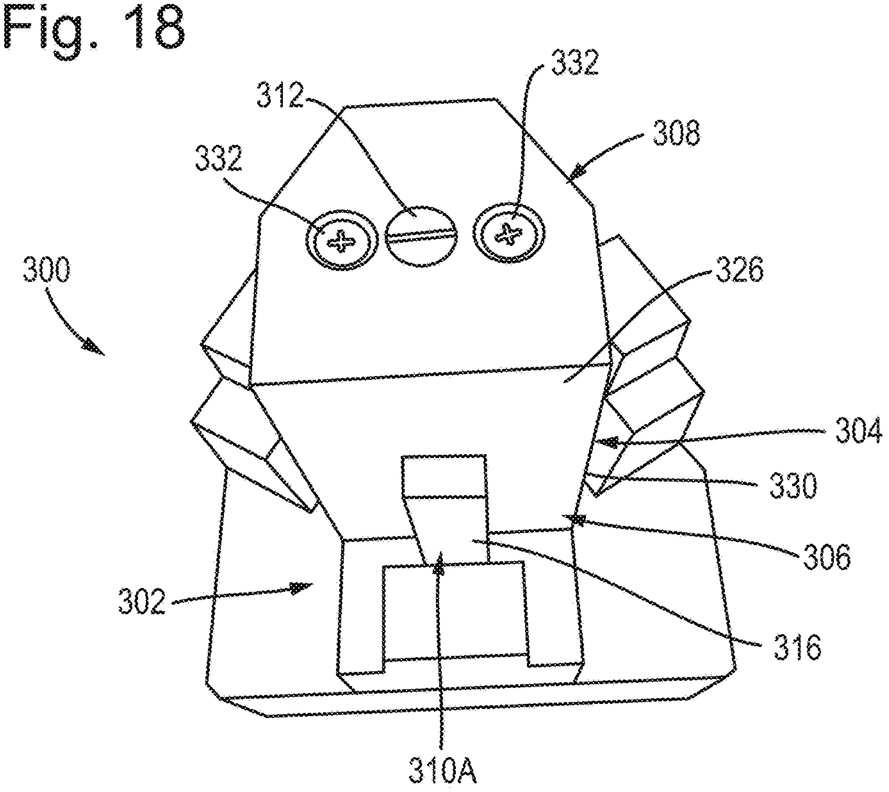
FIG. 18 shows an exemplary apparatus for forming the product stick carrier of FIGS. 15 to 17.

Shown as a single assembly in FIG. 18, the apparatus 300 includes a punch block 302 and a mandrel housing 304, which in turn includes a first piece 306 and a second piece 308.

While this is shown with punch block 302 at the bottom with the mandrel housing 304 sitting therein, above, it will be appreciated that this is for illustration purposes and the assembly could be the other way up, i.e., with the punch block 302 on top of the mandrel housing 304. Using the apparatus 300 with the punch block 302 on top may in some circumstances be preferred to allow the weight of the punch block 302 to provide more force for cutting the product stick carrier 208. The apparatus 300 also includes cutting features in the form of cutting blocks 310, 310A, 310B, 310C (only one cutting block 310A is visible in FIG. 18). The cutting blocks 310, 310A, 310B, 310C are the same as each other; however, in some embodiments it is envisaged that the cutting blocks may be different. The apparatus 300 also includes a mandrel 312 (only the end of which is visible in FIG. 18, but which can be seen more clearly in FIGS. 20 and 21), which is housed within the mandrel housing 304.

Figure 19:
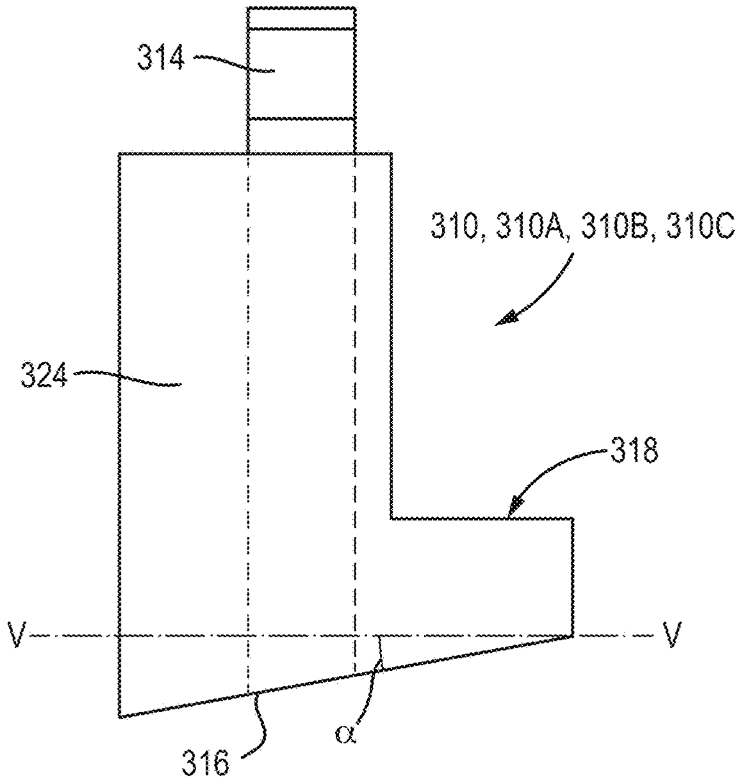
FIG. 19 is a schematic side view of an exemplary cutting block from the apparatus of FIG. 18.
Figure 20:
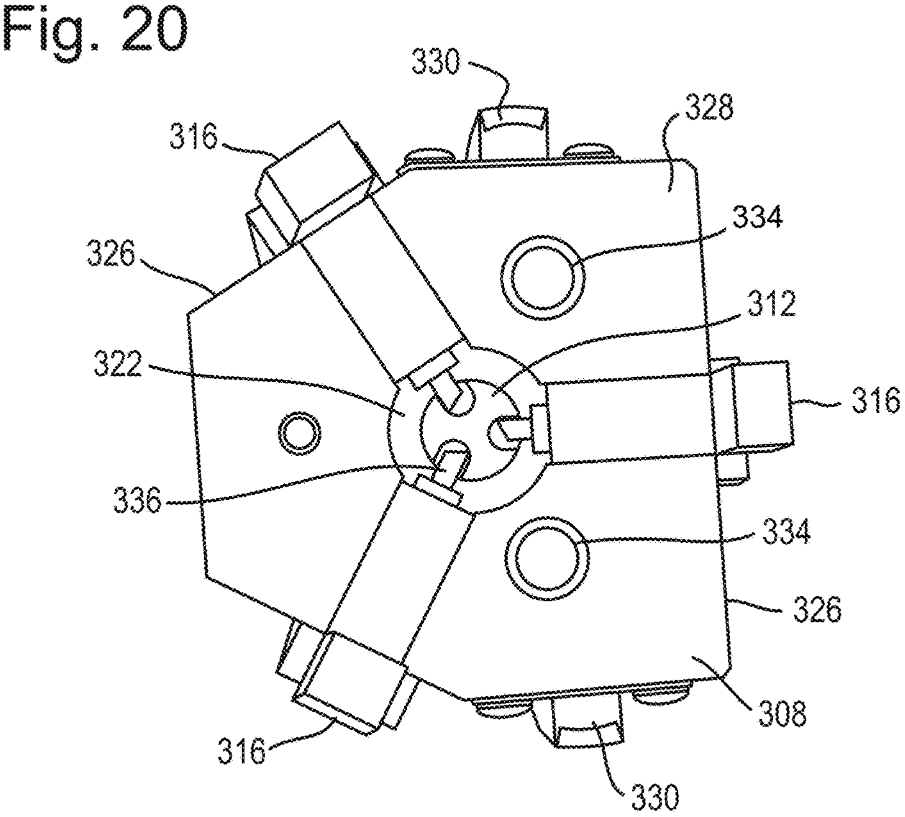
FIG. 20 shows a part of the apparatus of FIG. 18.

The cutting block 310 illustrated in FIG. 19 (which corresponds to each of the cutting blocks 310A, 310B, 310C) has a generally L-shape. The cutting block 310 has a cutting piece 314 attached to the top of the 'L', which is the radially inward-most part of the cutting block 310 when in situ. The cutting block 310 has a tapered surface 316 along the base of the 'L', opposite the cutting piece 314. When arranged in the apparatus 300 in use, the tapered surface 316 extends at an angle α to the vertical, which is illustrated in FIG. 19 by line V-V. It will be appreciated that the term vertical is used for description purposes only and that the apparatus 300 could be used in alternative orientations. The vertical direction is parallel to the axial direction defined by the axis of the mandrel 312.

The tapered surface 316 being arranged at the angle α causes the cutting block 310 (and thereby the cutting piece 314 to be driven in an inward (optionally radial) direction when it is moved or slid against a stationary piece in the vertical (or axial) direction. Similarly, if a secondary piece is moved or slid along the tapered surface 316 of the cutting block 310 in the vertical or axial direction, the cutting piece 314 is also thereby driven in the radial direction.

The cutting block 310 also includes a stop surface 318 on the base of the 'L' and opposite the tapered surface 316. As will be described below, the stop surface 318 limits the extent of the radial movement of the cutting block 310 due to abutment with the mandrel housing 304.

As can be appreciated from FIGS. 20 to 24, the mandrel housing 304, as described above includes a top (or first) piece 306 and a bottom (or second) piece 308. Each of the top and bottom pieces 306, 308 have the same footprint shape (i.e., the shape when viewed in a vertical, or axial, direction). The illustrated shape is an irregular hexagon, corresponding to a square with two adjacent corners truncated at an angle of 30°, but it will be appreciated that alternative shapes could be used. As will be appreciated, the terms top and bottom are used nominally, and both the mandrel housing 304 and apparatus 300 as a whole are not limited to such an orientation.

The bottom piece 308 includes tracks 320A, 320B, 320C, which may be called grooves and are shaped so as to fit respective cutting blocks 310A, 310B, 310C. These tracks 320A, 320B, 320C are equally spaced around a central recess 322, which is circular and sized to fit around the mandrel 312 with space for the product stick carrier 208 to sit around the mandrel inside the central recess 322. Sliding arms 324 of the cutting blocks 310A, 310B, 310C are slidably received within the tracks 320A, 320B, 320C such that the cutting blocks 310A, 310B, 310B can slide (radially) inwards and outwards so as to move the cutting pieces 314 toward and into and away from and out of the mandrel 312. As introduced above, the stop surfaces 318 provide a limit to the sliding movement when they abut outer surfaces 326 of the mandrel housing 304.

Either the depth of the tracks 320A, 320B, 320C in the bottom piece 308 may be such that the sliding arm 324 of each cutting block 310 sits flush with an upper surface 328 of the bottom piece 308 when in its respective track 320A, 320B, 320C, or the top piece 306 includes corresponding tracks to slidably receive the upper part of sliding arm 324 of the cutting blocks 310.

The illustrated tracks 320A, 320B, 320C extend in a radial direction relative to the mandrel axis; however, in some embodiments, tracks may be included that are at a slight angle to the radial direction, so that the cutting piece 314 protracts and retracts through the wall 214 of the product stick support 208 at an acute angle to the radial direction, for example, between 5° and 45°, such as 30°. That is, the centre line of the track 320A, 320B, 320C intersects a radius of the mandrel 312 at the point equal to the radius of the product stick support 208. As will be further understood after consideration of the operation of the apparatus described below, this embodiment allows the tabs 244 to be folded more than 90° and then to, by the resilience of the paper-based or card-based material 'spring' back to a radial position, at 90°.

The mandrel housing 304 includes fastening means to attach the bottom piece 308 and the top piece 306 together, and also to loosely hold the cutting blocks 310 in place, albeit with the cutting blocks 310 able to slide in the radial direction. Two such fastening means are illustrated; however, it will be appreciated that only one of the fastening means may be used, and/or alternative fastening means could be used.

One of the illustrated fastening means is a pair of toggle latch clips 330, 330A affixed to the outside of the mandrel housing 304 and arranged to hold the bottom piece 308 to the top piece 306 when closed. Each toggle latch clip includes a pair of mating parts 300, 330A, on of which is affixed to the bottom piece 308 and the other of which is affixed to the top piece 306.

Another of the illustrated fastening means is a pair of bolts 332 and threaded bores 334 with the bolts 332 extending through the top piece 306 into the threaded bores 334, which are integral with the bottom piece 308.

Figure 24:
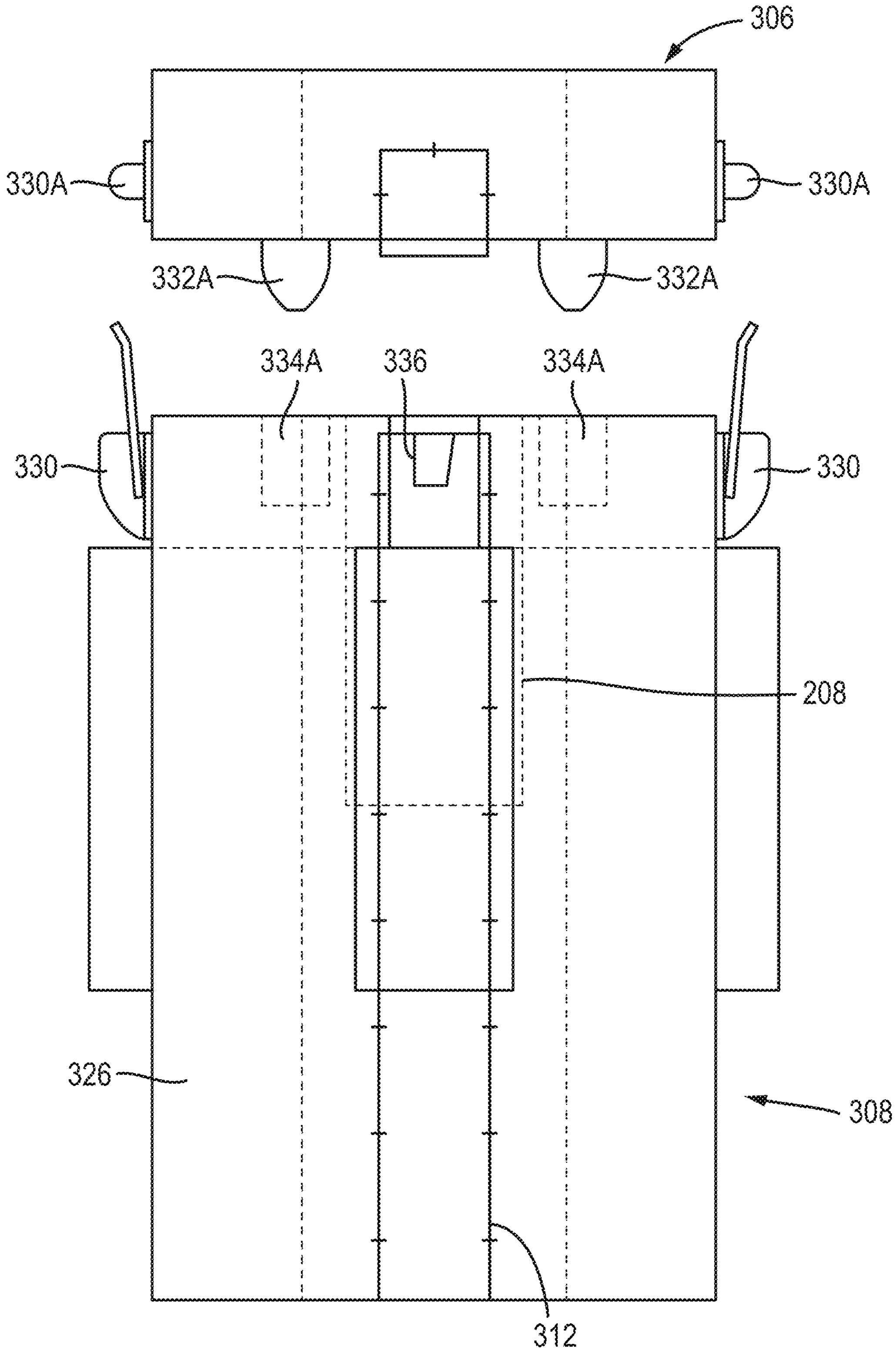
FIG. 24 shows a schematic side view of the parts of FIGS. 22 and 23, with the cutting blocks omitted for illustration purposes.
Figure 25:
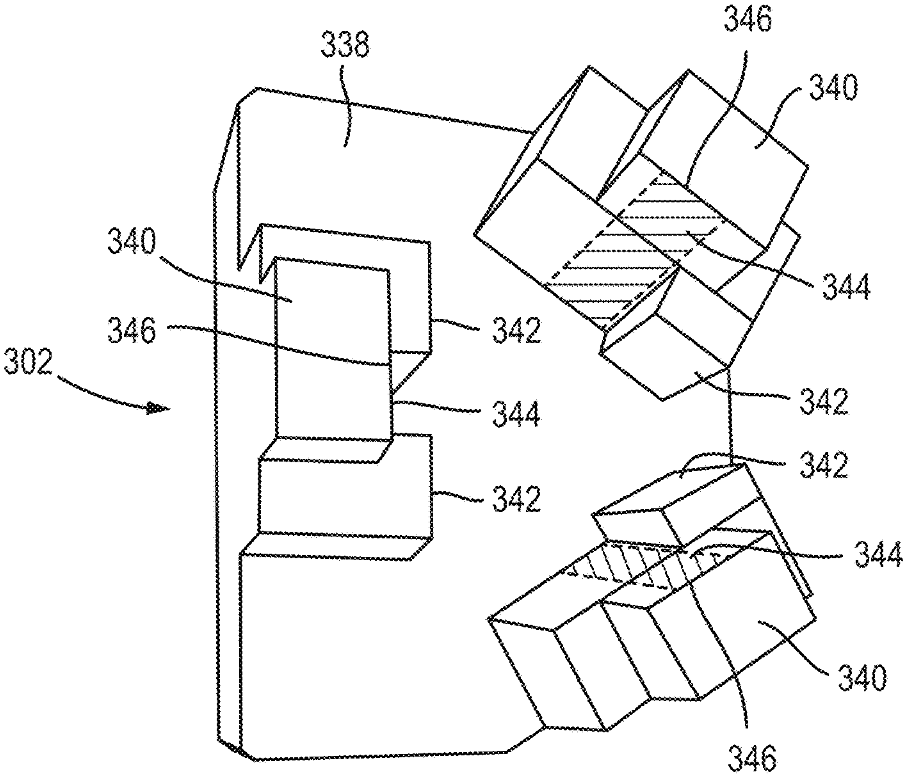
FIG. 25 shows another part of the apparatus of FIG. 18.
Figure 26:
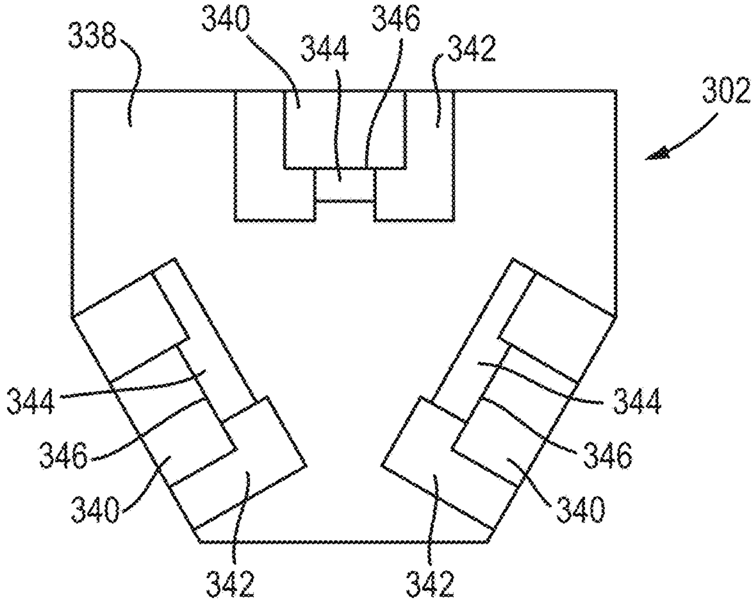
FIG. 26 shows a distal view of the part of FIG. 25.
Figure 27:
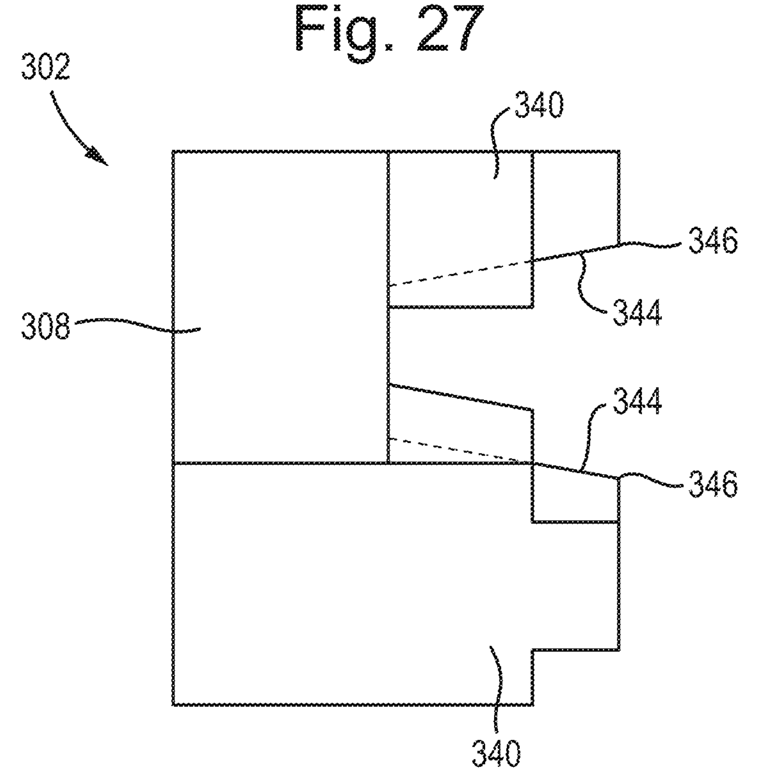
FIG. 27 shows a side view of the part of FIG. 25.
Figure 28:
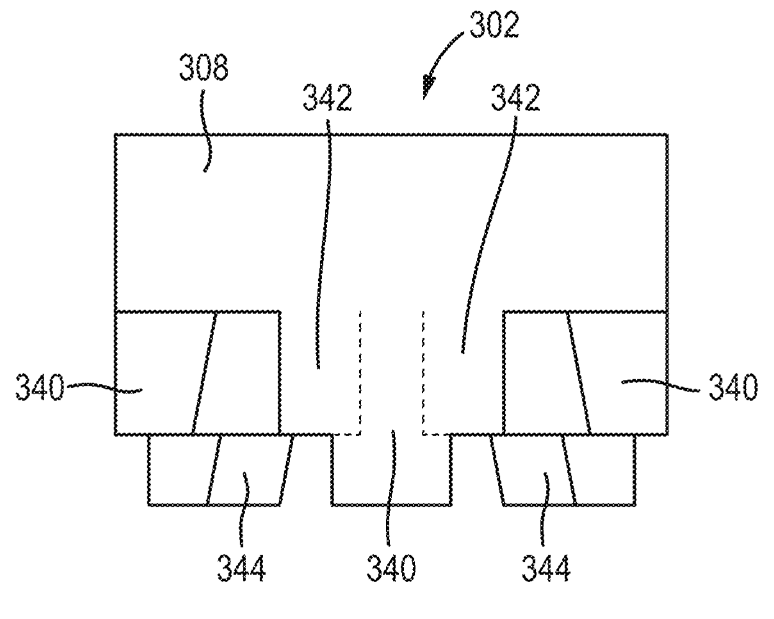
FIG. 28 shows a front view of the part of FIG. 25.

As can be appreciated from FIG. 24, in place of the bolts 332 and threaded bores 334, there may be dowels 332A and bores 334A (which need not be threaded). These dowels 332A and bores 334A will have a minor fastening effect, but more importantly provide a locating effect between the top and bottom mandrel housing pieces 306, 308.

The mandrel 312 has a generally cylindrical shape with cut-outs 336 therein associated with the locations of each of the tabs 260 to be formed. The cut-outs 336 may alternatively be called recesses or depressions and may be formed in the mandrel 312 by any suitable method, rather than necessarily being cut out of the mandrel 312. The cut-outs 336 illustrated are deeper than the length of the cutting pieces 314, such that at the maximum radial inward stroke of the cutting block 310 (i.e., when the stop surface 318 of the cutting block 310 abuts the outer surface 326 of the mandrel housing 304) the cutting pieces 314 do not contact the mandrel 312. This reduces wear and potential blunting of the cutting pieces 314 when in use. The cut-outs 336 may extend along the length of the mandrel 312, or only along a small portion of the mandrel 312, large enough to house the tabs 260 once cut.

The mandrel 312 has a length greater than or equal to a length of the product stick carrier 208

The mandrel can be affixed to either the bottom piece 308 or the top piece 306 of the mandrel housing 304 but either way is held stationary relative to the mandrel housing 304.

Figure 21:
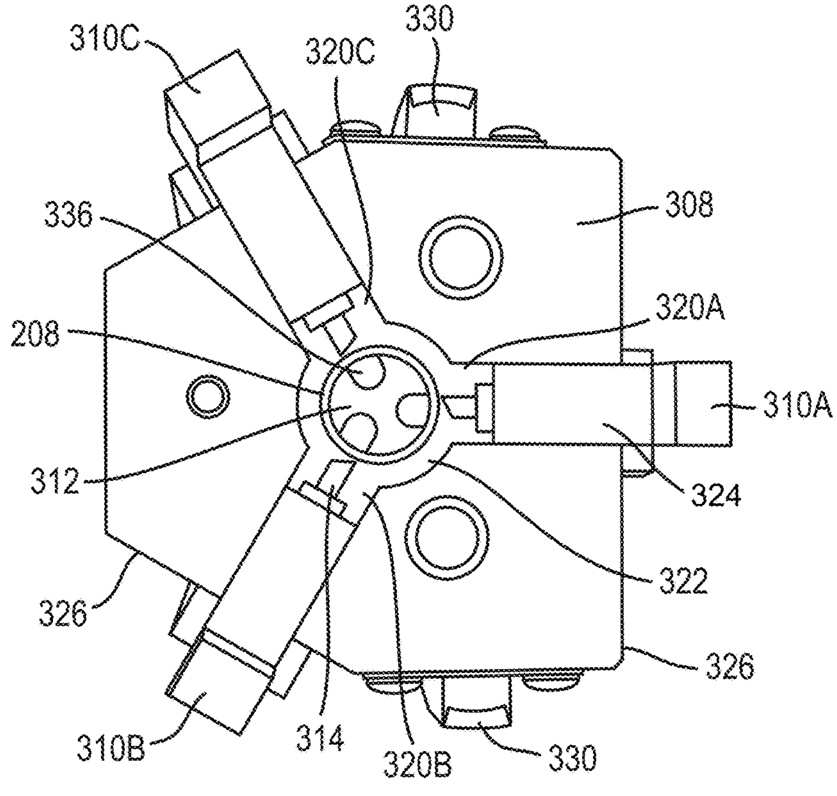
FIG. 21 shows the part of FIG. 20, with the cutting blocks in alternative respective positions and a precursor tube in situ.

As can be seen in FIGS. 21 and 24, the product stick carrier can be placed over the mandrel 312 in preparation for the tabs 260 to be cut and folded. This cutting and folding is then achieved by movement of the cutting blocks 310 from the position shown in FIG. 21 to the position shown in FIG. 20. The product stick carrier 208 is not shown in FIG. 20 or 22 for illustration purposes.

Figure 22:
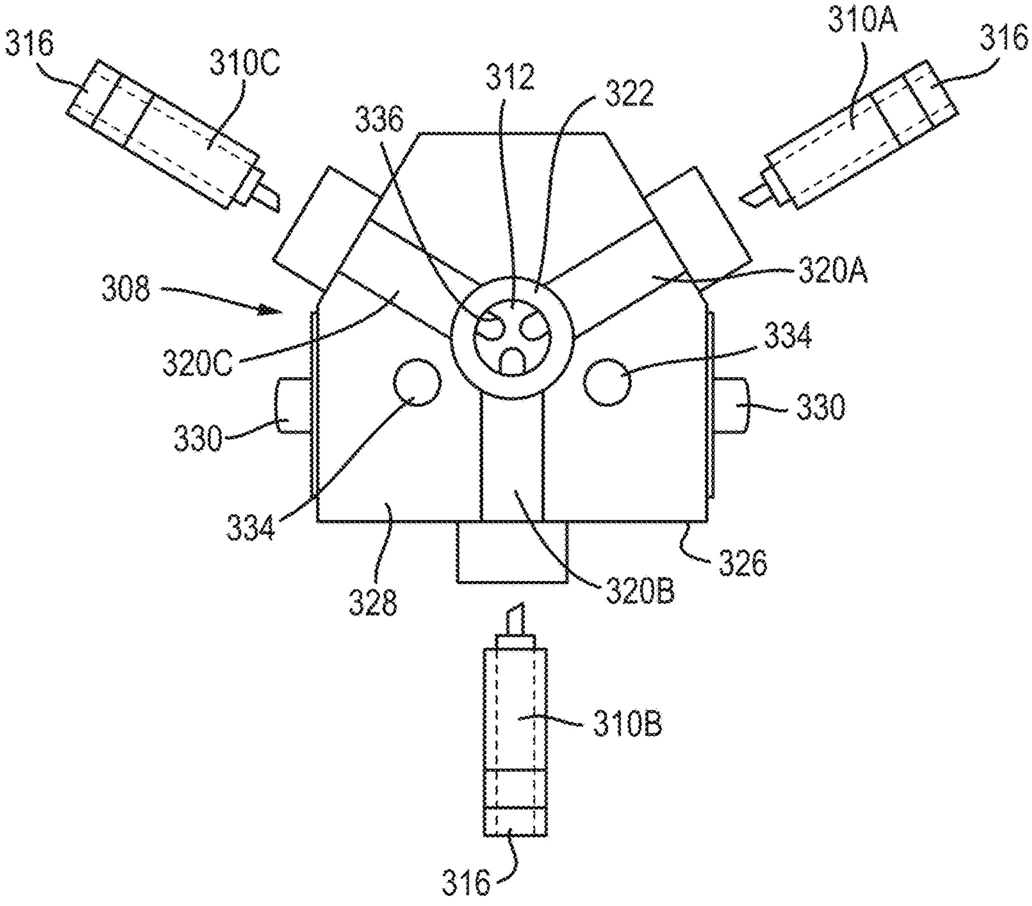
FIG. 22 shows a schematic view of the part of FIG. 20, viewed in the proximal direction.
Figure 23:
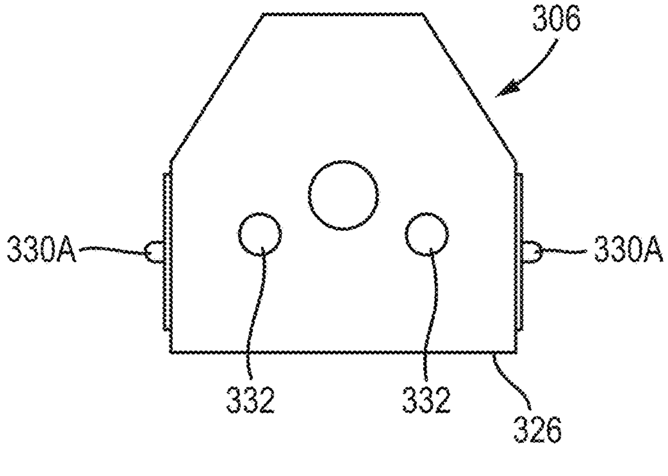
FIG. 23 shows a schematic view of another part of the apparatus of FIG. 18, viewed in the proximal direction.

The punch block 302 of the apparatus 300 is illustrated in FIG. 22 and includes a platform 338 and projections and/or lugs 340 (or punch block lugs) extending therefrom to provide support surfaces 342 for providing lateral support to the mandrel housing by abutment of the outer surfaces 326 of the mandrel housing therewith. The lugs 340 also include inward facing surfaces 344 (shown by the hashed areas), which are complementary to the tapered surfaces 316 of the cutting blocks 310. The inward facing surfaces 344 may be angled at the same angle α of the tapered surfaces 316 so as to spread the load when the tapered surfaces 316 slide against the lugs 340. In some alternative embodiments, not illustrated, the inward facing surfaces 344 may be vertical and an edge 346 of each of those surfaces 344 will engage the tapered surface 316 as the mandrel housing 304 is moved vertically (i.e., toward the platform 338), and/or the punch block 302 is moved onto the mandrel housing 304.

With such an apparatus 300 as described above, the mandrel housing 304 can be assembled and secured or fastened with the product stick carrier 208 and cutting blocks 310 in place, and then the punch block 302 is pushed axially onto the mandrel housing 304 (or vice versa). This drives the cutting blocks 310 radially inward to cause the cutting pieces 314 to cut and fold all of the tabs 260 into the product stick carrier 208 simultaneously.

The cutting piece 314 is shaped appropriately to cut and fold a tab 244 as described with reference to FIGS. 15 to 17. For example, the cutting piece 314 will have a corresponding trapezoidal shape when viewed in a radial direction. Additionally, the cutting piece 314 may have a trapezoidal shape when viewed in the axial direction, as can be appreciated from FIG. 22, which enables cutting and folding of the tabs 244. Said radial and axial directions are defined relative to the mandrel axis.

Alternative geometries of cutting piece 314 are envisaged that are able to cut and fold the tabs 260.

The cutting piece 314 is typically formed of metal, for example stainless steel.

The mandrel 312 and fastening means 330, 332, 334 are also made of metal, for example, stainless steel.

The other parts of the apparatus 300 are typically made of wood.

However, other suitable materials could be used for any of these parts.

Figure 29:
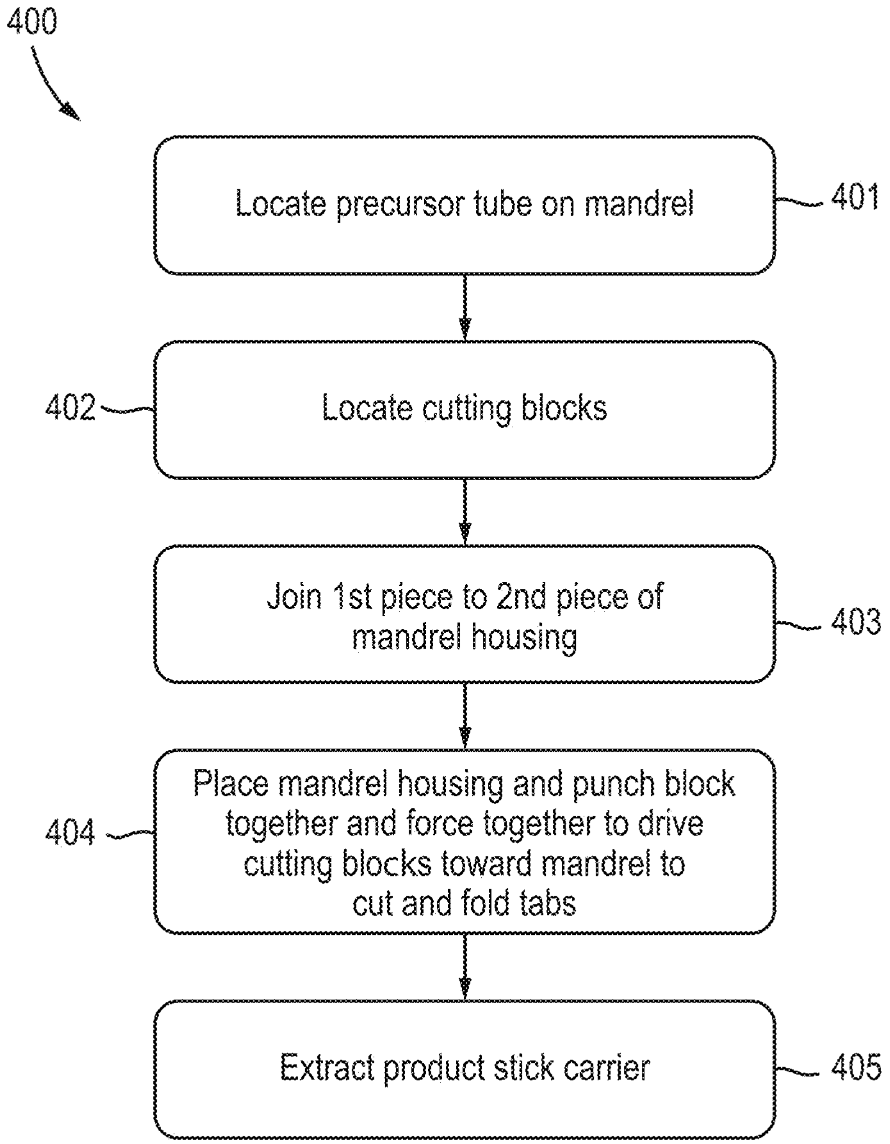
FIG. 29 is a flowchart of a method of producing the product stick carrier.

FIG. 29 illustrates a method 400 of forming the product stick carrier 208.

Step 401 involves locating a precursor tube on/around the mandrel 312, which is housed in (or supported by) a bottom piece 308 of a mandrel housing 304.

Step 402 involves locating cutting blocks 310 within tracks 322 disposed in the bottom piece 308 of the mandrel housing 304.

Step 403 involves assembling the bottom piece 308 (together with the mandrel 312 and the cutting blocks 310) of the mandrel housing 304 with the top piece 306 of the mandrel housing 304 and fastening the two pieces together using fastening means, such as toggle latch 330 or bolts 332 and threaded bores 334.

Step 404 involves placing the punch block 302 and the mandrel housing 304 together, which may involve either keeping the mandrel housing 304 stationary and placing the punch block 302 onto the mandrel housing 304, or keeping the punch block 302 stationary and inserting the mandrel housing 304 therein. The mandrel housing 304 and punch block 302 are then pushed further together. This action results in the tapered surfaces 316 of the cutting blocks 310 engaging with the inward facing surfaces 344 or upper edges 346 of the inward facing surfaces 344 to drive the cutting blocks 310 radially inwards as the punch block 302 is pushed axially against the mandrel housing 304, or vice versa, i.e., the mandrel housing is pushed axially into the apparatus base 302. The cutting blocks 310 being driven (radially) inwardly in this was causes the cutting pieces 314 to cut and fold the tabs 260 into the cylindrical wall 214 of the precursor tube to thereby create the tabs 260 and vents 248 and the product stick carrier 208. It is preferable for the punch block 302 to be placed over the mandrel housing 304 so that the weight of the punch block 302 can assist in the cutting action.

At step 405, the product stick carrier 208 is then extracted from the apparatus by retracting the cutting blocks, and disassembling the bottom and to pieces 308, 306 from one another.

As will be appreciated, each of the steps of the method may not necessarily be required to form a product stick carrier.

For example, the mandrel housing may be a single integrally formed part, such that there is no need for the step of joining the first and second pieces of the mandrel housing together.

In other examples, the step of locating the cutting blocks may not be required, such as when there are cutting features already present within the mandrel housing.

A method for forming a dispenser may include the method as described above as well as the step of assembling the product stick carrier with other component parts of the dispenser.

EXAMPLES—SET A

Example 1

A dispenser formed of card-based or paper-based material for a product in stick form, the dispenser comprising:

a proximal end;

a distal end;

a product stick carrier in the form of a cylindrical tube for supporting a product stick in use;

an outer sleeve in the form of a cylindrical tube disposed radially outwardly of the product stick carrier, wherein the product stick carrier is fixed relative to the outer sleeve;

a product concealing sleeve in the form of a cylindrical tube disposed radially inwardly of the outer sleeve and radially outwardly of the product stick carrier, the product concealing sleeve being retractable from a first, fully extended axial position relative to the outer sleeve and product stick carrier for concealing a product stick supported by the product stick carrier in use in order to expose the product stick for use; and a locking arrangement, wherein the locking arrangement comprises:

a first proximal facing edge;

a second proximal facing edge;

a first distal facing edge; and a second distal facing edge;

wherein the first and second proximal facing edges and the first and second distal facing edges are disposed radially outwardly of the product stick carrier and radially inwardly of the product concealing sleeve;

wherein the first proximal facing edge and the first distal facing edge are associated with the exterior of the product stick carrier;

wherein the second proximal facing edge and the second distal facing edge are associated with the interior of the product concealing sleeve;

wherein the first proximal facing edge and the second distal facing edge cooperate with one another to prevent advancement of the product concealing sleeve relative to the outer sleeve and product stick carrier beyond a set point so as to define the first, fully extended position of the product concealing sleeve, wherein a circumferential gap is defined adjacent an end of the first distal facing edge, such that in at least one rotational position of the product concealing sleeve relative to the product stick carrier, the second proximal facing edge is movable in a proximal direction axially past the first distal facing edge through the circumferential gap without engagement of the first distal facing edge with the second proximal facing edge to permit retraction of the product concealing sleeve from an extended, concealing position, and in at least one other rotational position of the product concealing sleeve relative to the product stick carrier, at least a portion of the first distal facing edge and at least a portion of the second proximal facing edge engage one another to prevent retraction of the product concealing sleeve from the extended, concealing position.

Example 2

The dispenser of example 1, comprising a cap sized to fit snugly over the product concealing sleeve when the product concealing sleeve is in the first, fully extended concealing position.

Example 3

The dispenser of example 1 or 2, wherein the locking arrangement comprises:

a product stick carrier collar piece affixed to the exterior of the product stick carrier at a distal end of the product stick carrier, a proximal end edge of the product stick carrier collar piece providing the first proximal facing edge; and a product concealing sleeve collar piece affixed to the interior of the product concealing sleeve at a proximal end of the product concealing sleeve, a distal end edge of the product concealing sleeve collar piece providing the second distal facing edge.

Example 4

The dispenser of example 3, wherein the locking arrangement further comprises a secondary product stick carrier collar piece affixed to the exterior of the product stick carrier and axially spaced from and proximal to the product stick carrier collar piece to enable the product concealing sleeve collar piece to be located between the proximal edge of the product stick carrier collar piece and the distal edge of the secondary product stick carrier collar piece when the product concealing sleeve is in the extended, concealing position, wherein a distal end edge of the secondary product stick carrier collar piece provides the first distal facing edge, wherein the circumferential gap is provided between circumferential end edges of the first distal facing edge and extends between circumferential end edges of the secondary product stick carrier collar piece, and wherein the proximal end edge of the product concealing sleeve collar piece provides the second proximal facing edge.

Example 5

The dispenser of example 4, wherein the secondary product stick carrier collar piece is axially spaced from the product stick carrier collar piece by a first distance $D_C$ greater than an axial width $W_C$ of the product concealing sleeve collar piece.

Example 6

The dispenser of example 4 or 5, wherein the sum of the circumferential lengths of the secondary product stick carrier collar piece and the product stick carrier collar piece is less than the outer circumference of the product stick carrier.

Example 7

The dispenser of any of examples 4 to 6, wherein the product stick carrier collar piece is flush with a distal end edge of the product stick carrier.

Example 8

The dispenser of any of examples 4 to 7, wherein the difference between the outer circumference of the product stick carrier and the circumferential length of the product stick carrier collar piece is less than the circumferential length of the product concealing sleeve collar piece.

Example 9

The dispenser of example 1 or 2, wherein the first distal facing edge is helical and the second proximal facing edge is helical.

Example 10

The dispenser of example 1, 2 or 9, wherein the locking arrangement comprises:

- a product stick carrier collar piece affixed to the exterior of the product stick carrier at a distal end of the product stick carrier;
- a product concealing sleeve collar piece affixed to the interior of the product concealing sleeve at a proximal end of the product concealing sleeve;
- a first trapezoidal locking portion extending proximally from the product stick carrier collar piece and having a first helical lateral side and a proximal base side, wherein the first helical lateral side provides the first distal facing edge; and
- a second trapezoidal locking portion extending distally from the product concealing sleeve collar piece and having a second helical lateral side and a distal base side, wherein the second helical lateral side provides the second proximal facing edge.

Example 11

The dispenser of example 10, wherein the proximal base side of the first trapezoidal locking portion provides the first proximal facing edge of the locking arrangement and a distal end edge of the product concealing sleeve collar piece provides the second distal facing edge of the locking arrangement.

Example 12

The dispenser of example 10, wherein a proximal end of the product stick carrier collar piece provides the first proximal facing edge of the locking arrangement and the distal base side of the second trapezoidal locking portion provides the second distal facing edge of the locking arrangement.

Example 13

The dispenser of any one of examples 10 to 12, wherein the first and second trapezoidal locking portions are each in the form of a right trapezoid, wherein the first trapezoidal locking portion has a first axially extending lateral side opposite the first helical lateral side and the second trapezoidal locking portion has a second axially extending lateral side opposite the second helical lateral side.

Example 14

The dispenser of any one of examples 10 to 13, wherein the first trapezoidal locking portion is integrally formed with the product stick carrier collar piece and the second trapezoidal locking portion is integrally formed with the product concealing sleeve collar piece.

Example 15

The dispenser of example 3, wherein the distal end edge of the product stick carrier collar piece provides the first distal facing edge, and the locking arrangement comprises a locking portion extending distally from the product concealing sleeve collar piece, wherein the locking portion comprises an axially extending portion and a first circumferentially extending portion extending from the distal end of the axially extending portion, wherein the first circumferentially extending portion provides at least a portion of the second proximal facing edge, wherein:

- the circumferential gap is provided between the ends of the first distal facing edge and extends between the circumferential end edges of the product concealing sleeve collar piece; and
- the product stick carrier collar piece is spaced from the distal edge of the product stick carrier to enable the first circumferentially extending portion to be located between the product stick carrier collar piece and the distal edge of the product stick carrier when in the extended, concealing position Example 16

The dispenser of example 15, wherein the locking portion is L-shaped.

Example 17

The dispenser of example 15 or 16, wherein the locking portion includes a second circumferentially extending portion extending from the distal end of the axially extending portion in the opposite circumferential direction to the extension of the first circumferentially extending portion, wherein the first circumferentially extending portion and the second circumferentially extending portion each provide parts of the second proximal facing edge.

Example 18

The dispenser of example 15 or example 17, wherein the locking portion is T-shaped.

Example 19

The dispenser of any preceding example, comprising visual marks on the exterior of the outer sleeve and the product concealing sleeve to represent the rotational position of the product concealing sleeve with respect to the product stick carrier.

Example 20

The dispenser of example 19, wherein the visual marks are aligned with one another when the product concealing sleeve is in a rotational position with respect to the product stick carrier which will enable retraction of the product stick carrier from the extended, concealing position.

Example 21

The dispenser of any preceding example, wherein, when retraction of the product concealing sleeve is enabled, the product concealing sleeve is retractable to a second, fully retracted position of the product concealing sleeve relative to the product stick carrier.

Example 22

The dispenser of any preceding example, comprising a base disc fixed to a proximal end edge of each of the product stick carrier and the outer sleeve.

Example 23

The dispenser of example 22 as dependent upon example 21, wherein the second, fully retracted position of the product concealing sleeve is a set position defined when a proximal end of the product concealing sleeve engages the base disc.

Example 24

The dispenser of any preceding example, wherein the extended, concealing position corresponds substantially to the first, fully extended position.

Example 25

The dispenser of any preceding example, wherein the product stick carrier comprises:
- a cylindrical wall having an inner surface and an outer surface;
- a carrier proximal end;
- a carrier distal end, from which the product stick extends in use; and
- a plurality of tabs extending inwardly toward the dispenser axis from the inner surface of the product stick carrier, wherein the plurality of tabs are configured to engage a product stick supported by the product stick carrier in use to assist in securing the product stick within the product stick carrier, wherein, optionally:
- each of the plurality of tabs is attached to the inner surface of the product stick carrier along a respective axially extending foldline, further optionally wherein each of the plurality of tabs is defined by a respective cut-out from the cylindrical product stick carrier tube, wherein a vent through the cylindrical wall of the product stick carrier tube is provided by the space left by the cut-out and/or wherein each of the plurality of tabs is trapezoidal in shape having a long base formed by the axially extending fold line;
- the plurality of tabs consists of three, four, or five tabs;
- each of the plurality of tabs are located toward the distal end of the product stick carrier; and/or
- the dispenser comprises a product stick support disc within the product stick carrier and located proximal to the tabs, wherein the product stick support disc is free from openings extending therethrough.

EXAMPLES—SET B

Example 1

A dispenser formed of card-based or paper-based material for a product in stick form, the dispenser comprising:
- a dispenser axis extending along a length of the dispenser;
- a proximal end;
- a distal end;
- a product stick carrier in the form of a cylindrical tube for receiving a product stick in use;
- a sleeve in the form of a cylindrical tube, wherein the product stick carrier is located within the sleeve and wherein the product stick carrier and the sleeve are moveable axially relative to one another;
- wherein the product stick carrier comprises:
  - a cylindrical wall having an inner surface and an outer surface;
  - a carrier proximal end;
  - a carrier distal end, from which the product stick extends in use; and
  - a plurality of tabs extending inwardly toward the dispenser axis from the inner surface of the product stick carrier, wherein the plurality of tabs are configured to engage a product stick supported by the product stick carrier in use to assist in securing the product stick within the product stick carrier.

Example 2

The dispenser of example 1, wherein each of the plurality of tabs is attached to the inner surface of the product stick carrier along a respective axially extending fold line.

Example 3

The dispenser of example 2, wherein each of the plurality of tabs is defined by a respective cut-out from the cylindrical product stick carrier tube, wherein a vent through the cylindrical wall of the product stick carrier tube is provided by the space left by the cut-out.

Example 4

The dispenser of example 2 or 3, wherein each of the plurality of tabs is trapezoidal in shape having a long base formed by the axially extending fold line.

Example 5

The dispenser of any preceding example, wherein the plurality of tabs consists of three, four, or five tabs.

Example 6

The dispenser of any preceding example, wherein each of the plurality of tabs are located toward the distal end of the product stick carrier.

Example 7

The dispenser of any preceding example, further comprising an outer sleeve fixed relative to the product stick carrier, wherein the sleeve is a product concealing sleeve located between the product stick carrier and the outer sleeve, wherein the product concealing sleeve is retractable relative to the product stick carrier and outer sleeve to reveal a product stick received by the product stick carrier for use.

Example 8

The dispenser of any of examples 1 to 6, wherein the sleeve is an outer sleeve, and further comprising a mechanism for extending the product stick carrier axially relative to the outer sleeve to expose a product stick received by the product stick carrier for use.

Example 9

The dispenser of any preceding example, comprising a product stick support disc within the product stick carrier and located proximal to the tabs, wherein the product stick support disc is free from openings extending therethrough.

Example 10

The dispenser of any preceding example, comprising the product stick mounted in the product stick carrier.

Example 11

A method of forming the product stick carrier of the dispenser of any preceding example, comprising:

locating a precursor cylindrical tube of card-based or paper-based material around a mandrel, wherein the mandrel includes a plurality of recesses in the outer surface thereof, the recesses being spaced from one another around the circumference of the mandrel; and simultaneously driving each of a plurality of cutting pieces inwardly toward the mandrel such that each cutting piece cuts a respective one of the tabs in the wall of the cylindrical tube and folds the resulting tab inwardly to extend from the inner surface of the cylindrical tube as the cutting piece engages the wall of the cylindrical tube and moves into a respective one of the recesses in the outer surface of the mandrel.

Example 12

The method of example 11, further comprising:

locating the mandrel in a mandrel housing; and locating each of the plurality of cutting pieces within the mandrel housing prior to simultaneously driving the cutting pieces inwardly toward the mandrel.

Example 13

The method of example 12, comprising:

providing each of the cutting pieces with a cutting block having an outwardly facing sloping surface at a radially outward-most part, wherein the cutting piece is attached to a radially inward-most part of the cutting block;

providing a punch block which is movable axially along the mandrel axis relative to the cutting blocks and includes a plurality of inwardly facing sloping surfaces corresponding to respective ones of each of the outwardly facing sloping surfaces of the cutting blocks; and mating the mandrel housing with the punch block, such that the punch block receives at least a portion of the mandrel housing in a space provided between the inwardly facing sloping surfaces of the punch block, wherein each of the corresponding inwardly facing surfaces of the punch block engages a respective one of the outwardly facing surfaces of the cutting blocks to simultaneously drive the cutting pieces inwardly toward the mandrel as a result of relative axial movement of the punch block relative to the cutting blocks and mandrel housing.

Example 14

The method of example 12 or 13, wherein the mandrel housing includes a first piece and a second piece, wherein locating the cutting pieces within the mandrel housing includes fitting cutting blocks attached to each of the cutting pieces within respective tracks in the first piece of the mandrel housing such that the cutting blocks may move toward the mandrel along the tracks when the first and second piece are assembled.

Example 15

The method of any of examples 11 to 14, comprising driving the cutting pieces inwards at an acute angle to the radial direction, as defined by the mandrel axis, to cut and fold the tabs in a manner such that each of the tabs rotates through more than 90° about a foldline connecting the tab to the inner surface of the tube.

Example 16

A method of forming the dispenser of any of examples 1 to 10, comprising:

forming the product stick carrier by a method in accordance with any of examples 11 to 15;

removing the product stick carrier from the mandrel; and assembling the product stick carrier with the sleeve of the dispenser.

Example 17

The method of example 16, further comprising inserting the product stick into the product stick carrier so that the tabs engage the product stick.

Example 18

An apparatus for performing the method of any of examples 11 to 17, the apparatus comprising:

a punch block;

a mandrel configured to receive the precursor cylindrical tube of card-based or paper-based material for forming the product stick carrier, wherein the mandrel has recesses in the outer surface thereof, the recesses being spaced from one another around the circumference of the mandrel wherein the mandrel has a mandrel axis extending along the length of the mandrel; and a plurality of cutting blocks arranged around the mandrel and able to slide radially with respect to the mandrel backwards and forwards, wherein each of the cutting blocks includes:

a sloping radially outward facing surface at a radially outward-most part thereof, as defined by the mandrel axis; and a cutting piece at a radially inward-most part thereof, as defined by the mandrel axis, wherein the punch block includes sloping surfaces on a radially inward facing surface thereof, each sloping surface being complementary to a respective one of the sloping radially outward facing surfaces of the cutting blocks, wherein the punch block is movable axially as defined by the mandrel axis relative to the cutting blocks to cause the sloping surfaces of the punch block to simultaneously engage the respective ones of the sloping radially outward facing surfaces of the cutting blocks and thereby drive the cutting pieces radially inwardly toward the mandrel as the punch block continues to move axially relative to the cutting blocks such that each cutting piece will engage the wall of the precursor cylindrical tube held on the mandrel and move into a respective one of the recesses in the outer surface of the mandrel to thereby cut a respective one of the tabs in the wall of the cylindrical tube and fold the resulting tab inwardly toward the mandrel to extend from the inner surface of the tube in use.

Example 19

The apparatus of example 18, comprising a mandrel housing for housing the mandrel and the cutting blocks.

Example 20

The apparatus of example 19, wherein the mandrel housing includes tracks for receiving the cutting blocks such that the cutting blocks may move inwardly toward the mandrel.

Example 21

The apparatus or method of any of examples 11 to 20, wherein each of the plurality of cutting blocks is substantially L-shaped and comprises:

a stop surface facing inwardly toward the mandrel and configured to abut a complementary stop surface to limit a maximum inward stroke of the cutting pieces.

Example 22

The apparatus of example 21 as dependent directly, or indirectly, on example 19, or the method of example 21, wherein the complementary stop surface is provided by an outer surface of the mandrel housing.

Example 23

The apparatus or method of any of examples 11 to 22, wherein the punch block includes punch block lugs extending axially, defined by the mandrel axis when the mandrel housing is within the punch block, from a platform of the punch block to slidably receive the mandrel housing, wherein the punch block lugs provide the radially inward facing surfaces and define a space for receiving the at least a portion of the mandrel housing between the radially inward facing surfaces.

Example 24

The apparatus or method of any of examples 11 to 23, wherein the cutting piece is made of metal.

Example 25

The apparatus or method of any of examples 11 to 24, wherein the radially inward facing surfaces of the punch block are each parallel to the respective radially outward facing surfaces of the cutting blocks, when the punch block has received the cutting blocks.

The above description is exemplary in nature and should not be taken to limit the scope of the following claims.

The invention claimed is:

1. A dispenser formed of card-based or paper-based material for a product in stick form, the dispenser comprising:

a dispenser axis extending along a length of the dispenser;

a proximal end;

a distal end;

a product stick carrier in the form of a cylindrical tube for receiving a product stick in use;

a sleeve in the form of a cylindrical tube, wherein the product stick carrier is located within the sleeve and wherein the product stick carrier and the sleeve are moveable axially relative to one another;

wherein the product stick carrier comprises:

a cylindrical wall having an inner surface and an outer surface;

a carrier proximal end;

a carrier distal end, from which the product stick extends in use; and a plurality of tabs extending inwardly toward the dispenser axis from the inner surface of the product stick carrier, wherein the plurality of tabs are configured to engage a product stick supported by the product stick carrier in use to assist in securing the product stick within the product stick carrier, wherein each of the plurality of tabs is attached to the inner surface of the product stick carrier along a respective axially extending fold line.

2. The dispenser of claim 1, wherein each of the plurality of tabs is defined by a respective cut-out from the cylindrical product stick carrier tube, wherein a vent through the cylindrical wall of the product stick carrier tube is provided by the space left by the cut-out.

3. The dispenser of claim 1, wherein each of the plurality of tabs is trapezoidal in shape having a long base formed by the axially extending fold line.

4. The dispenser of claim 1, wherein each of the plurality of tabs are located toward the distal end of the product stick carrier.

5. The dispenser of claim 1, further comprising an outer sleeve fixed relative to the product stick carrier, wherein the sleeve is a product concealing sleeve located between the product stick carrier and the outer sleeve, wherein the product concealing sleeve is retractable relative to the product stick carrier and outer sleeve to reveal a product stick received by the product stick carrier for use.

6. The dispenser of claim 1, wherein the sleeve is an outer sleeve, and further comprising a mechanism for extending the product stick carrier axially relative to the outer sleeve to expose a product stick received by the product stick carrier for use.

7. The dispenser of claim 1, comprising a product stick support disc within the product stick carrier and located proximal to the tabs, wherein the product stick support disc is free from openings extending therethrough.

8. A method of forming the product stick carrier of the dispenser of any preceding claim, comprising:

locating a precursor cylindrical tube of card-based or paper-based material around a mandrel, wherein the mandrel includes a plurality of recesses in the outer surface thereof, the recesses being spaced from one another around the circumference of the mandrel; and simultaneously driving each of a plurality of cutting pieces inwardly toward the mandrel such that each cutting piece cuts a respective one of the tabs in the wall of the cylindrical tube and folds the resulting tab inwardly to extend from the inner surface of the cylindrical tube as the cutting piece engages the wall of the cylindrical tube and moves into a respective one of the recesses in the outer surface of the mandrel.

9. The method of claim 8, further comprising:

locating the mandrel in a mandrel housing; and locating each of the plurality of cutting pieces within the mandrel housing prior to simultaneously driving the cutting pieces inwardly toward the mandrel.

10. The method of claim 9, comprising:

providing each of the cutting pieces with a cutting block having an outwardly facing sloping surface at a radially outward-most part, wherein the cutting piece is attached to a radially inward-most part of the cutting block;

providing a punch block which is movable axially along the mandrel axis relative to the cutting blocks and includes a plurality of inwardly facing sloping surfaces corresponding to respective ones of each of the outwardly facing sloping surfaces of the cutting blocks; and mating the mandrel housing with the punch block, such that the punch block receives at least a portion of the mandrel housing in a space provided between the inwardly facing sloping surfaces of the punch block, wherein each of the corresponding inwardly facing surfaces of the punch block engages a respective one of the outwardly facing surfaces of the cutting blocks to simultaneously drive the cutting pieces inwardly toward the mandrel as a result of relative axial movement of the punch block relative to the cutting blocks and mandrel housing.

11. The method of claim 9, wherein the mandrel housing includes a first piece and a second piece, wherein locating the cutting pieces within the mandrel housing includes fitting cutting blocks attached to each of the cutting pieces within respective tracks in the first piece of the mandrel housing such that the cutting blocks may move toward the mandrel along the tracks when the first and second piece are assembled.

12. The method of any of claim 8, comprising driving the cutting pieces inwards at an acute angle to the radial direction, as defined by the mandrel axis, to cut and fold the tabs in a manner such that each of the tabs rotates through more than 90° about a foldline connecting the tab to the inner surface of the tube.

13. The apparatus of claim 8, wherein each of the plurality of cutting blocks is substantially L-shaped and comprises:

a stop surface facing inwardly toward the mandrel and configured to abut a complementary stop surface to limit a maximum inward stroke of the cutting pieces.

14. The apparatus of claim 13, wherein the complementary stop surface is provided by an outer surface of the mandrel housing.

15. An apparatus comprising:

a punch block;

a mandrel configured to receive a precursor cylindrical tube of card-based or paper-based material for forming a product stick carrier, wherein the mandrel has recesses in an outer surface thereof, the recesses being spaced from one another around a circumference of the mandrel wherein the mandrel has a mandrel axis extending along a length of the mandrel; and a plurality of cutting blocks arranged around the mandrel and able to slide radially with respect to the mandrel backwards and forwards, wherein each of the cutting blocks includes:

a sloping radially outward facing surface at a radially outward-most part thereof, as defined by the mandrel axis; and a cutting piece at a radially inward-most part thereof, as defined by the mandrel axis, wherein the punch block includes sloping surfaces on a radially inward facing surface thereof, each sloping surface being complementary to a respective one of the sloping radially outward facing surfaces of the cutting blocks, wherein the punch block is movable axially as defined by the mandrel axis relative to the cutting blocks to cause the sloping surfaces of the punch block to simultaneously engage the respective ones of the sloping radially outward facing surfaces of the cutting blocks and thereby drive the cutting pieces radially inwardly toward the mandrel as the punch block continues to move axially relative to the cutting blocks such that each cutting piece will engage the wall of the precursor cylindrical tube held on the mandrel and move into a respective one of the recesses in the outer surface of the mandrel to thereby cut a respective one of the tabs in the wall of the cylindrical tube and fold the resulting tab inwardly toward the mandrel to extend from the inner surface of the tube in use.

16. The apparatus of claim 15, comprising a mandrel housing for housing the mandrel and the cutting blocks.

17. The apparatus of claim 16, wherein the mandrel housing includes tracks for receiving the cutting blocks such that the cutting blocks may move inwardly toward the mandrel.

18. The apparatus of claim 15, wherein the punch block includes punch block lugs extending axially, defined by the mandrel axis when the mandrel housing is within the punch block, from a platform of the punch block to slidably receive the mandrel housing, wherein the punch block lugs provide the radially inward facing surfaces and define a space for receiving the at least a portion of the mandrel housing between the radially inward facing surfaces.

19. The apparatus of claim 15, wherein the radially inward facing surfaces of the punch block are each parallel to the respective radially outward facing surfaces of the cutting blocks, when the punch block has received the cutting blocks.

* * * * *